US012795734B2

(12) United States Patent
Yan

(10) Patent No.: US 12,795,734 B2
(45) Date of Patent: Nov. 10, 2026

(54) RANDOM ACCESS METHOD AND APPARATUS

(71) Applicant: HUAWEI TECHNOLOGIES CO., LTD., Shenzhen (CN)

(72) Inventor: Mao Yan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 249 days.

(21) Appl. No.: 18/426,230

(22) Filed: Jan. 29, 2024

(65) Prior Publication Data

US 2024/0196442 A1 Jun. 13, 2024

Related U.S. Application Data

(63) Continuation of application No. PCT/CN2022/113069, filed on Aug. 17, 2022.

(30) Foreign Application Priority Data

Aug. 20, 2021 (CN) ......................... 202110963322.6

(51) Int. Cl.
*H04W 74/0833* (2024.01)
*H04B 17/318* (2015.01)
*H04L 5/00* (2006.01)

(52) U.S. Cl.
CPC ...... *H04W 74/0833* (2013.01); *H04B 17/328* (2023.05); *H04L 5/0048* (2013.01)

(58) Field of Classification Search
CPC . H04W 74/0833; H04B 17/328; H04L 5/0048
See application file for complete search history.

(56) References Cited

U.S. PATENT DOCUMENTS

2020/0120709 A1 4/2020 Bergquist et al.
2020/0359419 A1 11/2020 Liberg et al.
(Continued)

FOREIGN PATENT DOCUMENTS

CN 107409421 A 11/2017
CN 112040558 A 12/2020
(Continued)

OTHER PUBLICATIONS

3rd Generation Partnership Project; Technical Specification Group Radio Access Network; NR; Requirements for support of radio resource management (Release 17), 3GPP TS 38.133 V17.2.0 (Jun. 2021), Technical Specification, total 1828 pages.
Qualcomm Incorporated:"RAN2 enhancements for Msg3 repetition", 3GPP TSG-RAN WG2 Meeting #115-e, Online, Aug. 16-27, 2021, R2-2107220, total 3 pages.
3rd Generation Partnership Project; Technical Specification Group Radio Access Network; NR; Physical layer measurements (Release 16), 3GPP TS 38.215 V16.3.0 (Sep. 2020), Technical Specification, total 25 pages.
(Continued)

*Primary Examiner* — Derrick V Rose

(57) ABSTRACT

This application provides a random access method and apparatus. The method includes: A terminal device determines a first random access preamble group from at least two random access preamble groups. The at least two random access preamble groups are associated with a sending manner of a message 3 in a random access procedure. The sending manner of the message 3 includes the following: The terminal device repeatedly sends the message 3, or the terminal device does not repeatedly send the message 3. At least one of the at least two random access preamble groups is associated with a sending manner in which the terminal device repeatedly sends the message 3. The terminal device determines a random access preamble from the first random access preamble group. The terminal device sends the random access preamble to a network device.

16 Claims, 22 Drawing Sheets

(56) References Cited

U.S. PATENT DOCUMENTS

| | | | | |
|---|---|---|---|---|
| 2021/0235503 | A1 | 7/2021 | Irukulapati et al. | |
| 2021/0352689 | A1* | 11/2021 | Jung | H04L 1/08 |
| 2021/0392699 | A1* | 12/2021 | Park | H04L 1/1864 |
| 2023/0007702 | A1* | 1/2023 | Park | H04W 74/0833 |
| 2024/0284514 | A1* | 8/2024 | Sedin | H04W 74/002 |
| 2025/0016837 | A1* | 1/2025 | Sedin | H04B 17/328 |

FOREIGN PATENT DOCUMENTS

| | | | |
|---|---|---|---|
| EP | 3043616 | A1 | 7/2016 |
| WO | 2020143549 | A1 | 7/2020 |
| WO | 2021177741 | A1 | 9/2021 |

OTHER PUBLICATIONS

3rd Generation Partnership Project; Technical Specification Group Radio Access Network; NR; Radio Resource Control (RRC) protocol specification (Release 16), 3GPP TS 38.331 V16.5.0 (Jun. 2021), Technical Specification, total 959 pages.

3rd Generation Partnership Project; Technical Specification Group Radio Access Network; NR; Physical layer procedures for control (Release 16), 3GPP TS 38.213 V16.6.0 (Jun. 2021), Technical Specification, total 187 pages.

3rd Generation Partnership Project; Technical Specification Group Radio Access Network; NR; Medium Access Control (MAC) protocol specification (Release 16), 3GPP TS 38.321 V16.5.0 (Jun. 2021), Technical Specification, total 157 pages.

* cited by examiner

200

300

400

RANDOM ACCESS METHOD AND APPARATUS

CROSS-REFERENCE TO RELATED APPLICATIONS

This application is a continuation of International Application No. PCT/CN2022/113069, filed on Aug. 17, 2022, which claims priority to Chinese Patent Application No. 202110963322.6, filed on Aug. 20, 2021. The disclosures of the aforementioned applications are hereby incorporated by reference in their entireties.

TECHNICAL FIELD

This application relates to the communication field, and more specifically, to a random access method and apparatus.

BACKGROUND

In an LTE or 5G communication system with access control, a device that expects to access a network may establish a connection to a base station by using a random access procedure. In a four-step random access procedure, a manner of repeatedly transmitting a message 3 (Msg3) may be used to enhance coverage. Currently, how to determine a random access preamble based on a sending manner of the Msg3 to enable a network device to appropriately schedule a resource based on the sending manner of the Msg3 is a problem to be urgently resolved.

SUMMARY

This application provides a random access method and apparatus, so that a terminal device can determine a random access preamble based on a sending manner of a message 3, and a network device can appropriately schedule a resource based on the sending manner of the message 3.

According to a first aspect, a random access method is provided. The method includes: A terminal device determines a first random access preamble group from at least two random access preamble groups, where the at least two random access preamble groups are associated with a sending manner of a message 3, the message 3 is used for random access, the sending manner of the message 3 includes that the terminal device repeatedly sends the message 3 or the terminal device does not repeatedly send the message 3, and at least one of the at least two random access preamble groups is associated with repeatedly sending the message 3 by the terminal device; the terminal device determines a random access preamble from the first random access preamble group; and the terminal device sends the random access preamble to a network device.

That the terminal device repeatedly sends the message 3 includes one or more of the following cases: The terminal device expects to repeatedly send the message 3, the terminal device has a capability of repeatedly sending the message 3, the terminal device needs to repeatedly send the message 3, the terminal device expects to be scheduled to repeatedly send the message 3, or a number of times that the terminal device sends the message 3 is greater than 1.

That the terminal device does not repeatedly send the message 3 includes one or more of the following cases: The terminal device does not have the capability of repeatedly sending the message 3, the terminal device does not need to repeatedly send the message 3, the terminal device does not expect to repeatedly send the message 3, the terminal device does not expect to be scheduled to repeatedly send the message 3, or the number of times that the terminal device sends the message 3 is less than or equal to 1.

With reference to the first aspect, in some implementations of the first aspect, the terminal device determines the first random access preamble group from the at least two random access preamble groups, where the at least two random access preamble groups are associated with at least one of the following manners: The terminal device repeatedly sends the message 3, the terminal device does not repeatedly send the message 3, the number of times that the terminal device sends the message 3, the terminal device has the capability of repeatedly sending the message 3, the terminal device does not have the capability of repeatedly sending the message 3, the terminal device needs to repeatedly send the message 3, the terminal device does not need to repeatedly send the message 3, the terminal device expects to be scheduled to repeatedly send the message 3, or the terminal device does not expect to be scheduled to repeatedly send the message 3. At least one of the at least two random access preamble groups is associated with a sending manner in which the terminal device repeatedly sends the message 3. The terminal device determines the random access preamble from the first random access preamble group.

In the foregoing solution, the terminal device may perform selection on the at least two random access preamble groups after selecting a synchronization signal block.

Based on the foregoing solution, the terminal device selects the random access preamble group from the at least two random access preamble groups, where at least one of the at least two random access preamble groups is associated with the sending manner in which the terminal device repeatedly sends the message 3. In other words, at least one of the at least two random access preamble groups indicates repeated sending of the message 3. Therefore, after the terminal device selects the random access preamble group, in a subsequent random access procedure, the network device may determine, based on the random access preamble group, whether the message 3 needs to be repeatedly sent. In other words, the network device may determine, based on the random access preamble group, the sending manner of the message 3. Therefore, the network device may appropriately schedule a resource for the terminal device based on whether the message 3 is repeatedly sent (or the sending manner of the message 3), thereby improving resource utilization.

With reference to the first aspect, in some implementations of the first aspect, that a terminal device determines a first random access preamble group from at least two random access preamble groups includes: The terminal device receives indication information from the network device; the terminal device determines, based on the indication information, that the first random access preamble group is associated with the sending manner in which the terminal device repeatedly sends the message 3; and when the sending manner of the message 3 is that the terminal device repeatedly sends the message 3, the terminal device determines the first random access preamble group from the at least two random access preamble groups.

In the foregoing solution, after selecting the synchronization signal block, the terminal device determines, based on an indication of the network device, that the first random access preamble group is associated with the sending manner in which the terminal device repeatedly sends the message 3. In other words, the terminal device determines, based on the indication of the network device, that the first random access preamble group indicates repeated sending of the message 3. In other words, the terminal device determines, based on the indication of the network device, that the network device supports repeated transmission of the message 3 by using the first random access preamble group. Further, when the terminal device needs to repeatedly send the message 3, the terminal device selects the first random access preamble group. Then, the terminal device sends a random access preamble in the first random access preamble group to the network device, and the network device determines, based on the random access preamble, that the sending manner of the message 3 is that the terminal device repeatedly sends the message 3. Therefore, a resource may be appropriately scheduled for transmission of the message 3.

With reference to the first aspect, in some implementations of the first aspect, that a terminal device determines a first random access preamble group from at least two random access preamble groups includes: The terminal device measures reference signal received power (RSRP); and when the RSRP is less than a first threshold, the terminal device determines the first random access preamble group from the at least two random access preamble groups, where the first random access preamble group is associated with the sending manner in which the terminal device repeatedly sends the message 3, the first threshold is determined based on a second threshold and a relative threshold, and the second threshold is used to determine a carrier type of the random access, a random access type of the random access, or a synchronization signal block.

It should be understood that the relative threshold may be a threshold used to determine a carrier type of random access, a random access type of the random access, a synchronization signal block, or the like in an existing random access procedure. Therefore, in this solution, only one relative threshold needs to be configured for the terminal device, and the terminal device may determine the first threshold based on an existing threshold and the relative threshold, without a need to configure a separate threshold for each case. This reduces signaling overheads.

In the foregoing solution, the terminal device measures the RSRP after selecting the synchronization signal block, and when the RSRP meets a preset condition, selects the first random access preamble group associated with the sending manner in which the terminal device repeatedly sends the message 3. Then, the terminal device sends a random access preamble in the first random access preamble group to the network device, and the network device determines, based on the random access preamble, that the sending manner of the message 3 is that the terminal device repeatedly sends the message 3. Therefore, a resource may be appropriately scheduled for transmission of the message 3.

In addition, in the foregoing solution, the terminal device may determine the first threshold based on the relative threshold and the second threshold. Therefore, for different carriers, different access types, and different synchronization signal blocks, the terminal device may determine the first threshold in this manner, and does not need to configure a separate threshold for each case. This reduces signaling overheads.

The foregoing two manners of determining the random access preamble group may be combined. With reference to the first aspect, in some implementations of the first aspect, that a terminal device determines a first random access preamble group from at least two random access preamble groups includes: The terminal device receives indication information from the network device; the terminal device determines, based on the indication information, that the first random access preamble group is associated with the sending manner in which the terminal device repeatedly sends the message 3; the terminal device measures reference signal received power RSRP; and when the RSRP is less than a first threshold, the terminal device selects the first random access preamble group from the at least two random access preamble groups.

The random access preamble group in the foregoing solution may be alternatively replaced with a random access opportunity group. To be specific, different random access preambles may be grouped based on random access opportunities, or may be associated with different sending manners of the message 3 based on different random access opportunities. A specific solution is similar, and details are not described again.

With reference to the first aspect, in some implementations of the first aspect, the method further includes: The terminal device determines the relative threshold based on a maximum number of times of repeatedly sending the message 3, where the maximum number of times of repeatedly sending the message 3 is associated with the relative threshold; or the terminal device determines the relative threshold based on a number of random access preambles in the first random access preamble group, where the number of random access preambles in the first random access preamble group is associated with the relative threshold; or the terminal device determines the relative threshold based on a number of random access preambles in a first random access opportunity group, where the number of random access preambles in the first random access opportunity group is associated with the relative threshold; or the terminal device determines the relative threshold based on a maximum transmit power capability or a power class of the terminal device, where the maximum transmit power capability or the power class of the terminal device is associated with the relative threshold.

Based on the foregoing solution, the terminal device may determine the relative threshold based on the maximum number of times of repeatedly sending the message 3, the number of random access preambles in the random access preamble group, or the number of random access preambles in the random access opportunity group. Therefore, the relative threshold does not need to be configured by using dedicated signaling, so that signaling overheads can be reduced.

According to a second aspect, a random access method is provided. The method includes: A terminal device determines a sending manner of a message 3 for random access after selecting a synchronization signal block for the random access, where the sending manner of the message 3 includes that the terminal device repeatedly sends the message 3 or the terminal device does not repeatedly send the message 3; the terminal device determines a random access preamble from a first random access preamble group or a first random access opportunity group based on the sending manner of the message 3, where the first random access preamble group or the first random access opportunity group is associated with the sending manner of the message 3, and the synchronization signal block is associated with the first random access preamble group or the first random access opportunity group; and the terminal device sends the random access preamble to a network device.

That the terminal device repeatedly sends the message 3 includes one or more of the following cases: The terminal device expects to repeatedly send the message 3, the terminal device has a capability of repeatedly sending the message 3, the terminal device needs to repeatedly send the message 3, the terminal device expects to be scheduled to repeatedly send the message 3, or a number of times that the terminal device sends the message 3 is greater than 1.

That the terminal device does not repeatedly send the message 3 includes one or more of the following cases: The terminal device does not have the capability of repeatedly sending the message 3, the terminal device does not need to repeatedly send the message 3, the terminal device does not expect to repeatedly send the message 3, the terminal device does not expect to be scheduled to repeatedly send the message 3, or the number of times that the terminal device sends the message 3 is less than or equal to 1.

With reference to the second aspect, in some implementations of the second aspect, the terminal device determines the sending manner of the message 3 for the random access after selecting the synchronization signal block for the random access, where the sending manner of the message 3 indicates whether to repeatedly send the message 3, and the sending manner of the message 3 is associated with at least one of the following cases: The terminal device repeatedly sends the message 3, the terminal device does not repeatedly send the message 3, the number of times that the terminal device sends the message 3, the terminal device has the capability of repeatedly sending the message 3, the terminal device does not have the capability of repeatedly sending the message 3, the terminal device needs to repeatedly send the message 3, the terminal device does not need to repeatedly send the message 3, the terminal device expects to be scheduled to repeatedly send the message 3, or the terminal device does not expect to be scheduled to repeatedly send the message 3. The terminal device determines the random access preamble from the first random access preamble group or the first random access opportunity group based on the sending manner of the message 3, where the first random access preamble group or the first random access opportunity group is associated with the sending manner of the message 3, and the synchronization signal block is associated with the first random access preamble group or the first random access opportunity group.

Based on the foregoing solution, the terminal device may first determine the sending manner of the message 3, and then select the random access preamble group or the random access opportunity group based on the sending manner of the message 3. The random access preamble group or the random access preamble opportunity group is associated with the sending manner of the message 3. In other words, the terminal device selects, based on the sending manner of the message 3, the random access preamble group or the random access opportunity group associated with the sending manner of the message 3. In addition, in this implementation, the terminal device may determine the sending manner of the message 3 after selecting the synchronization signal block. In this way, in a subsequent random access procedure, the network device may determine the sending manner of the message 3 based on the random access preamble group or the random access opportunity group selected by the terminal device, so that resources can be scheduled for the terminal device more specifically, thereby facilitating effective resource utilization.

With reference to the second aspect, in some implementations of the second aspect, that a terminal device determines a sending manner of a message 3 for random access after selecting a synchronization signal block for the random access includes: The terminal device measures reference signal received power (RSRP); and when the RSRP is less than a first threshold, the terminal device determines to repeatedly send the message 3, where the first threshold is determined based on a second threshold and a relative threshold, and the second threshold is used to determine a carrier type of the random access, a random access type of the random access, or the synchronization signal block.

Based on the foregoing solution, the terminal device may determine the first threshold based on the relative threshold and the second threshold, and then determine the sending manner of the message 3 based on the first threshold. In this solution, the network device needs to configure only one relative threshold for the terminal device, and the terminal device may determine the first threshold based on the relative threshold and another existing threshold, without a need to allocate an independent threshold to each case (different carrier types, different random access manners, different synchronization signal blocks, or the like). This reduces signaling overheads.

With reference to the second aspect, in some implementations of the second aspect, the method further includes: The terminal device determines the relative threshold based on a maximum number of times of repeatedly sending the message 3, where the maximum number of times of repeatedly sending the message 3 is associated with the relative threshold; or the terminal device determines the relative threshold based on a number of random access preambles in the first random access preamble group, where the number of random access preambles in the first random access preamble group is associated with the relative threshold; or the terminal device determines the relative threshold based on a number of random access preambles in the first random access opportunity group, where the number of random access preambles in the first random access opportunity group is associated with the relative threshold; or the terminal device determines the relative threshold based on a maximum transmit power capability or a power class of the terminal device, where the maximum transmit power capability or the power class of the terminal device is associated with the relative threshold.

Based on the foregoing solution, the terminal device may determine the relative threshold based on the maximum number of times of repeatedly sending the message 3, the number of random access preambles in the random access preamble group, or the number of random access preambles in the random access opportunity group. Therefore, the relative threshold does not need to be configured by using dedicated signaling, so that signaling overheads can be reduced.

With reference to the second aspect, in some implementations of the second aspect, that a terminal device determines a sending manner of a message 3 for random access after selecting a synchronization signal block for the random access includes: The terminal device receives indication information from the network device, where the indication information indicates whether the network device supports repeated transmission of the message 3; and when the network device supports repeated transmission of the message 3 and the terminal device needs and supports repeated transmission of the message 3, the terminal device determines to repeatedly send the message 3.

According to a third aspect, a random access method is provided. The method includes: A terminal device determines a sending manner of a message 3 for random access after selecting an access type of the random access and/or before selecting a synchronization signal block for the random access, where the sending manner of the message 3 includes that the terminal device repeatedly sends the message 3 or the terminal device does not repeatedly send the message 3; the terminal device determines a random access preamble from a first random access preamble group or a first random access opportunity group based on the sending manner of the message 3, where the first random access preamble group or the first random access opportunity group is associated with the sending manner of the message 3, and the synchronization signal block is associated with the first random access preamble group or the first random access opportunity group; and the terminal device sends the random access preamble to a network device.

That the terminal device repeatedly sends the message 3 includes one or more of the following cases: The terminal device expects to repeatedly send the message 3, the terminal device has a capability of repeatedly sending the message 3, the terminal device needs to repeatedly send the message 3, the terminal device expects to be scheduled to repeatedly send the message 3, or a number of times that the terminal device sends the message 3 is greater than 1.

That the terminal device does not repeatedly send the message 3 includes one or more of the following cases: The terminal device does not have the capability of repeatedly sending the message 3, the terminal device does not need to repeatedly send the message 3, the terminal device does not expect to repeatedly send the message 3, the terminal device does not expect to be scheduled to repeatedly send the message 3, or the number of times that the terminal device sends the message 3 is less than or equal to 1.

With reference to the third aspect, in some implementations of the third aspect, the terminal device determines the sending manner of the message 3 after selecting the access type of the random access and/or before selecting the SSB for the random access, where the sending manner of the message 3 indicates whether to repeatedly send the message 3, and the sending manner of the message 3 is associated with at least one of the following cases: The terminal device repeatedly sends the message 3, the terminal device does not repeatedly send the message 3, the number of times that the terminal device sends the message 3, the terminal device has the capability of repeatedly sending the message 3, the terminal device does not have the capability of repeatedly sending the message 3, the terminal device needs to repeatedly send the message 3, the terminal device does not need to repeatedly send the message 3, the terminal device expects to be scheduled to repeatedly send the message 3, or the terminal device does not expect to be scheduled to repeatedly send the message 3. The terminal device determines the random access preamble from the first random access preamble group or the first random access opportunity group based on the sending manner of the message 3, where the first random access preamble group or the first random access opportunity group is associated with the sending manner of the message 3, and the synchronization signal block is associated with the first random access preamble group or the first random access opportunity group.

In this implementation, the terminal device determines the sending manner of the message 3 after selecting the random access type and/or before selecting the SSB for the random access, and then selects the random access preamble group or the random access opportunity group associated with the sending manner of the message 3. In this way, in a subsequent random access procedure, the network device may determine the sending manner of the message 3 based on the random access preamble group or the random access opportunity group selected by the terminal device, so that resources can be scheduled for the terminal device more specifically, thereby facilitating effective resource utilization.

According to a fourth aspect, a random access method is provided. The method includes: A terminal device determines a sending manner of a message 3 for random access after selecting a carrier for the random access and/or before selecting an access type of the random access, where the sending manner of the message 3 includes that the terminal device repeatedly sends the message 3 or the terminal device does not repeatedly send the message 3; the terminal device determines a random access preamble from a first random access preamble group or a first random access opportunity group based on the sending manner of the message 3, where the first random access preamble group or the first random access opportunity group is associated with the sending manner of the message 3, and the synchronization signal block is associated with the first random access preamble group or the first random access opportunity group; and the terminal device sends the random access preamble to a network device.

That the terminal device repeatedly sends the message 3 includes one or more of the following cases: The terminal device expects to repeatedly send the message 3, the terminal device has a capability of repeatedly sending the message 3, the terminal device needs to repeatedly send the message 3, the terminal device expects to be scheduled to repeatedly send the message 3, or a number of times that the terminal device sends the message 3 is greater than 1.

That the terminal device does not repeatedly send the message 3 includes one or more of the following cases: The terminal device does not have the capability of repeatedly sending the message 3, the terminal device does not need to repeatedly send the message 3, the terminal device does not expect to repeatedly send the message 3, the terminal device does not expect to be scheduled to repeatedly send the message 3, or the number of times that the terminal device sends the message 3 is less than or equal to 1.

With reference to the fourth aspect, in some implementations of the fourth aspect, the terminal device determines the sending manner of the message 3 after selecting the carrier for the random access and/or before selecting the access type of the random access, where the sending manner of the message 3 indicates whether to repeatedly send the message 3, and the sending manner of the message 3 is associated with at least one of the following cases: The terminal device repeatedly sends the message 3, the terminal device does not repeatedly send the message 3, the number of times that the terminal device sends the message 3, the terminal device has the capability of repeatedly sending the message 3, the terminal device does not have the capability of repeatedly sending the message 3, the terminal device needs to repeatedly send the message 3, the terminal device does not need to repeatedly send the message 3, the terminal device expects to be scheduled to repeatedly send the message 3, or the terminal device does not expect to be scheduled to repeatedly send the message 3. The terminal device determines the random access preamble from the first random access preamble group or the first random access opportunity group based on the sending manner of the message 3, where the first random access preamble group or the first random access opportunity group is associated with the sending manner of the message 3, and the synchronization signal block is associated with the first random access preamble group or the first random access opportunity group.

In this implementation, the terminal device determines the sending manner of the message 3 after selecting the carrier for the random access and/or before selecting the access type of the random access, and then selects the random access preamble group or the random access opportunity group associated with the sending manner of the message 3. In this way, in a subsequent random access procedure, the network device may determine the sending manner of the message 3 based on the random access preamble group or the random access opportunity group selected by the terminal device, so that resources can be scheduled for the terminal device more specifically, thereby facilitating effective resource utilization.

According to a fifth aspect, a random access method is provided. The method includes: A terminal device determines a sending manner of a message 3 for the random access before selecting a carrier for random access, where the sending manner of the message 3 includes that the terminal device repeatedly sends the message 3 or the terminal device does not repeatedly send the message 3; the terminal device determines a random access preamble from a first random access preamble group or a first random access opportunity group based on the sending manner of the message 3, where the first random access preamble group or the first random access opportunity group is associated with the sending manner of the message 3, and the synchronization signal block is associated with the first random access preamble group or the first random access opportunity group; and the terminal device sends the random access preamble to a network device.

That the terminal device repeatedly sends the message 3 includes one or more of the following cases: The terminal device expects to repeatedly send the message 3, the terminal device has a capability of repeatedly sending the message 3, the terminal device needs to repeatedly send the message 3, the terminal device expects to be scheduled to repeatedly send the message 3, or a number of times that the terminal device sends the message 3 is greater than 1.

That the terminal device does not repeatedly send the message 3 includes one or more of the following cases: The terminal device does not have the capability of repeatedly sending the message 3, the terminal device does not need to repeatedly send the message 3, the terminal device does not expect to repeatedly send the message 3, the terminal device does not expect to be scheduled to repeatedly send the message 3, or the number of times that the terminal device sends the message 3 is less than or equal to 1.

With reference to the fifth aspect, in some implementations of the fifth aspect, the terminal device determines the sending manner of the message 3 before selecting the access type of the random access, where the sending manner of the message 3 indicates whether to repeatedly send the message 3, and the sending manner of the message 3 is associated with at least one of the following cases: The terminal device repeatedly sends the message 3, the terminal device does not repeatedly send the message 3, the number of times that the terminal device sends the message 3, the terminal device has the capability of repeatedly sending the message 3, the terminal device does not have the capability of repeatedly sending the message 3, the terminal device needs to repeatedly send the message 3, the terminal device does not need to repeatedly send the message 3, the terminal device expects to be scheduled to repeatedly send the message 3, or the terminal device does not expect to be scheduled to repeatedly send the message 3. The terminal device determines the random access preamble from the first random access preamble group or the first random access opportunity group based on the sending manner of the message 3, where the first random access preamble group or the first random access opportunity group is associated with the sending manner of the message 3, and the synchronization signal block is associated with the first random access preamble group or the first random access opportunity group.

In this implementation, the terminal device determines the sending manner of the message 3 before selecting the access type of the random access, and then selects the random access preamble group or the random access opportunity group associated with the sending manner of the message 3. In this way, in a subsequent random access procedure, the network device may determine the sending manner of the message 3 based on the random access preamble group or the random access opportunity group selected by the terminal device, so that resources can be scheduled for the terminal device more specifically, thereby facilitating effective resource utilization.

According to a sixth aspect, a random access apparatus is provided. The apparatus includes: a processing module, configured to determine a first random access preamble group from at least two random access preamble groups, where the at least two random access preamble groups are associated with a sending manner of a message 3, the message 3 is used for random access, and the sending manner of the message 3 includes that the apparatus repeatedly sends the message 3 or the apparatus does not repeatedly send the message 3, at least one of the at least two random access preamble groups is associated with repeatedly sending the message 3 by the apparatus, and the processing module is further configured to determine a random access preamble from the first random access preamble group; and a transceiver module, configured to send the random access preamble to a network device.

With reference to the sixth aspect, in some implementations of the sixth aspect, the apparatus includes: the processing module, configured to determine the first random access preamble group from the at least two random access preamble groups, where the at least two random access preamble groups are associated with the sending manner of the message 3 in a random access procedure, the sending manner of the message 3 indicates whether to repeatedly send the message 3, and the sending manner of the message 3 is associated with at least one of the following cases: The apparatus repeatedly sends the message 3, the apparatus does not repeatedly send the message 3, a number of times that the apparatus sends the message 3, the apparatus has a capability of repeatedly sending the message 3, the apparatus does not have the capability of repeatedly sending the message 3, the apparatus needs to repeatedly send the message 3, the apparatus does not need to repeatedly send the message 3, the apparatus expects to be scheduled to repeatedly send the message 3, and the apparatus does not expect to be scheduled to repeatedly send the message 3. At least one of the at least two random access preamble groups is associated with a sending manner in which the apparatus repeatedly sends the message 3. The processing module is further configured to determine the random access preamble from the first random access preamble group.

With reference to the sixth aspect, in some implementations of the sixth aspect, the apparatus further includes the transceiver module. The transceiver module is configured to receive indication information from the network device. The processing module is configured to: determine, based on the indication information, that the first random access preamble group is associated with the sending manner in which the apparatus repeatedly sends the message 3; and when the sending manner of the message 3 is that the apparatus repeatedly sends the message 3, determine the first random access preamble group from the at least two random access preamble groups.

With reference to the sixth aspect, in some implementations of the sixth aspect, the processing module is configured to: measure reference signal received power (RSRP); and when the RSRP is less than a first threshold, determine the first random access preamble group from the at least two random access preamble groups, where the first random access preamble group is associated with repeatedly sending the message 3 by the apparatus, the first threshold is determined based on a second threshold and a relative threshold, and the second threshold is used to determine a carrier type of the random access, a random access type of the random access, or a synchronization signal block.

With reference to the sixth aspect, in some implementations of the sixth aspect, the processing module is further configured to: determine the relative threshold based on a maximum number of times of repeatedly sending the message 3, where the maximum number of times of repeatedly sending the message 3 is associated with the relative threshold; or determine the relative threshold based on a number of random access preambles in the first random access preamble group, where the number of random access preambles in the first random access preamble group is associated with the relative threshold; determine the relative threshold based on a number of random access preambles in a first random access opportunity group, where the number of random access preambles in the first random access opportunity group is associated with the relative threshold; or determine the relative threshold based on a maximum transmit power capability or a power class of the apparatus, where the maximum transmit power capability or the power class of the apparatus is associated with the relative threshold.

According to a seventh aspect, a random access apparatus is provided. The apparatus includes: a processing module, configured to determine a sending manner of a message 3 for random access after selecting a synchronization signal block for the random access, where the sending manner of the message 3 includes that the apparatus repeatedly sends the message 3 or the apparatus does not repeatedly send the message 3, the processing module is further configured to determine a random access preamble from a first random access preamble group or a first random access opportunity group based on the sending manner of the message 3, the first random access preamble group or the first random access opportunity group is associated with the sending manner of the message 3, and the synchronization signal block is associated with the first random access preamble group or the first random access opportunity group; and a transceiver module, where the transceiver module is configured to send the random access preamble to a network device.

With reference to the seventh aspect, in some implementations of the seventh aspect, the apparatus includes: the processing module, configured to determine the sending manner of the message 3 for the random access after selecting the synchronization signal block for the random access, where the sending manner of the message 3 indicates whether to repeatedly send the message 3, and the sending manner of the message 3 is associated with at least one of the following cases: The apparatus repeatedly sends the message 3, the apparatus does not repeatedly send the message 3, a number of times that the apparatus sends the message 3, the apparatus has a capability of repeatedly sending the message 3, the apparatus does not have the capability of repeatedly sending the message 3, the apparatus needs to repeatedly send the message 3, the apparatus does not need to repeatedly send the message 3, the apparatus expects to be scheduled to repeatedly send the message 3, and the apparatus does not expect to be scheduled to repeatedly send the message 3. The processing module is further configured to determine the random access preamble from the first random access preamble group or the first random access opportunity group based on the sending manner of the message 3, where the first random access preamble group or the first random access opportunity group is associated with the sending manner of the message 3, and the synchronization signal block is associated with the first random access preamble group or the first random access opportunity group.

With reference to the seventh aspect, in some implementations of the seventh aspect, the processing module is configured to: measure reference signal received power RSRP; and when the RSRP is less than a first threshold, determine to repeatedly send the message 3, where the first threshold is determined based on a second threshold and a relative threshold, and the second threshold is used to determine a carrier type of the random access, a random access type of the random access, or the synchronization signal block.

With reference to the seventh aspect, in some implementations of the seventh aspect, the processing module is further configured to: determine the relative threshold based on a maximum number of times of repeatedly sending the message 3, where the maximum number of times of repeatedly sending the message 3 is associated with the relative threshold; or determine the relative threshold based on a number of random access preambles in the first random access preamble group, where the number of random access preambles in the first random access preamble group is associated with the relative threshold; determine the relative threshold based on a number of random access preambles in a first random access opportunity group, where the number of random access preambles in the first random access opportunity group is associated with the relative threshold; or determine the relative threshold based on a maximum transmit power capability or a power class of the apparatus, where the maximum transmit power capability or the power class of the apparatus is associated with the relative threshold.

With reference to the seventh aspect, in some implementations of the seventh aspect, the apparatus further includes the transceiver module. The transceiver module is configured to receive indication information from the network device, where the indication information indicates whether the network device supports repeated transmission of the message 3. The processing module is configured to: when the network device supports repeated transmission of the message 3 and the apparatus needs and supports repeated sending of the message 3, determine to repeatedly send the message 3.

According to an eighth aspect, a random access apparatus is provided. The apparatus includes: a processing module, configured to determine a sending manner of a message 3 for random access after selecting an access type of the random access and/or before selecting a synchronization signal block for the random access, where the sending manner of the message 3 includes that the apparatus repeatedly sends the message 3 or the apparatus does not repeatedly send the message 3, the processing module is further configured to determine a random access preamble from a first random access preamble group or a first random access opportunity group based on the sending manner of the message 3, the first random access preamble group or the first random access opportunity group is associated with the sending manner of the message 3, and the synchronization signal block is associated with the first random access preamble group or the first random access opportunity group; and a transceiver module, configured to send the random access preamble to a network device.

According to a ninth aspect, a random access apparatus is provided. The apparatus includes: a processing module, configured to determine a sending manner of a message 3 for random access after selecting a carrier for the random access and/or before selecting an access type of the random access, where the sending manner of the message 3 includes that the apparatus repeatedly sends the message 3 or the apparatus does not repeatedly send the message 3, the processing module is further configured to determine a random access preamble from a first random access preamble group or a first random access opportunity group based on the sending manner of the message 3, the first random access preamble group or the first random access opportunity group is associated with the sending manner of the message 3, and the synchronization signal block is associated with the first random access preamble group or the first random access opportunity group; and a transceiver module, configured to send the random access preamble to a network device.

According to a tenth aspect, a random access apparatus is provided. The apparatus includes: a processing module, configured to determine a sending manner of a message 3 for random access before selecting a carrier for the random access, where the sending manner of the message 3 includes that the apparatus repeatedly sends the message 3 or the apparatus does not repeatedly send the message 3, the processing module is further configured to determine a random access preamble from a first random access preamble group or a first random access opportunity group based on the sending manner of the message 3, the first random access preamble group or the first random access opportunity group is associated with the sending manner of the message 3, and the synchronization signal block is associated with the first random access preamble group or the first random access opportunity group; and a transceiver module, configured to send the random access preamble to a network device.

According to an eleventh aspect, a communication apparatus is provided. The apparatus includes a processor, configured to execute a computer program stored in a memory, so that the communication apparatus performs any possible implementation of the first aspect to the fifth aspect.

According to a twelfth aspect, a computer-readable storage medium is provided. The computer-readable storage medium stores a computer program. When the computer program runs on a computer, the computer is enabled to perform any possible implementation of the first aspect to the fifth aspect.

According to a thirteenth aspect, a computer program product is provided. The computer program product includes computer program instructions, and when the computer program instructions are run on a computer, the computer is enabled to perform the method according to any one of the first aspect to the fifth aspect.

According to a fourteenth aspect, a chip system is provided. The chip system includes a processor, configured to invoke a computer program from a memory and run the computer program, so that a communication device installed with the chip system performs any possible implementation of the first aspect to the fifth aspect.

DESCRIPTION OF EMBODIMENTS

The following describes technical solutions of this application with reference to accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5G system or a new radio (NR) system, a 6th generation (6G) system, or a future communication system. A 5G mobile communication system in this application includes a non-standalone (NSA) 5G mobile communication system or a standalone (SA) 5G mobile communication system. Alternatively, the communication system may be a public land mobile network (PLMN), a device-to-device (D2D) communication system, a machine-to-machine (M2M) communication system, an Internet of things (IOT) communication system, or another communication system.

Figure 1:
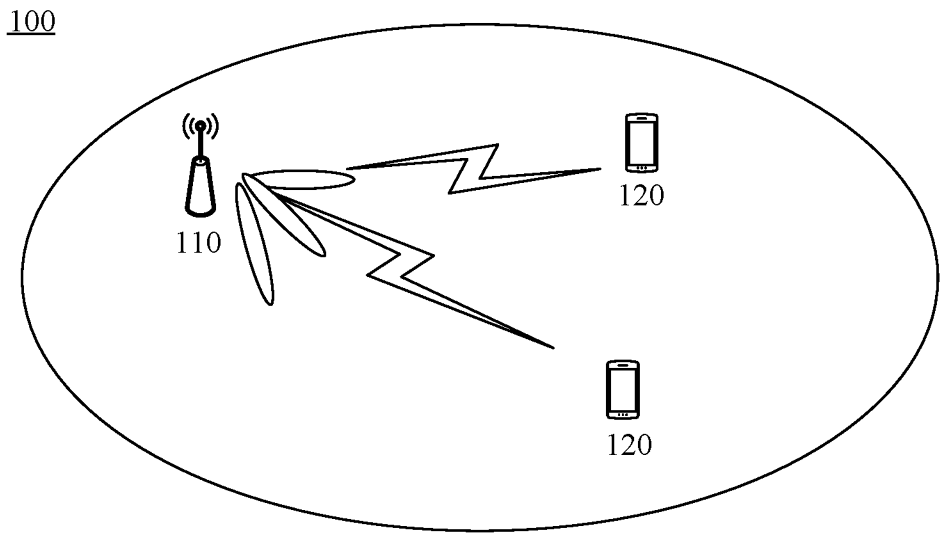
FIG. 1 is a schematic diagram of a communication system to which an embodiment of this application is applied.

FIG. 1 is a schematic diagram of a communication system applicable to a method according to an embodiment of this application. As shown in the figure, the communication system may include at least one radio access network device, for example, a radio access network device 110 shown in FIG. 1. The communication system may further include at least one terminal device, for example, a terminal device 120 shown in FIG. 1. The radio access network device 110 may communicate with the terminal device 120 through a radio link.

A plurality of antennas may be configured for each communication device, for example, the radio access network device 110 or the terminal device 120 in FIG. 1. The plurality of antennas may include at least one transmit antenna configured to send a signal and at least one receive antenna configured to receive a signal. In addition, each communication device further includes a transmitter chain and a receiver chain. A person of ordinary skill in the art may understand that each communication device may include a plurality of components (for example, a processor, a modulator, a multiplexer, a demodulator, a demultiplexer, or an antenna) related to signal sending and receiving. Therefore, the radio access network device and the terminal device may communicate with each other by using a multi-antenna technology.

It should be understood that the radio access network device in the wireless communication system may be any device having a wireless transceiver function. The device includes but is not limited to an evolved NodeB (eNB), a radio network controller (RNC), a NodeB (NB), a base station controller (BSC), a base transceiver station (BTS), a home base station (for example, Home evolved NodeB, or Home NodeB, HNB), a baseband unit (BBU), an access point (AP) in a wireless fidelity (Wi-Fi) system, a wireless relay node, a wireless backhaul node, a transmission point (TP) or a transmission and reception point (TRP), or the like. Alternatively, the device may be a gNB or a transmission point (TRP or TP) in a 5G system such as NR, or one or a group of antenna panels (including a plurality of antenna panels) of a base station in a 5G system. Alternatively, the device may be a network node constituting a gNB or a transmission point, such as a baseband unit (BBU) or a distributed unit (DU).

In some deployments, a gNB may include a central unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer; and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in the architecture, higher layer signaling such as RRC layer signaling may also be considered as being sent by the DU or sent by the DU and the CU. It may be understood that the radio access network device may be a CU node, a DU node, or a device including a CU node and a DU node. In addition, the CU may be divided into a radio access network device in a radio access network (RAN), or the CU may be divided into a radio access network device in a core network (CN). This is not limited in this application.

It should be further understood that the terminal device in the wireless communication system may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone (mobile phone), a tablet computer (pad), a computer with wireless receiving and sending functions, a virtual reality (VR) terminal device, an augmented reality (AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in embodiments of this application.

In addition, aspects or features of this application may be implemented as a method, an apparatus, or a product that uses standard programming and/or engineering technologies. The term "product" used in this application may cover a computer program that can be accessed from any computer-readable component, carrier, or medium. For example, the computer-readable medium may include but is not limited to: a magnetic storage device (for example, a hard disk, a floppy disk, or a magnetic tape), an optical disc (for example, a compact disc (CD) and a digital versatile disc (DVD)), a smart card, and a flash memory device (for example, an erasable programmable read-only memory (EPROM), a card, a stick, or a key driver). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

Figure 2:
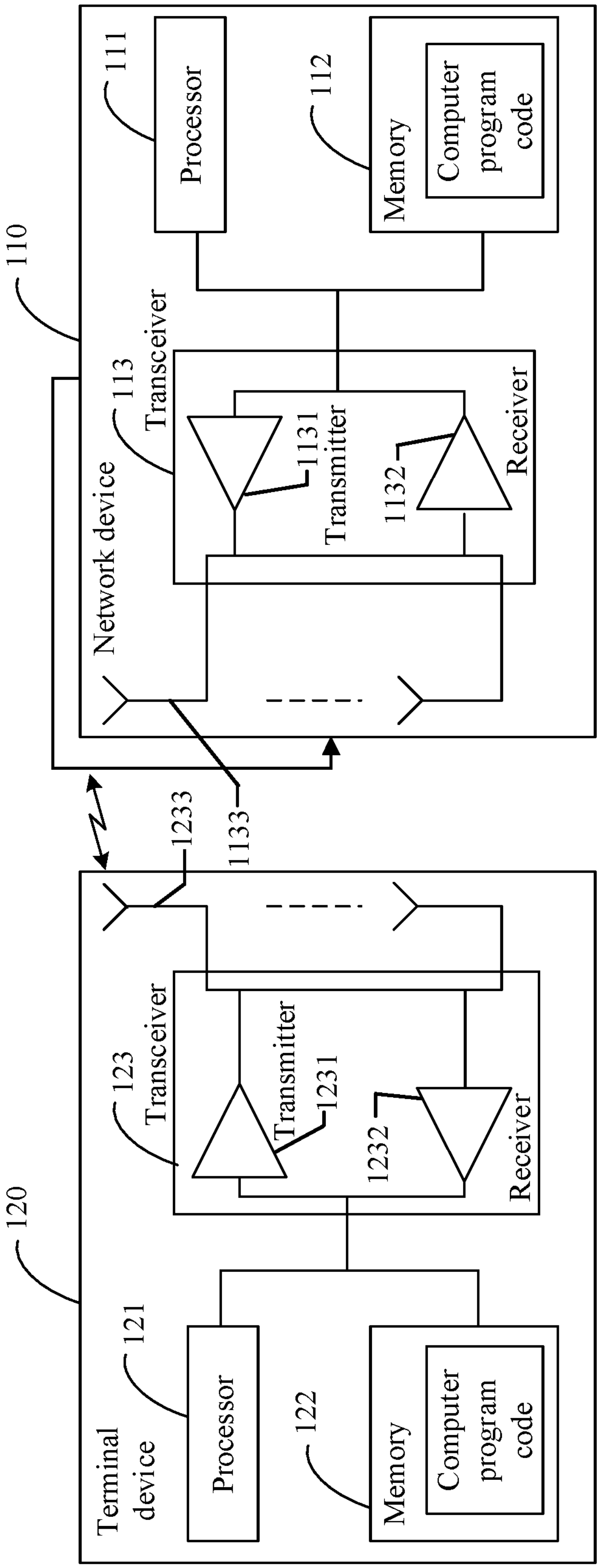
FIG. 2 is another schematic diagram of a communication system to which an embodiment of this application is applied.

Communication between the radio access network device 110 and the terminal device 120 in the communication system shown in FIG. 1 may alternatively be represented in another form. As shown in FIG. 2, the terminal device 120 includes a processor 121, a memory 122, and a transceiver 123. The transceiver 123 includes a transmitter 1231, a receiver 1232, and an antenna 1233. The radio access network device 110 includes a processor 111, a memory 112, and a transceiver 113. The transceiver 113 includes a transmitter 1131, a receiver 1132, and an antenna 1133. The receiver 1232 may be configured to receive transmission control information through the antenna 1233, and the transmitter 1231 may be configured to send transmission feedback information to the radio access network device 110 through the antenna 1233. The transmitter 1131 may be configured to send the transmission control information to the terminal device 120 through the antenna 1133, and the receiver 1132 may be configured to receive, through the antenna 1133, the transmission feedback information sent by the terminal device 120.

It should be noted that embodiments of this application may be applied to a communication system including one or more network devices, or may be applied to a communication system including one or more terminals. This is not limited in this application.

It should be understood that the communication system may include one or more network devices. One network device may send data or control signaling to one or more terminals. Alternatively, a plurality of network devices may simultaneously send data or control signaling to one or more terminals.

To facilitate understanding of embodiments of this application, related technical content in this application is briefly described first.

1. Random Access (RA):

In an LTE or 5G communication system with access control, the random access is an information exchange mechanism (or process) used for establishing a connection between a device that does not access a network and the network. Because a random access procedure is carried by a random access channel (RACH), the RA and the RACH are often mixed in protocols and oral language. The random access is divided into contention-based random access and non-contention random access. The contention-based random access is usually divided into four steps, where each step corresponds to one message, including a message 1, a message 2, a message 3, and a message 4, which respectively carry different signaling or information. The non-contention random access includes only the first two steps. In addition, to reduce access time of the four-step contention-based random access, there is further two-step random access. In the two-step random access, a message A (MsgA) and a message B (MsgB) are included. The message A includes a preamble and a first piece of data information (for example, similar to the message 1 and the message 3 in the four-step random access), and the message B includes contention resolution and uplink scheduling (for example, similar to the message 2 and the message 4 in the four-step random access).

2. Random Access Opportunity:

The random access opportunity is also referred to as a random access resource (RACH resource) or a random access occasion (RACH occasion/RACH transmission occasion/RACH opportunity/RACH chance, RO), and is a time or frequency resource used to carry one or more random access preambles. Logically, a random access opportunity is used to carry information/signals of a physical random access channel (PRACH), and sometimes is equivalently referred to as a physical random access opportunity or a physical random access resource (PRACH resource).

3. Reference Signal (RS):

Based on a function, the reference signal is also referred to as a demodulation reference signal (DMRS), a channel state information reference signal (CSI-RS), a phase tracking reference signal (PTRS), a channel sounding reference signal (SRS), or the like. A transmit end or a receive end knows or can infer, according to a predetermined rule, time and frequency locations of a signal and a signal/symbol carried in time and frequency. The reference signal is used to obtain a known signal that is affected by an external environment (for example, a spatial channel, or non-ideality of a transmit or receive end device) in signals during transmission, and is usually used for channel estimation, auxiliary signal demodulation, and detection. For example, a DMRS and a CSI-RS are used to obtain channel information, and a PTRS is used to obtain phase variation information.

4. Reference Signal Quality:

The reference signal quality is used to measure strength of a received signal, or the like. For example, reference signal received power (RSRP) is an average value of power of signals received on all resource elements carrying a reference signal in a symbol. A received signal strength indicator (RSSI) is an average value of power of all signals received in a symbol in a resource block dimension (including a reference signal, a data signal, interference, noise, and the like). Reference signal received quality (RSRQ) may be obtained based on the RSSI and the RSRP. For example, $RSRQ=NRB\times RSRP/RSSI$. A number of resource blocks (NRB) is a bandwidth of a target signal corresponding to the RSSI.

5. Resource Block (RB):

The resource block is also referred to as a physical resource block (block), and is a basic unit of a frequency resource in an orthogonal frequency division multiplexing (OFDM)-based communication system. One resource block usually includes N resource elements (RE), and one resource element is also referred to as one subcarrier. Generally, N is 12. Several resource blocks form a resource block group (RBG), which is also referred to as a physical resource block group. Generally, precoding is performed in a unit of a resource block or a resource block group, and a basic unit for performing precoding sending is also referred to as a precoding resource block group (PRG). One precoding resource group may be not less than one resource block group.

6. Downlink Control Information (DCI):

Information carried on a physical downlink control channel (PDCCH) is referred to as downlink control information (DCI). The DCI may be used to send information such as downlink or uplink scheduling, resource allocation, power control, and retransmission indication. The DCI may indicate information at a terminal device level, and may be scrambled by using a cell radio network temporary identifier (C-RNTI). Alternatively, the DCI may indicate information at a cell level, and may be scrambled by using a system information radio network temporary identifier (SI-RNTI), a paging radio network temporary identifier (P-RNTI), a random access radio network temporary identifier (RA-RNTI), or the like.

7. Time-Frequency Resource:

In embodiments of this application, data or information may be carried on a time-frequency resource, and the time-frequency resource may include a resource in time domain and a resource in frequency domain. In time domain, the time-frequency resource may include one or more time domain units (which may also be referred to as time units), and in frequency domain, the time-frequency resource may include a frequency domain unit.

A time domain unit (which may also be referred to as a time unit) may be a symbol, a mini-slot (Mini-slot), a slot (slot), or a subframe (subframe). Duration of a subframe in time domain may be 1 millisecond (ms). One slot includes 7 or 14 symbols. One mini-slot may include at least one symbol (for example, 2 symbols, 7 symbols, or 14 symbols, or any number of symbols fewer than or equal to 14 symbols). The listed values of the time domain unit are merely for ease of understanding of the solutions of this application, and should not be understood as a limitation on this application. It may be understood that the time domain unit may have another value. This is not limited in this application.

A frequency domain unit may be a resource block, a resource block group, or a predefined subband (subband).

Figure 3:
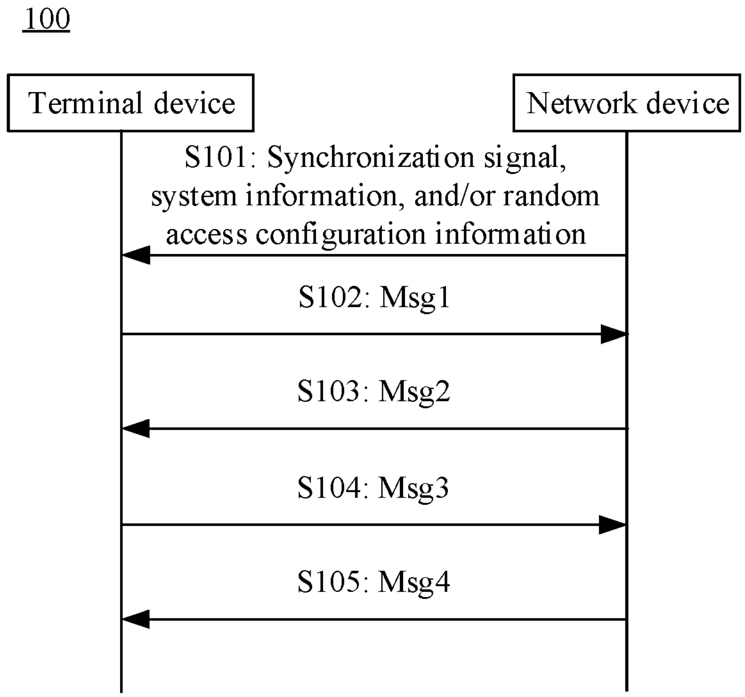
FIG. 3 is a schematic flowchart of four-step random access.

8. Four-Step Random Access (4-Step RA):

One random access manner is the four-step random access. The four-step random access is merely used to represent a name of a random access manner, and a specific name of the four-step random access does not constitute a limitation on the scope of embodiments of this application. Four-step information exchange (a Msg1, a Msg2, a Msg3, and a Msg4) needs to be performed between a terminal device and a network device. A basic procedure 100 of a four-step random access procedure is shown in FIG. 3. The following describes the procedure 100 by using an example.

S101: The network device sends a synchronization signal, system information, and/or random access configuration information to the terminal device.

Before the four-step random access procedure, the network device sends the synchronization signal and the system information at a specific location in a broadcast manner. In NR, a synchronization signal sent by a base station is referred to as a synchronization/broadcast signal block (SSB) (or represented as an SS/PBCH block). The SSB and the system information are periodically sent by the network device based on a configuration.

Optionally, the network device may further send the random access configuration information to the terminal device, so that the terminal device determines information such as a random access preamble (random access preamble) index, a time-frequency resource, and a power configuration.

S102: The terminal device sends the Msg1 to the network device.

After being powered on or when the terminal device needs to re-access a network, the terminal device scans the synchronization signal of the network device, performs downlink time and frequency synchronization, and receives configuration information (the random access configuration information), in the system information, that is related to a random access resource.

The terminal device selects, based on the random access configuration information and the synchronized SSB, the random access resource associated with the SSB, where the resource includes a time resource, a frequency resource, and a code domain resource (the random access preamble (preamble)); and sends a random access signal by using the random access resource, where the random access signal is also referred to as the message 1 (Msg1). The Msg1, namely, a random access preamble (preamble or sequence), is carried by using a PRACH, and is usually used to initiate a connection request, a handover request, a synchronization request, or a scheduling request between a device and a network.

Figure 4:
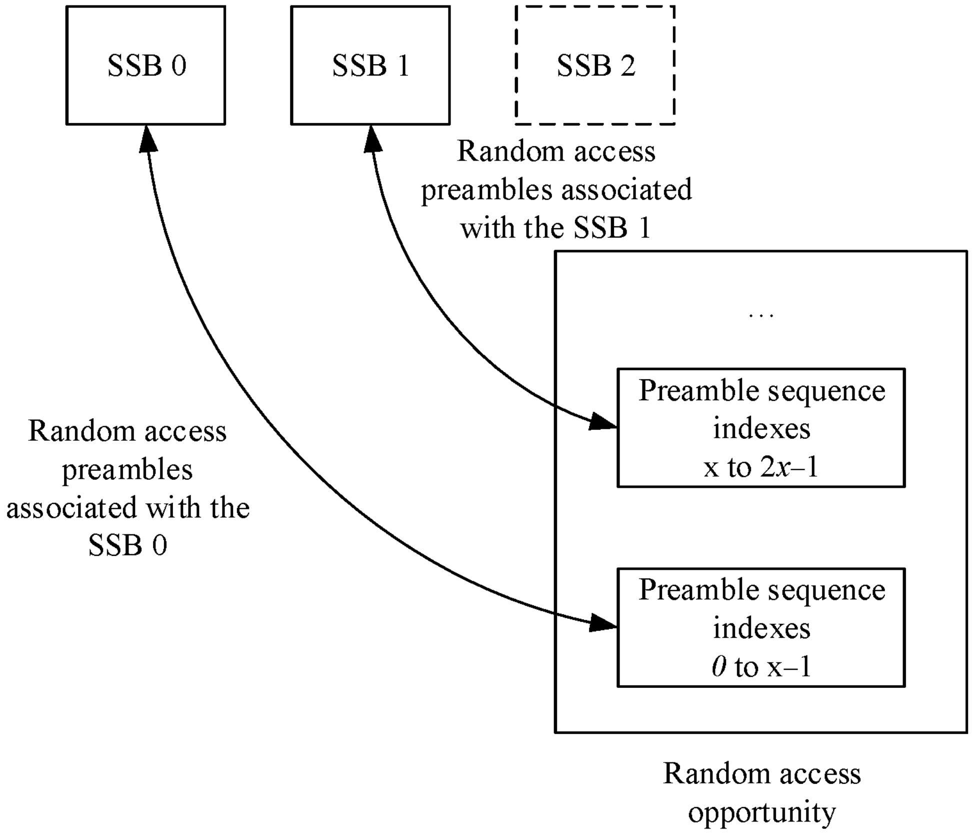
FIG. 4 is a schematic diagram of an association relationship between an SSB and a random access preamble.
Figure 5:
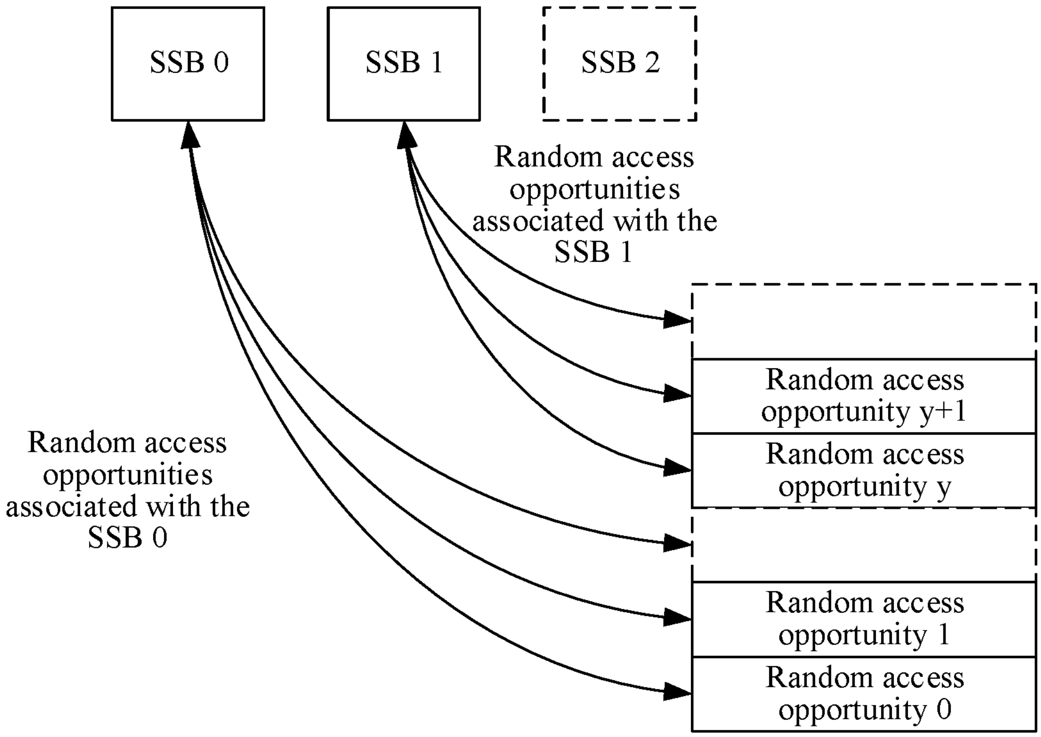
FIG. 5 is a schematic diagram of another association relationship between an SSB and a random access preamble.

FIG. 4 and FIG. 5 are schematic diagrams of two association relationships between an SSB and a random access preamble. In the association relationship shown in FIG. 4, a plurality of SSBs are associated with different random access preamble sequences in a same random access opportunity, and different SSBs may be distinguished by using preamble sequence indexes. In the association relationship shown in FIG. 5, one SSB is associated with a plurality of random access opportunities.

In an implementation, preambles in a random access opportunity associated with K (K≥1) SSBs are used only for the 4-step RA. A×K random access preambles are used for non-repeated sending of the message 3, B×K random access preambles are used for repeated sending of the message 3, and A and B are integers. For example, preambles whose indexes are 0 to A×K−1 may be used for non-repeated sending of the message 3, and preambles whose indexes are A×K to A×K+B×K−1 are used for repeated sending of the message 3. Preambles whose indexes are A×k to A×(k+1)−1 and A×K+B×k to A×K+B×(k+1)−1 are associated with a kth SSB, and k=0 to K−1 are indexes of the K SSBs associated with the random access opportunity. For another example, preambles whose indexes are 0 to (A+B)×K−1 may alternatively be used to associate with the K SSBs, and each SSB is associated with (A+B) random access preambles, where A random access preambles are used for repeated sending of the message 3, and B random access preambles are used for non-repeated sending of the message 3. Specifically, preambles whose indexes are (A+B)×k to (A+B)×(k+1)−1 are associated with a kth SSB, preambles whose indexes are (A+B)×k to (A+B)×k+A−1 are used for non-repeated sending of the message 3, preambles whose indexes are (A+B)×k+A to (A+B)×(k+1)−1 are used for repeated sending of the message 3, and k=0 to K−1 are indexes of the K SSBs associated with the random access opportunity.

In an implementation, preambles in a random access opportunity associated with K (K≥1) SSBs are used only for the 2-step RA. A×K random access preambles are used for non-repeated sending of the message A, B×K random access preambles are used for repeated sending of the message A, and A and B are integers. For example, preambles whose indexes are 0 to A×K−1 may be used for non-repeated sending of the message A, and preambles whose indexes are A×K to A×K+B×K−1 are used for repeated sending of the message A. Preambles whose indexes are A×k to A×(k+1)−1 and A×K+B×k to A×K+B×(k+1)−1 are associated with a kth SSB, and k=0 to K−1 are indexes of the K SSBs associated with the random access opportunity. For another example, preambles whose indexes are 0 to (A+B)×K−1 may alternatively be used to associate with the K SSBs, and each SSB is associated with (A+B) random access preambles, where A random access preambles are used for repeated sending of the message A, and B random access preambles are used for non-repeated sending of the message A. Specifically, preambles whose indexes are (A+B)×k to (A+B)×(k+1)−1 are associated with a kth SSB, preambles whose indexes are (A+B)×k to (A+B)×k+A−1 are used for non-repeated sending of the message A, preambles whose indexes are (A+B)×k+A to (A+B)×(k+1)−1 are used for repeated sending of the message A, and k=0 to K−1 are indexes of the K SSBs associated with the random access opportunity.

In an implementation, for preambles in a random access opportunity associated with K (K≥1) SSBs, MK random access preambles are used for the 4-step RA, and NK random access preambles are used for the 2-step RA. All the random access preambles are used for non-repeated sending of the message 3 or the message A.

In an implementation, for preambles in a random access opportunity associated with K (K≥1) SSBs, MK random access preambles are used for the 4-step RA, and NK random access preambles are used for the 2-step RA. In the MK random access preambles used for the 4-step RA, AK random access preambles are used for non-repeated sending of the message 3, BK random access preambles are used for repeated sending of the message 3, and A+B≤M (details are the same as those in the foregoing embodiment). In addition, all the NK preambles used for the 2-step RA correspond to non-repeated sending of the message A.

In an implementation, for preambles in a random access opportunity associated with K (K≥1) SSBs, MK random access preambles are used for the 4-step RA, and NK random access preambles are used for the 2-step RA. In the NK random access preambles used for the 2-step RA, AK random access preambles are used for non-repeated sending of the message A, BK random access preambles are used for repeated sending of the message A, and A+BEN (details are the same as those in the foregoing embodiment). In addition, all the MK preambles used for the 4-step RA correspond to non-repeated sending of the message 3.

In the NR, the SSB is associated with the random access resource, so that after detecting the random access preamble, the network device can obtain a downlink beam for sending the message 2 (Msg2).

S103: The network device sends the Msg2 to the terminal device.

After receiving the Msg1 sent by the terminal device, the network device estimates timing advance of the terminal device based on the preamble sent by the terminal device, and returns the message 2 (Msg2) to the terminal device. The Msg2 includes configuration information such as a time-frequency resource location and a modulation and coding scheme that are used by the terminal device to send the message 3 (Msg3) for conflict resolution.

The Msg2 is also referred to as a random access response (RAR) message, and is a response of the network device to the received Msg1. One Msg2 may respond to a plurality of Msg1s. For a single random access preamble, there is a specific random access response message at a media access MAC layer. However, the network device usually encapsulates responses to all random access preambles detected on one random access opportunity together to form one Msg2. In other words, the network device may respond to a plurality of Msg1s in a same Msg2, that is, a plurality of RARs are included. To be specific, the RAR may be referred to as a message 2 at both a physical layer and the MAC layer, but is generally referred to as a response message corresponding to a specific random access preamble (for example, a random access preamble sent by the terminal) at the physical layer. At the MAC layer, the RAR is a combination of all random access preamble response messages detected by the base station for one random access opportunity or a plurality of random access opportunities, and is assembled in a form of a MAC data unit.

The RAR includes at least one of the following information: an index (random access preamble identity, RAPID) of the Msg1, an uplink scheduling grant (uplink grant), timing advance (timing advance), a temporary cell-radio network temporary identifier (TC-RNTI), and the like.

After sending the random access preamble, the terminal device searches the corresponding Msg2 for a random access response message corresponding to the random access preamble sent by the terminal device, and ignores a response message for another random access preamble.

S104: The terminal device sends the Msg3 to the network device.

After receiving the Msg2, the terminal device sends the message 3 on a corresponding time-frequency resource based on a configuration in the Msg2. Transmission of the Msg3 is also referred to as first uplink scheduling transmission, and is transmission scheduled by using a UL grant in the message 2, or retransmission scheduled by using DCI scrambled by the TC-RNTI. Content transmitted in the Msg3 is a higher layer message, for example, a connection establishment request message (which may be identification information of a user initiating a connection request). This message is used for contention resolution. If a plurality of different devices use a same Msg1 for random access, a Msg3 and a Msg4 may be used together to determine whether a conflict occurs. Transmission of the message 3 includes retransmission and power control (in other words, there is power control information in a UL grant for scheduling initial transmission or retransmission).

S105: The network device sends the Msg4 to the terminal device.

After receiving the message 3, the base station returns the message 4 (Msg4) to the user, indicating that the terminal user successfully performs access.

The Msg4 is used for contention resolution, and usually includes a CCCH SDU carried in the message 3. If the terminal device detects, in the message 4, a CCCH SDU sent by the terminal device, the terminal device considers that contention-based random access succeeds, and continues to perform a subsequent communication process. The message 4 may be retransmitted. To be specific, there is a corresponding physical uplink control channel (PUCCH) for transmitting feedback information (which indicates whether the message 4 is successfully detected), where there is power control in the feedback information sent by the terminal device on the PUCCH.

The Msg1, the Msg3, and the Msg4 may be retransmitted (for example, retransmitted after transmission fails).

Figure 6:
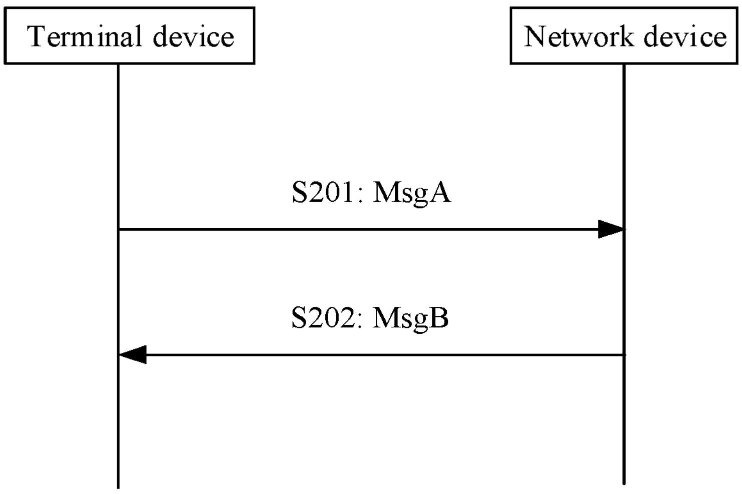
FIG. 6 is a schematic flowchart of two-step random access.

9. Two-Step Random Access (2-Step RA):

One random access manner is the two-step random access. Two-step information exchange (a MsgA and a MsgB) needs to be performed between a terminal device and a network device. A basic procedure 200 of a two-step random access procedure is shown in FIG. 6. The following describes the procedure 200 by using an example.

S201: The terminal device sends the message A (MsgA) to the network device.

The MsgA includes a random access preamble and a first piece of data information.

S202: The network device sends the MsgB to the terminal device.

The network device sends a random access response MsgB to the terminal device, where the MsgB includes contention resolution and uplink scheduling.

Figure 7:
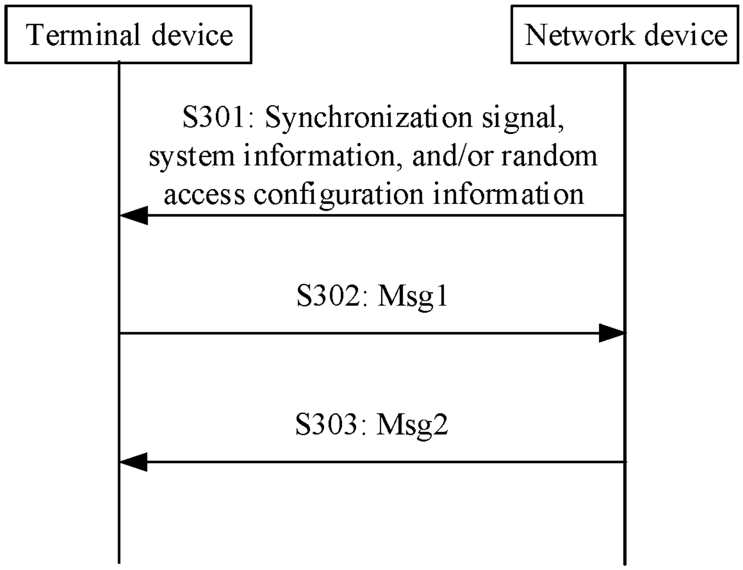
FIG. 7 is a schematic flowchart of non-contention random access.

10. Contention-Based and Non-Contention Random Access:

Based on whether a conflict may occur between different terminal devices in a random access procedure, there are two types of random access procedures: a contention-based (contention-based) random access procedure and a non-contention (contention-free, non-contention) random access procedure. The non-contention random access procedure mainly includes two steps. A non-contention random access procedure 300 is shown in FIG. 7. The following describes the procedure 300 by using an example.

S301: The network device sends a synchronization signal, system information, and/or random access configuration information to the terminal device.

S301 is similar to S101 in the procedure 100, and details are not described again.

S302: The terminal device sends the Msg1 to the network device.

The terminal device sends a random access preamble to the network device, where the random access preamble is also referred to as the Msg1. For the non-contention random access, the random access preamble is dedicated to the terminal device, and therefore no conflict exists.

S303: The network device sends the Msg2 to the terminal device.

The network device sends a random access response to the terminal device, where the random access response is also referred to as the Msg2.

It should be noted that the two-step random access procedure shown in FIG. 6 and the non-contention random access procedure shown in FIG. 7 each include two steps, but are different in specific transmission manners and specific message content.

In the four-step random access procedure, some terminal devices need to repeatedly transmit the Msg3 to perform coverage enhancement. In this case, how to enable the network device to appropriately schedule resources for different Msg3 transmission manners is a problem that needs to be considered.

In an implementation, the terminal device determines a first random access preamble group from at least two random access preamble groups. The at least two random access preamble groups are associated with a sending manner of the message 3 in a random access procedure. The sending manner of the message 3 includes the following: The terminal device repeatedly sends the message 3, or the terminal device does not repeatedly send the message 3. At least one of the at least two random access preamble groups is associated with a sending manner in which the terminal device repeatedly sends the message 3. The terminal device determines a random access preamble from the first random access preamble group. The terminal device sends the random access preamble to the network device.

That the terminal device repeatedly sends the message 3 includes one or more of the following cases: The terminal device has a capability of repeatedly sending the message 3, the terminal device needs to repeatedly send the message 3, the terminal device expects to repeatedly send the message 3, the terminal device expects to be scheduled to repeatedly send the message 3, or a number of times that the terminal device sends the message 3 is greater than 1.

That the terminal device does not repeatedly send the message 3 includes one or more of the following cases: The terminal device does not have the capability of repeatedly sending the message 3, the terminal device does not need to repeatedly send the message 3, the terminal device does not expect to repeatedly send the message 3, the terminal device does not expect to be scheduled to repeatedly send the message 3, or the number of times that the terminal device sends the message 3 is less than or equal to 1.

Alternatively, in an implementation, the terminal device determines a first random access preamble group from at least two random access preamble groups, where the at least two random access preamble groups are associated with a sending manner of the message 3 (Msg3) in a random access procedure, the sending manner of the Msg3 indicates whether to repeatedly send the Msg3, and the sending manner of the Msg3 is associated with at least one of the following cases: The terminal device repeatedly sends the Msg3, the terminal device does not repeatedly send the Msg3, a number of times that the terminal device sends the Msg3, the terminal device has a capability of repeatedly sending the Msg3, the terminal device does not have the capability of repeatedly sending the Msg3, the terminal device needs to repeatedly send the Msg3, the terminal device does not need to repeatedly send the Msg3, the terminal device expects to be scheduled to repeatedly send the Msg3, the terminal device does not expect to be scheduled to repeatedly send the Msg3 (if there is no special description, in this application, that the terminal device repeatedly sends the Msg3, the terminal device has the capability of repeatedly sending the Msg3, the terminal device needs to repeatedly send the Msg3, the terminal device expects to be scheduled to repeatedly send the Msg3, and the number of times that the terminal device sends the Msg3 is greater than 1 in the sending manner of the Msg3 are described by using "repeatedly sending the Msg3" as an example; and in this application, that the terminal device does not repeatedly send the Msg3, the terminal device does not have the capability of repeatedly sending the Msg3, the terminal device does not need to repeatedly send the Msg3, the terminal device does not expect to be scheduled to repeatedly send the Msg3, and the number of times that the terminal device sends the Msg3 is 1 in the sending manner of the Msg3 are described by using "not repeatedly sending the Msg3"). At least one of the at least two random access preamble groups is associated with the sending manner of repeatedly sending the Msg3. In other words, at least one of the at least two random access preamble groups indicates to repeatedly send the Msg3. The terminal device determines a random access preamble from the first random access preamble group.

In the foregoing solution, the terminal device may select the random access preamble group after selecting a synchronization signal block for random access. A specific manner in which the terminal device determines the first random access preamble group from the at least two random access preamble groups may include: For example, the terminal device receives indication information from the network device; and the terminal device determines, based on the indication information, that the first random access preamble group is associated with the sending manner in which the terminal device repeatedly sends the Msg3. When the sending manner of the Msg3 is that the terminal device repeatedly sends the Msg3, the terminal device determines the first random access preamble group from the at least two random access preamble groups. In other words, the terminal device selects the first random access preamble group. In another example, the terminal device measures reference signal received power RSRP (for example, RSRP of the synchronization signal block). When the RSRP is less than a first threshold, the terminal device determines the first random access preamble group from the at least two random access preamble groups, where the first random access preamble group is associated with the sending manner in which the terminal device repeatedly sends the Msg3. In other words, when the RSRP meets a specific threshold requirement, the terminal device may select the first random access preamble group to indicate repeated sending of the Msg3. In a possible implementation, the first threshold is determined based on a second threshold and a relative threshold, and the second threshold is used to determine a carrier type of the random access, a random access type of the random access, or the synchronization signal block for the random access. For another example, the terminal device receives indication information from the network device; the terminal device determines, based on the indication information, that the first random access preamble group is associated with the sending manner in which the terminal device repeatedly sends the Msg3; and the terminal device measures reference signal received power RSRP, and when the RSRP is less than a first threshold, the terminal device determines (or selects) the first random access preamble from the at least two random access preamble groups.

Alternatively, the terminal device determines a first random access opportunity group from at least two random access opportunity groups, where the at least two random access opportunity groups are associated with a sending manner of the Msg3 in a random access procedure, the sending manner of the Msg3 indicates whether to repeatedly send the Msg3, and the sending manner of the Msg3 is associated with at least one of the following cases: The terminal device repeatedly sends the Msg3, or the terminal device does not repeatedly send the Msg3. At least one of the at least two random access opportunity groups is associated with the sending manner in which the terminal device repeatedly sends the Msg3, or at least one of the at least two random access opportunity groups indicates (or corresponds) to repeated sending of the Msg3. The terminal device determines the random access preamble from the first random access preamble group. It should be understood that the random access opportunity group herein may include a plurality of random access opportunities, or may include only one random access opportunity. In other words, one random access opportunity may separately form one group.

Figure 8:
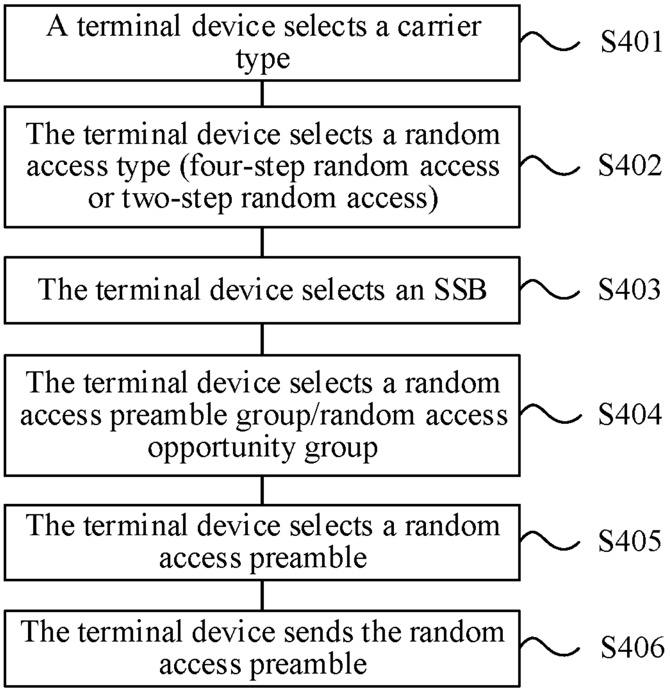
FIG. 8 is an example of a block diagram of a random access method according to an embodiment of this application.
Figure 9A:
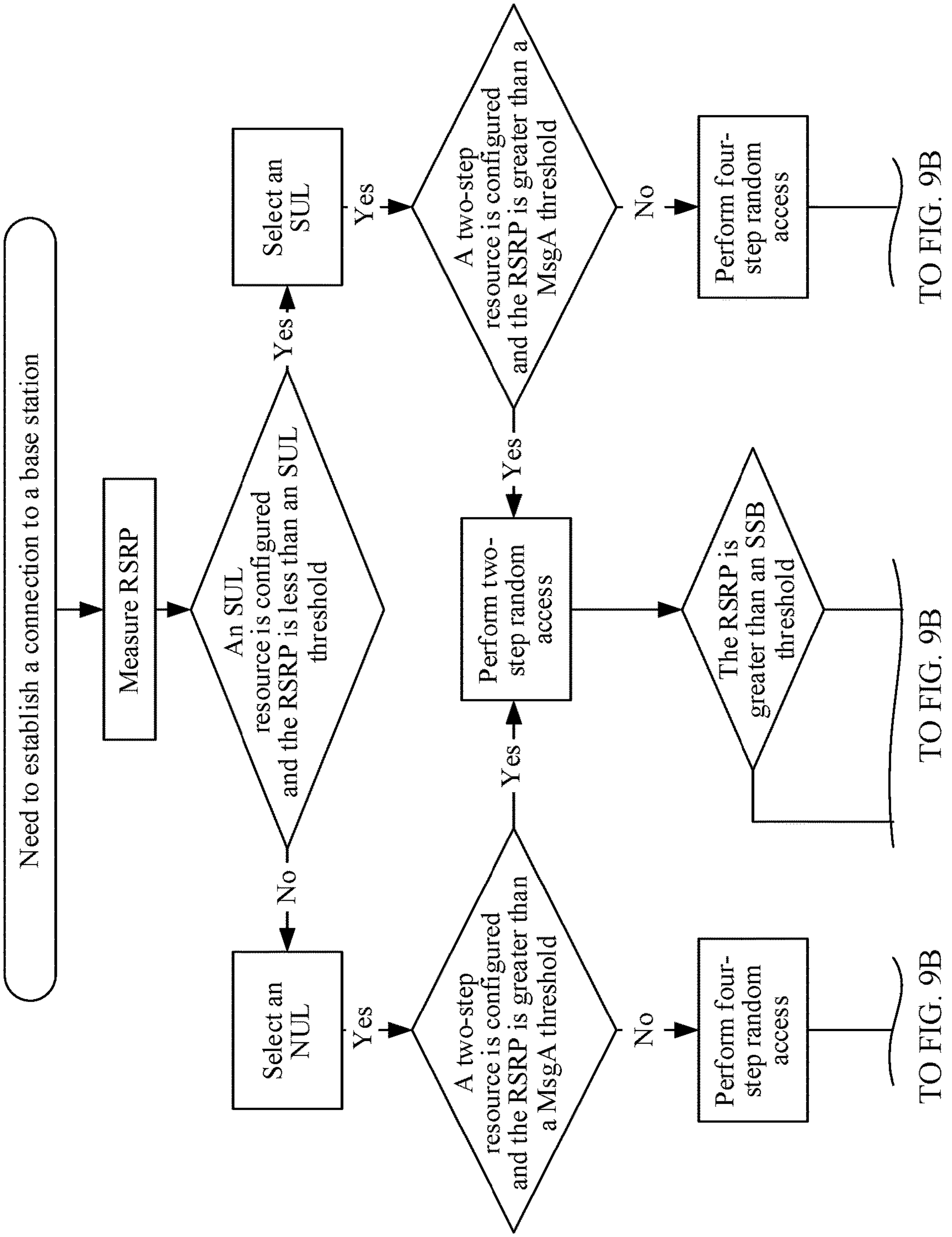
FIG. 9A and FIG. 9B are an example of a flowchart of a random access method according to an embodiment of this application.
Figure 9B:
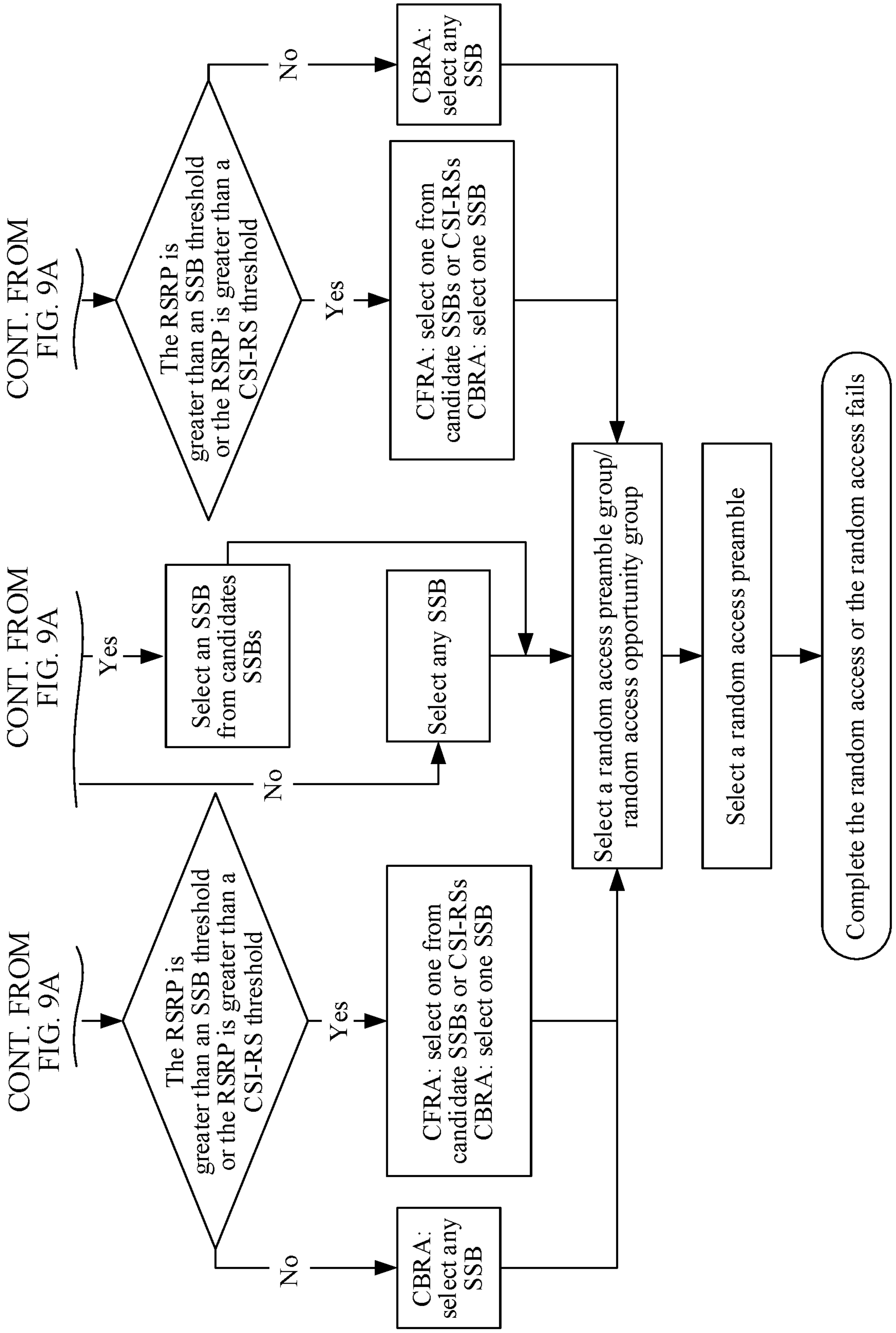

The following describes a random access preamble with reference to FIG. 8 and FIG. 9A and FIG. 9B. FIG. 9A and FIG. 9B are a flowchart corresponding to a method 400 in FIG. 8. The method 400 includes the following steps.

S401: A terminal device selects a carrier type.

For example, when the terminal device needs to establish a connection to a network device (for example, a base station), the terminal device measures downlink reference signal received power RSRP. A downlink reference signal herein may be a synchronous broadcast signal block SSB, or may be a channel state information reference signal (CSI-RS). The reference signal may also be referred to as a downlink pathloss reference (downlink pathloss reference) signal.

According to the method flowchart in FIG. 9A, when an SUL resource is configured for the terminal device, and RSRP is less than an SUL threshold, the terminal device selects the SUL as a carrier used for current random access. Otherwise, the terminal device selects an NUL as a carrier used for current random access. It should be understood that the SUL threshold may be pre-configured by the network device for the terminal device, and the SUL threshold may be denoted as rsrp-ThresholdSSB-SUL.

It should be noted that, in another case, before S401, the terminal device may alternatively determine, based on an indication of the network device, a type of a carrier used for the current random access, or the terminal device independently determines a type of a carrier used for the current random access. This is not limited in this application.

S402: The terminal device selects a random access type.

For example, after selecting the carrier, the terminal device further selects the random access type of the current random access.

According to the method flowchart in FIG. 9A, when the terminal device is configured with two-step resources (resources used for two-step random access), and the RSRP is greater than a MsgA threshold, the terminal device selects to perform two-step random access. Otherwise, the terminal device selects to perform four-step random access. It should be understood that the MsgA threshold may be pre-configured by the network device for the terminal device, and the MsgA threshold may be denoted as msgA-RSRP-Threshold.

S403: The terminal device selects the SSB.

For example, according to the method flowchart in FIG. 9A and FIG. 9B, if the terminal device selects to perform two-step random access in S402, and in this case, if the RSRP is greater than an SSB threshold, the terminal device selects one SSB from candidate SSBs. Otherwise, the terminal device selects any SSB. If the terminal device selects to perform four-step random access in S402, and the RSRP measured by the terminal device corresponds to the SSB (that is, the RSRP is obtained by measuring the SSB), and in this case, if the RSRP is greater than an SSB threshold, the terminal device selects one SSB from candidate SSBs. Otherwise, the terminal device selects any SSB. If the terminal device selects to perform four-step random access in S402, and the RSRP measured by the terminal device corresponds to the CSI-RS (that is, the RSRP is obtained by measuring the CSI-RS), and in this case, if the RSRP is greater than a CSI-RS threshold, the terminal device selects one SSB from candidate SSBs. Otherwise, the terminal device selects any SSB.

It should be understood that the SSB threshold and the CSI-RS threshold may be pre-configured by the network device for the terminal device. The SSB threshold may be denoted as rsrp-ThresholdSSB, and the CSI-RS threshold may be denoted as rsrp-ThresholdCSI-RS.

It should be understood that the foregoing thresholds may be configured by the network device by using higher layer signaling. To be specific, the thresholds may be carried in the higher layer signaling and sent to the terminal device. The higher layer signaling herein may be, for example, a physical broadcast channel (PBCH), remaining minimum system information (RMSI), a system information block (SIB) 1, a SIB 2, a SIB 3, a media access control-control element (MAC-CE), downlink control information (DCI), radio resource control RRC, or system information.

The following provides an example of a threshold configuration manner:

rsrp-ThresholdSSB RSRP-Range
rsrp-ThresholdSSB-SUL RSRP-Range
msgA-RSRP-Threshold-r16RSRP-Range
msgA-RSRP-ThresholdSSB-r16 RSRP-Range
rsrp-ThresholdCSI-RS RSRP-Range S404: The terminal device selects a random access preamble group/random access opportunity group.

For example, the terminal device selects the first random access preamble group from the at least two random access preamble groups. At least one of the at least two random access preamble groups is associated with the sending manner in which the terminal device repeatedly sends the Msg3, or at least one of the at least two random access preamble groups indicates to repeatedly send the Msg3.

The sending manner of the Msg3 includes that the terminal device repeatedly sends the Msg3, or the terminal device does not repeatedly send the Msg3. That the terminal device repeatedly sends the Msg3 includes one or more of the following cases: The terminal device has a capability of repeatedly sending the message 3, the terminal device needs to repeatedly send the message 3, the terminal device expects to repeatedly send the message 3, the terminal device expects to be scheduled to repeatedly send the message 3, or a number of times that the terminal device sends the message 3 is greater than 1. That the terminal device does not repeatedly send the message 3 includes one or more of the following cases: The terminal device does not have the capability of repeatedly sending the message 3, the terminal device does not need to repeatedly send the message 3, the terminal device does not expect to repeatedly send the message 3, the terminal device does not expect to be scheduled to repeatedly send the message 3, or the number of times that the terminal device sends the message 3 is less than or equal to 1.

The sending manner of the Msg3 herein means that the Msg3 is repeatedly sent or the Msg3 is not repeatedly sent when initial transmission of the Msg3 is scheduled or re-transmission of the Msg3 is scheduled (in other words, in this scheduling, the Msg3 is sent only once, or the Msg3 is sent a plurality of times). In another implementation, alternatively, the Msg3 may not be repeatedly sent during initial transmission, and may be repeatedly sent during scheduled retransmission.

The repeated sending of the Msg3 means that after a physical layer processing process such as encoding and modulation is performed on content (which is also referred to as a payload (payload)) of a same Msg3, the content is mapped to a plurality of pieces of different time (for example, OFDM symbols distributed in one or more slots, or one or more sending opportunities) and/or a frequency domain resource area for sending. In this process, different (encoded) redundancy versions of a same Msg3 may be sent; or a same redundancy version may be sent; or a same redundancy version may be used for partial repeated sending, and different redundancy versions may be used for partial repeated sending. The resource used to send the message 3 is scheduled by the network device in a Msg2 random access response, or is indicated by downlink control information (DCI). There may be a single resource, which is used for repeated sending or non-repeated sending of the Msg3. Alternatively, there may be a plurality of resources. The terminal device may select one or more resources from the resources, and each resource is used for repeated sending or non-repeated sending of the Msg3.

The non-repeated sending of the Msg3 means that after a physical layer processing process such as encoding and modulation is performed on content (which is also referred to as a payload (payload)) of the Msg3, the content is mapped to a single piece of time (which may be one slot, or a plurality of OFDM symbols, or a plurality of OFDM symbols in a plurality of slots) and/or a frequency domain resource area for sending. In this procedure, only a single (encoded) redundancy version of a same Msg3 is sent. The terminal device may determine the sending manner of the Msg3 before determining the random access preamble (or determining the random access preamble group in which the random access preamble is located, or determining the random access opportunity group in which the random access preamble is located). For example, the terminal device may determine the sending manner of the Msg3 in the random access procedure before or after selecting the synchronization signal block SSB for the random access.

In a possible implementation, when the terminal device determines, based on an indication from the network device, that the network device supports repeated sending of the Msg3 in a second random access preamble group/second random access opportunity group, and the sending manner of the Msg3 is that the terminal device repeatedly sends the Msg3, the terminal device selects a random access preamble from the second random access preamble group/second random access opportunity group, and repeatedly sends the Msg3. When the terminal device determines, based on an indication information from the network device, that the network device does not support repeated sending of the Msg3 in a third random access preamble group/third random access opportunity, or the sending manner of the Msg3 is that the terminal device does not repeatedly send the Msg3, the terminal device does not repeatedly send the Msg3. The second random access preamble group/second random access opportunity group is associated with the sending manner in which the terminal device repeatedly sends the Msg3.

That the terminal device repeatedly sends the Msg3 indicates any one of the following: The terminal device needs to repeatedly send the Msg3; the terminal device has the capability of repeatedly sending the Msg3; the terminal device has the capability of repeatedly sending the Msg3 and expects/needs to repeatedly send the Msg3; the terminal device has the capability of repeatedly sending the Msg3 and expects/needs the network device to schedule (a resource for) repeated sending of the Msg3; the terminal device has the capability of repeatedly sending the Msg3, and does not expect to be scheduled by the Msg2 to repeatedly send the Msg3, but may repeatedly send the Msg3 when the Msg3 is retransmitted; the payload of the Msg3 meets a specific constraint condition, and the terminal expects/needs the base station to schedule a resource for repeated sending of the Msg3; or a downlink signal selected by the terminal device meets a specific constraint condition, and the terminal expects/needs the base station to schedule a resource for repeated sending of the Msg3.

That the terminal device does not repeatedly send the Msg3 indicates any one of the following: The terminal device does not need to repeatedly send the Msg3; the terminal device does not have the capability of repeatedly sending the Msg3; the terminal device has the capability of repeatedly sending the Msg3, but does not expect to be scheduled by the Msg2 to repeatedly send the Msg3; or the terminal device has the capability of repeatedly sending the Msg3, but does not expect/does not need to repeatedly send the Msg3.

The following uses a group A (Group A) and a group B (Group B) as an example for detailed descriptions. The group A and the group B are two different random access preamble groups. The network device may configure a reserved value for the group B (or the group A) to indicate that the network device supports repeated transmission of the Msg3 in the group B.

The following first describes a possible group A and a possible group B as an example. In this example, the group A and the group B are different groups used to distinguish between Msg3 payload sizes. The example is as follows:

For the four-step random access, if the random access preamble group B is configured, a potential Msg3 size is greater than ra-Msg3SizeGroupA, and a path loss is less than PCMAX-preambleReceivedTargetPower-msg3-DeltaPreamble-messagePowerOffsetGroupB, the random access preamble group B is selected. PCMAX indicates maximum allowed output power, preambleReceivedTargetPower indicates target preamble received power, msg3-DeltaPreamble corresponds to the message 3 and a preamble power offset, and messagePowerOffsetGroupB corresponds to a message power offset of the group B. Alternatively, if the random access preamble group B is configured, the random access procedure is initiated by a CCCH logical channel, and a sum of a size of a common control channel (CCCH) service data unit (SDU) and a MAC subheader is greater than ra-Msg3 SizeGroupA, the random access preamble group B is selected. Otherwise, the random access preamble group A is selected, where ra-Msg3SizeGroupA is a specified threshold.

A specific configuration signaling example is as follows:

if Random Access Preambles group B is configured:

if the potential Msg3 size (UL data available for transmission plus MAC subheader(s) and, where required, MAC CEs) is greater than ra-Msg3 SizeGroupA and the pathloss is less than PCMAX (of the Serving Cell: performing the Random Access Procedure)—preambleReceivedTargetPower—msg3-DeltaPreamble—messagePowerOffsetGroupB; or if the Random Access procedure was initiated for the CCCH logical channel and the CCCH SDU size plus MAC subheader is greater than ra-Msg3 SizeGroupA:

select the Random Access Preambles group B.

else: select the Random Access Preambles group A.

else: select the Random Access Preambles group A.

Herein, ra-Msg3 SizeGroupA may be configured as follows:

```
groupBconfigured                    SEQUENCE {
  ra-Msg3SizeGroupA                   ENUMERATED {b56, b144, b208, b256,
b282, b480, b640, b800, b1000, b72, spare6, spare5,spare4, spare3, spare2, spare1},
  messagePowerOffsetGroupB              ENUMERATED { minusinfinity, dB0,
dB5, dB8, dB10, dB12, dB15, dB18},
     numberOfRA-PreamblesGroupA           INTEGER (1..64)<number of
random access preambles>
    }
```

In the foregoing example, b represents a bit, and a number following b represents a number of bits. In other words, b56 represents 56 bits.

For the two-step random access, if the random access preamble group B is configured for the two-step random access, a potential message A payload size is greater than ra-Msg3 SizeGroupA, and a path loss is less than PCMAX-msgA-PreambleReceivedTargetPower-msgA-DeltaPreamble-messagePowerOffsetGroupB, the random access preamble group B is selected. Alternatively, if the random access preamble group B is configured, the random access procedure is initiated by a CCCH logical channel, and a sum of a size of a CCCH SDU and a MAC subheader is greater than ra-MsgA-SizeGroupA, the random access preamble group B is selected. Otherwise, the random access preamble group A is selected.

A specific configuration signaling example is as follows:

if Random Access Preambles group B for 2-step RA type is configured:

if the potential MSGA payload size (UL data available for transmission plus MAC subheader and, where required, MAC CEs) is greater than the ra-MsgA-SizeGroupA and the pathloss is less than PCMAX (of the Serving Cell performing the Random Access Procedure)-msgA-PreambleReceivedTargetPower-msgA-DeltaPreamble—messagePowerOffsetGroupB; or if the Random Access procedure was initiated for the CCCH logical channel and the CCCH SDU size plus MAC subheader is greater than ra-MsgA-SizeGroupA:

select the Random Access Preambles group B.

else: select the Random Access Preambles group A.

else: select the Random Access Preambles group A.

Herein, ra-MsgA-SizeGroupA may be configured as follows:

```
    GroupB-ConfiguredTwoStepRA::=         SEQUENCE {
    ra-MsgA-SizeGroupA                    ENUMERATED
  {b56, b144, b208, b256, b282, b480, b640, b800,
    b1000, b72, spare6, spare5, spare4, spare3, spare2, spare1},
    messagePowerOffsetGroupB              ENUMERATED
  {minusinfinity, dB0, dB5, dB8, dB10, dB12, dB15, dB18},
        numberOfRA-PreamblesGroupA          INTEGER
  (1..64)
       }
```

The configuration of the group A and the group B is merely an example. In actual application, there may be a plurality of grouping manners. This is not limited in this application. In a specific example, the network device may configure a reserved value for the group B to indicate that the network device supports repeated transmission of the Msg3 in the group B. The reserved value herein may be one or more of a value-a, a value-b, a value-c, or a value-d. Specifically, the example is as follows:

When a configuration value of the group B is any one of b56, b144, b208, b256, b282, b480, b640, b800, b1000, or b72, it indicates that (a preamble of) the group B corresponds to a size and/or a path loss of the Msg3, or the group B is a random access preamble group associated with the size and/or the path loss of the Msg3. In this case, the Msg3 is not repeatedly sent, or the terminal device determines, based on the configuration value of the group B, not to repeatedly send the Msg3. The configuration value herein may be ra-Msg3SizeGroupA in the foregoing example.

When the configuration value of the group B is one or more of the value-a, the value-b, the value-c, or the value-d, it indicates that (the preamble of) the group B may indicate to repeatedly send the Msg3, or that (the preamble of) the group B may indicate that the network device supports repeated sending of the Msg3, or that the group B is a random access preamble associated with the sending manner of repeatedly sending the Msg3. For example, when the network device configures a value of ra-Msg3 SizeGroupA as one of the value-a, the value-b, the value-c, or the value-d, and the terminal device supports repeated sending of the Msg3 and expects to repeatedly send the Msg3 (and further supports another preset condition), the terminal device may select the random access preamble from the group. It should be understood that a value of the value-a, the value-b, the value-c, or the value-d may be any integer.

In another case, when the configuration value of the group B is one or more of the value-a, the value-b, the value-c, or the value-d, it indicates that (the preamble of) the group B may correspond to repeated sending of the Msg3, and may also correspond to the size and/or the path loss of the Msg3. For example, if the configuration value is the value-a (more specifically, for example, 64), it indicates that in preambles used for contention-based random access, numberOfRA-PreamblesGroupA preambles indicate that the payload of the Msg3 is greater than ra-Msg3 SizeGroupA and the path loss meets a preset condition (or the path loss is greater than a value determined based on the configuration information), and numberOfRA-PreamblesGroupA preambles indicate at least one of the following conditions: The Msg3 is repeatedly sent, the payload is not greater than ra-Msg3SizeGroupA, and the path loss is less than a preset value (or the value determined based on the configuration information). That the Msg3 is repeatedly sent may indicate one or more of the following: The Msg3 needs to be repeatedly sent, the Msg3 is expected to be repeatedly sent, and the capability of repeatedly sending the Msg3 is available. For another example, if the configuration value is the value-a (more specifically, for example, 108), it indicates that in preambles used for contention-based random access, numberOfRA-PreamblesGroupA preambles indicate that the payload of the Msg3 is greater than ra-Msg3 SizeGroupA and the path loss meets a preset condition (or the path loss is greater than a value determined based on the configuration information), and numberOfRA-Preambles-GroupA preambles indicate at least one of the following conditions: The Msg3 is repeatedly sent, the payload is not greater than ra-Msg3SizeGroupA, and the path loss is less than a preset value (or the value determined based on the configuration information).

Further, the configuration value ra-Msg3 SizeGroupA (or the value-a, the value-b, the value-c, or the value-d) of the group B may also be associated with the maximum repetition number of the Msg3. For example, the value-a and the value-b are used for a maximum number of repetition times of 8, and the value-c and the value-d are used for a maximum number of repetition times of 16. Correspondingly, it should be understood that in the random access response message, in the uplink scheduling grant or the uplink scheduling resource (namely, the downlink control information (DCI)) for scheduling retransmission of the Msg3, fields used to indicate a number of times of repeatedly sending the Msg3 are 3 bits and 4 bits respectively. A specific configuration signaling example is as follows:

```
  groupBconfigured                    SEQUENCE {
  ra-Msg3SizeGroupA                      ENUMERATED {b56, b144, b208, b256,
b282, b480, b640, b800, b1000, b72, value-a, value-b, value-c, value-d, spare2, spare1},
  messagePowerOffsetGroupB                  ENUMERATED { minusinfinity, dB0,
dB5, dB8, dB10, dB12, dB15, dB18},
  numberOfRA-PreamblesGroupA             INTEGER (1..64)
  }
```

In an implementation, a random access preamble group C (denoted as a group C) may be further configured. The group C is associated with the sending manner of repeatedly sending the Msg3. In other words, the group C indicates to repeatedly send the Msg3. In other words, when the RSRP is less than a Msg3 repetition threshold, the terminal may select a preamble from the group C to perform random access. A specific configuration signaling example is as follows:

```
  groupCconfigured                          SEQUENCE {
  RSRPoffsetGroupC                               ENUMERATED
{minusinfinity, dBminus3, dBminus5, dBminus8, dBminus10, dBminus12, dBminus15,
dBminus18},<power offset, where dBminusX indicates -X, dBminus3 is -3, a unit is a decibel dB,
and other similar interpretation>
  numberOfRA-PreamblesGroupC                   INTEGER (1..64)<number of random
access preambles>
    }
```

Further, when the terminal device detects that the downlink reference signal received power RSRP is less than a sum (or a difference, where the "sum" is used as an example below for further description) between a threshold and a power offset RSRPoffsetGroupC, the terminal device may select a preamble from the group C to perform random access. It should be understood that different thresholds need to be configured for different random access types and random access carriers. Therefore, the RSRP threshold of the group C may be determined based on an SUL threshold, an SSB threshold, a MsgA threshold, or the like in the existing procedure and the power offset RSRPoffsetGroupC. For example, when the random access type is the four-step random access, the RSRP threshold of the group C may be represented as "rsrp-ThresholdSSB+RSRPoffsetGroupC". Therefore, when the RSRP is less than "rsrp-ThresholdSSB+RSRPoffsetGroupC", the terminal device selects a preamble from the group C to perform random access. For another example, when the carrier type of the random access is an SUL, the RSRP threshold of the group C may be represented as "rsrp-ThresholdSSB-SUL+RSRPoffsetGroupC". Therefore, when the RSRP is less than "rsrp-ThresholdSSB-SUL+RSRPoffsetGroupC", the terminal device selects a preamble from the group C to perform random access. For another example, when the carrier type of the random access is an SUL and the random access type is the two-step random access, the RSRP threshold of the group C may be represented as "msgA-RSRP-Threshold+RSRPoffsetGroupC". Therefore, when the RSRP is less than "msgA-RSRP-Threshold+RSRPoffsetGroupC", the terminal device selects a preamble from the group C to perform random access. For another example, when the carrier type of the random access is an NUL and the random access type is the two-step random access, the RSRP threshold of the group C may be represented as "msgA-RSRP-ThresholdSSB+RSRPoffset-GroupC". Therefore, when the RSRP is less than "msgA-RSRP-ThresholdSSB+RSRPoffsetGroupC", the terminal device selects a preamble from the group C to perform random access.

In another possible implementation, the foregoing solution may be further applied to a solution in which the message A is repeatedly sent in the two-step random access procedure.

In another possible implementation, the terminal device determines a Msg3 payload size. When the terminal device supports repeated sending of the Msg3 and expects to repeatedly send the Msg3, and the Msg3 payload size is less than a Msg3 repetition threshold, the terminal device determines that the sending manner of the Msg3 is that the Msg3 is repeatedly sent. Otherwise, the terminal device determines that the sending manner of the Msg3 is that the Msg3 is not repeatedly sent. In this implementation, the terminal device may repeatedly send the Msg3, to improve coverage, increase a sending success probability, and reduce a latency.

In a specific example, a random access preamble group C (denoted as a group C) may be configured. The group C is associated with the sending manner of repeatedly sending the Msg3. In other words, the group C indicates to repeatedly send the Msg3. A field ra-Msg3 SizeGroupC may be further configured to be associated with a maximum number of repetition times of the Msg3.

When the terminal device supports repeated sending of the Msg3, and a size of the Msg3 is less than ra-Msg3SizeGroupC, the terminal device performs contention-based random access by using a preamble in the group C, where ra-Msg3SizeGroupC is a configured threshold.

A specific configuration signaling example is as follows:

```
groupCconfigured                          SEQUENCE {
ra-Msg3SizeGroupC                              ENUMERATED { b56, b72, b144, b256,
spare4, spare3, spare2, spare1},
RSRPoffsetGroupC                                    ENUMERATED
{minusinfinity, dBminus3, dBminus5, dBminus8, dBminus10, dBminus12, dBminus15,
dBminus18},<power offset, where dBminusX indicates -X, dBminus3 is -3, a unit is a decibel dB,
and other similar interpretation>
numberOfRA-PreamblesGroupC                    INTEGER (1..64)<number of random
access preambles>}
```

In another possible implementation, the foregoing solution may be further applied to a solution in which the message A is repeatedly sent in the two-step random access procedure. In this case, the message A may correspond to the message 3 (Msg3) in the foregoing solution. A sending manner of the message A is similar to the sending manner of the message 3, and details are not described herein again. The group C may be further associated with a sending manner of repeatedly sending the message A. In other words, the group C indicates to repeatedly send the message A. For example, when the terminal device supports the manner of repeatedly transmitting the message A, and a size of the message A is less than ra-MsgASizeGroupC, the terminal device performs contention-based random access by using a preamble in the group C, where ra-MsgASizeGroupC is a configured threshold. A specific configuration signaling example is as follows:

```
GroupC-ConfiguredTwoStepRA::=                 SEQUENCE {
ra-MsgA-SizeGroupA                                  ENUMERATED
{b56, b72, b144, b256, spare4, spare3, spare2, spare1},
RSRPoffsetGroupC                                    ENUMERATED
{minusinfinity, dBminus3, dBminus5, dBminus8, dBminus10, dBminus12, dBminus15,
dBminus18},<power offset, where dBminusX indicates -X, dBminus3 is -3, a unit is a decibel dB,
and other similar interpretation>
numberOfRA-PreamblesGroupC                 INTEGER (1..64)<Group C number of
random access preambles>
}
```

It should be understood that, in the N random access preambles associated with the SSB, numberOfRA-PreamblesGroupA preambles are used for the random access preamble group A, numberOfRA-PreamblesGroupC preambles are used for the random access preamble group C, and remaining preambles are used for the random access preamble group B. Alternatively, in the N random access preambles associated with the SSB, numberOfRA-PreamblesGroupA preambles are used for the random access preamble group B, numberOfRA-PreamblesGroupC preambles are also used for the random access preamble group B, and remaining preambles are used for the random access preamble group C.

Further, the random access preamble group C further includes indication information of a maximum number of repetition times corresponding to the group. For example, the field maxNumberOfRepetitions ENUMERATED {n4, n8} in the configuration information indicates the maximum number of repetition times corresponding to the group.

S405: The terminal device selects a random access preamble.

For example, after determining the random access preamble group/random access opportunity group, the terminal device selects the random access preamble from the random access preamble group/random access opportunity group.

S406: The terminal device sends the random access preamble.

After selecting the random access preamble, the terminal device sends the random access preamble to the network device to perform random access.

Correspondingly, after receiving the random access preamble from the terminal device, the network device determines the random access preamble group or the random access opportunity group corresponding to the random access preamble, so that a resource used to send the Msg3 (initial transmission and/or retransmission) can be appropriately scheduled for the terminal device based on the sending manner of the Msg3, so that the resource can be effectively used.

In the foregoing technical solution, the random access preamble group or the random access opportunity group is associated with the sending manner of the Msg3, so that after receiving the random access preamble from the terminal device, the network device may determine the sending manner of the Msg3 based on the random access preamble group or the random access opportunity group in which the random access preamble is located. To be specific, it is determined whether the terminal device needs to repeatedly send the Msg3, whether the terminal device has the capability of repeatedly sending the Msg3, the number of times that the terminal device repeatedly sends the Msg3, whether the terminal device needs to repeatedly send the Msg3, whether the terminal device expects to be scheduled to repeatedly send the Msg3, and the like, so that the network device can appropriately schedule a resource. In this way, a terminal device (namely, a terminal device with poor coverage performance) that needs to repeatedly send the Msg3 can obtain sufficient resources to repeatedly send the Msg3, and a terminal device (namely, a terminal device with good coverage performance) that does not need to repeatedly send the Msg3 can use a small number of resources. This improves resource utilization.

In another implementation, the terminal device determines the sending manner of the message 3 for the random access after selecting the synchronization signal block for the random access, where the sending manner of the message 3 includes that the terminal device repeatedly sends the message 3 or the terminal device does not repeatedly send the message 3; the terminal device determines a random access preamble from a first random access preamble group or a first random access opportunity group based on the sending manner of the message 3, where the first random access preamble group or the first random access opportunity group is associated with the sending manner of the message 3, and the synchronization signal block is associated with the first random access preamble group or the first random access opportunity group; and the terminal device sends the random access preamble to a network device.

That the terminal device repeatedly sends the message 3 includes one or more of the following cases: The terminal device expects to repeatedly send the message 3, the terminal device has a capability of repeatedly sending the message 3, the terminal device needs to repeatedly send the message 3, the terminal device expects to be scheduled to repeatedly send the message 3, or a number of times that the terminal device sends the message 3 is greater than 1.

That the terminal device does not repeatedly send the message 3 includes one or more of the following cases: The terminal device does not have the capability of repeatedly sending the message 3, the terminal device does not need to repeatedly send the message 3, the terminal device does not expect to repeatedly send the message 3, the terminal device does not expect to be scheduled to repeatedly send the message 3, or the number of times that the terminal device sends the message 3 is less than or equal to 1.

Alternatively, in another implementation, the terminal device determines the sending manner of the Msg3 after selecting the synchronization signal block for the random access, where the sending manner of the Msg3 indicates whether to repeatedly send the Msg3 and/or a number of times of sending the Msg3, and the sending manner of the Msg3 is associated with at least one of the following cases: The terminal device repeatedly sends the Msg3, the terminal device does not repeatedly send the Msg3, the number of times that the terminal device sends the Msg3, the terminal device has the capability of repeatedly sending the Msg3, the terminal device does not have the capability of repeatedly sending the Msg3, the terminal device needs to repeatedly send the Msg3, the terminal device does not need to repeatedly send the Msg3, the terminal device expects to be scheduled to repeatedly send the Msg3, or the terminal device does not expect to be scheduled to repeatedly send the Msg3. The terminal device selects the random access preamble from the first random access preamble group or the first random access opportunity group based on the sending manner of the Msg3, where the first random access preamble group or the first random access opportunity group is associated with the sending manner of the Msg3, and the synchronization signal block is associated with the first random access preamble group or the first random access opportunity group.

That the terminal device determines the sending manner of the Msg3 may include: The terminal device measures reference signal received power RSRP; and when the RSRP is less than a first threshold, the terminal device determines to repeatedly send the Msg3. In other words, the terminal device determines that the sending manner of the Msg3 is that the Msg3 is repeatedly sent. The first threshold is determined based on a second threshold and a relative threshold, and the second threshold is used to determine a carrier type of the random access, a random access type of the random access, or the synchronization signal block.

Figure 10:
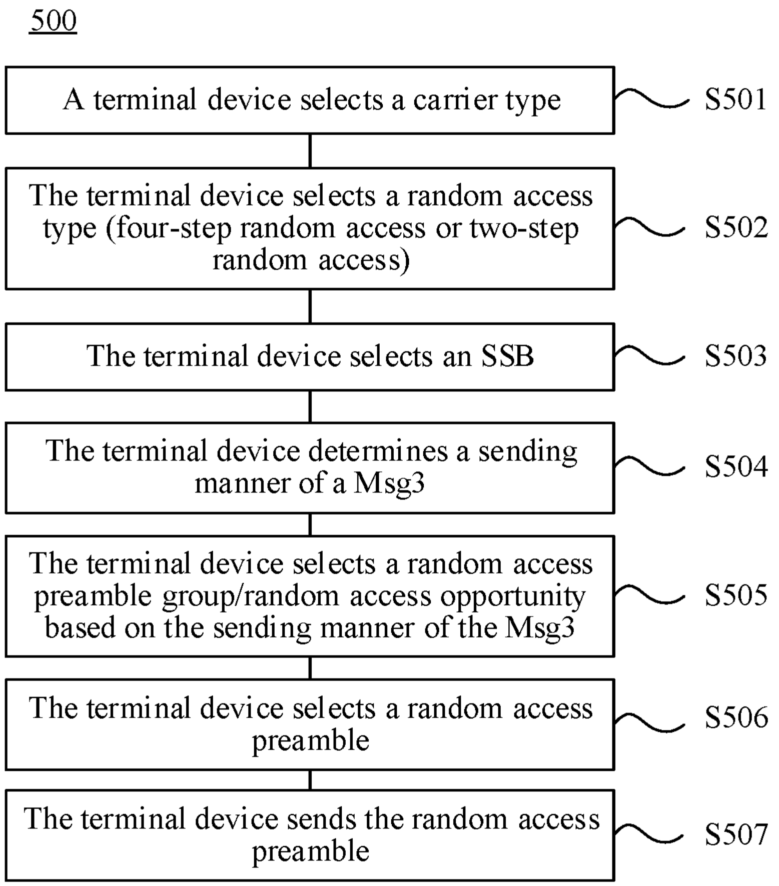
FIG. 10 is an example of a block diagram of another random access method according to an embodiment of this application.
Figure 11A:
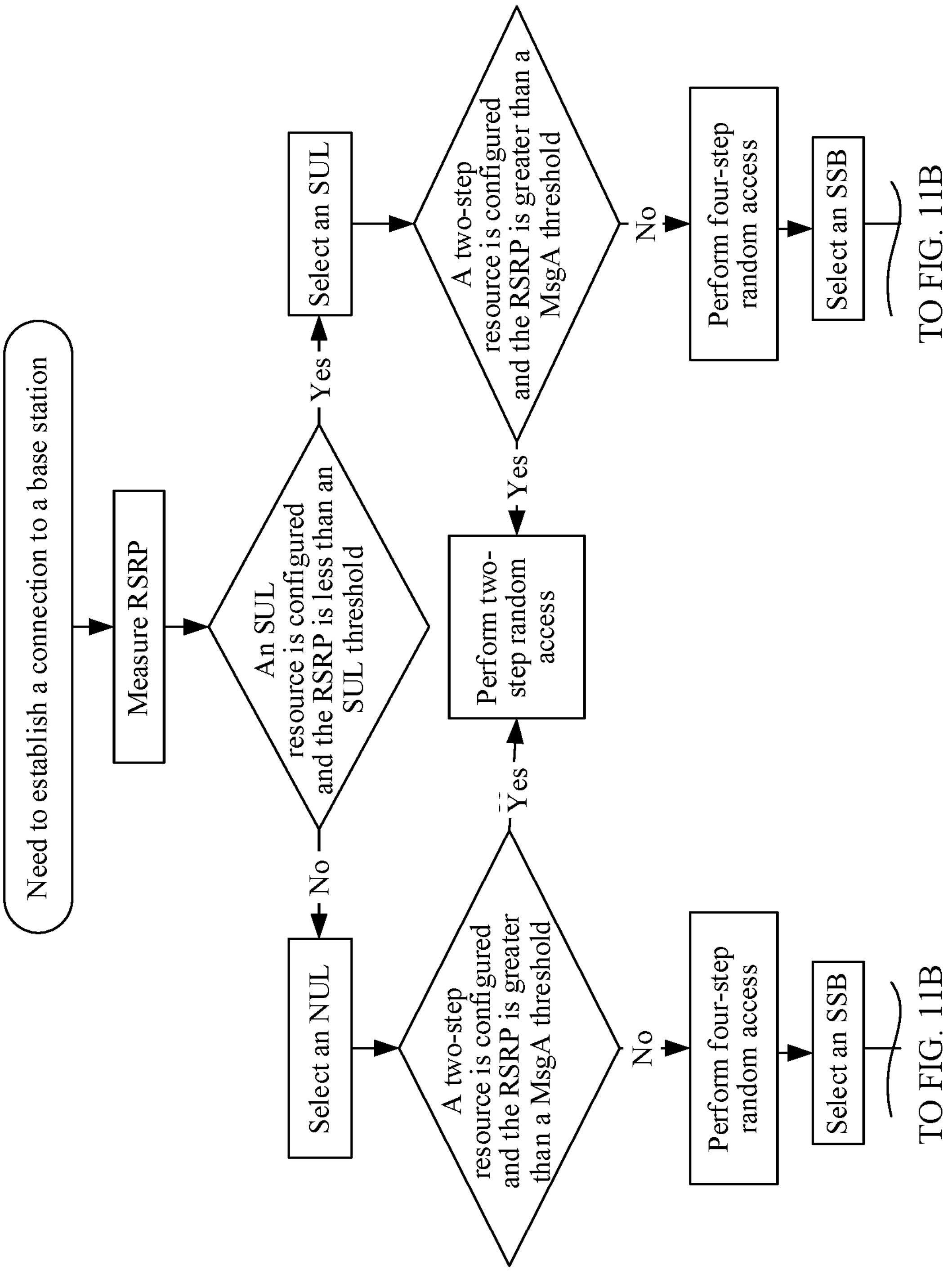
FIG. 11A and FIG. 11B are an example of a flowchart of another random access determining method according to an embodiment of this application.
Figure 11B:
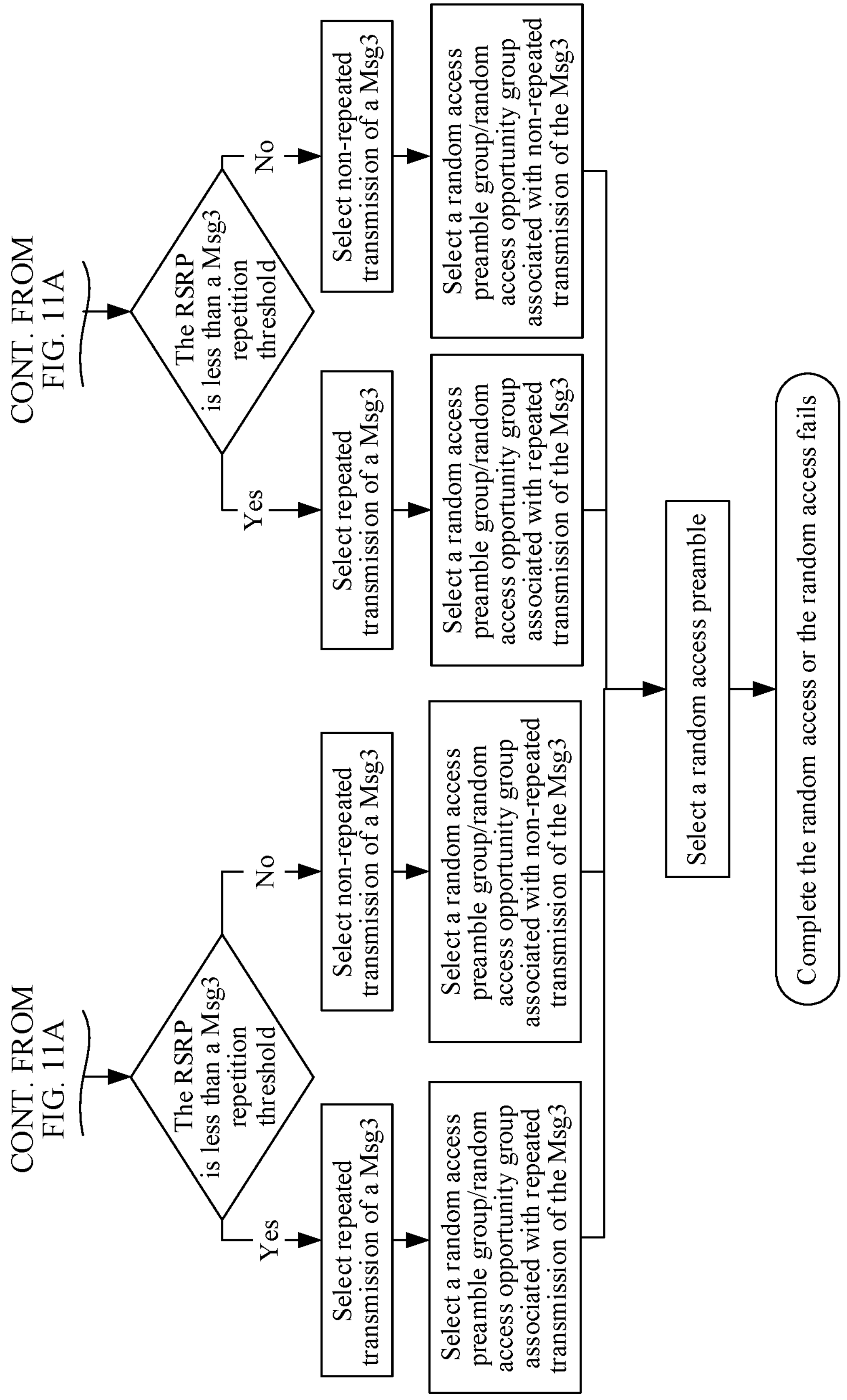

The following describes another random access method with reference to FIG. 10 and FIG. 11A and FIG. 11B. FIG. 11A and FIG. 11B are a flowchart corresponding to a method 500 in FIG. 10. The method 500 includes the following steps.

S501: A terminal device selects a carrier.

S502: The terminal device selects a random access type.

S503: The terminal device selects an SSB.

It should be understood that S501 to S503 are similar to S401 to S403 in the method 400, and details are not described herein again.

S504: The terminal device determines a sending manner of a Msg3.

For example, a Msg3 repetition threshold may be configured for the terminal device, and the terminal device determines the sending manner of the Msg3 based on the Msg3 repetition threshold.

In a possible implementation, the terminal device detects downlink reference signal received power RSRP. When the terminal device supports repeated sending of the Msg3 and expects to repeatedly send the Msg3, and the RSRP is less than the Msg3 repetition threshold, the terminal device determines that the sending manner of the Msg3 is that the Msg3 is repeatedly sent. Otherwise, the terminal device determines that the sending manner of the Msg3 is that the Msg3 is not repeatedly sent. In this implementation, when channel link quality is poor, the terminal device can repeatedly send the Msg3, to improve transmission performance of the Msg3.

It should be noted that the Msg3 repetition threshold in the foregoing implementation may be configured by using a system message, or may be predefined.

The specified threshold in the foregoing possible implementation may be an absolute threshold directly configured by the network device for the terminal device, or may be determined by the terminal device based on a relative threshold and any one of an SUL threshold, a MsgA threshold, and an SSB threshold. The following describes several possible configuration manners of the threshold by using examples.

In an example, the network device configures the absolute threshold for the terminal device. A corresponding signaling example is as follows:

Msg3Repetition-rsrp-Threshold RSRP-Range

Herein, Msg3Repetition-rsrp-Threshold indicates the configured absolute threshold.

A terminal device that supports repeated sending of the Msg3 and expects to repeatedly send the Msg3 during initial transmission or retransmission of the Msg3 may determine the sending manner of the Msg3 based on the threshold. For example, the terminal device detects the downlink reference signal received power RSRP. When the terminal device supports repeated sending of the Msg3 and expects to repeatedly send the Msg3, and the RSRP is less than Msg3Repetition-rsrp-Threshold, the terminal device determines that the sending manner of the Msg3 is that the Msg3 is repeatedly sent.

It should be noted that independent thresholds need to be configured for the random access type, the random access carrier, and the SSB. This configuration manner is flexible.

In another example, the network device configures the relative threshold for the terminal device. A corresponding signaling example is as follows:

| | |
|---|---|
| Msg3Repetition-rsrp-Offset dB12, dB15, dB18} | ENUMERATED {infinity, dB3, dB5, dB8, dB10, OPTIONAL, |

Herein, Msg3Repetition-rsrp-Offset indicates the configured relative threshold. A number of values and specific values in the foregoing signaling are merely examples, and may be other values. This is not limited in this application.

It should be understood that different thresholds need to be configured for different random access types and random access carriers. Therefore, the Msg3 repetition threshold may be determined based on an SUL threshold, an SSB threshold, a MsgA threshold, or the like in an existing procedure and the relative threshold. For example, in the method 500, when the random access type is four-step random access, the threshold of the sending manner of the Msg3 may be represented as "rsrp-ThresholdSSB-Msg3Repetition-rsrp-Offset". Therefore, when the RSRP is less than "rsrp-ThresholdSSB-Msg3Repetition-rsrp-Offset", the terminal device determines that the sending manner of the Msg3 is that the Msg3 is repeatedly sent. For another example, when the carrier type of the random access is an SUL, the threshold of the sending manner of the Msg3 may be represented as "rsrp-ThresholdSSB-SUL-Msg3Repetition-rsrp-Offset". Therefore, when the RSRP is less than "rsrp-ThresholdSSB-SUL-Msg3Repetition-rsrp-Offset", the terminal device determines that the sending manner of the Msg3 is that the Msg3 is repeatedly sent. For another example, when the carrier type of the random access is an SUL and the random access type is two-step random access, the threshold of the sending manner of the Msg3 may be represented as "msgA-RSRP-Threshold-Msg3Repetition-rsrp-Offset". Therefore, when the RSRP is less than "msgA-RSRP-Threshold-Msg3Repetition-rsrp-Offset", the terminal device determines that the sending manner of the Msg3 is that the Msg3 is repeatedly sent. For another example, when the carrier type of the random access is an NUL and the random access type is two-step random access, the threshold of the sending manner of the Msg3 may be represented as "msgA-RSRP-ThresholdSSB-Msg3Repetition-rsrp-Offset". Therefore, when the RSRP is less than "msgA-RSRP-ThresholdSSB-Msg3Repetition-rsrp-Offset", the terminal device determines that the sending manner of the Msg3 is that the Msg3 is repeatedly sent. The foregoing uses a difference between the threshold and the relative threshold as an example for description. In practice, a sum of the threshold and the relative threshold may alternatively be used. This is not limited herein.

It should be understood that Msg3Repetition-rsrp-Offset in this application has a similar physical meaning to RSRPoffsetGroupC field in the foregoing other embodiments, but a configuration manner is different. For example, RSRPoffsetGroupC is configured in preamble grouping information, but Msg3Repetition-rsrp-Offset may be configured at any other location. It may be understood that the latter is more flexible in configuration.

It should be noted that when determining the sending manner of the Msg3, the terminal device may determine the Msg3 repetition threshold by using any one of the relative threshold, the SUL threshold, the SSB threshold, and the MsgA threshold. Preferably, the threshold and the relative threshold that are used in a previous step before the terminal device determines the sending manner of the Msg3 may be used to determine the Msg3 repetition threshold. For example, in the method 500, after selecting the SSB, the terminal device determines the sending manner of the Msg3. Therefore, the terminal device may determine the Msg3 repetition threshold based on the SSB threshold and the relative threshold.

The following describes, by using examples, several possible manners in which the network device configures the relative threshold for the terminal device.

For example, the network device may directly configure the relative threshold for the terminal device by using the higher layer signaling.

For another example, the network device may configure, for the terminal device, an association relationship between a relative threshold (for example, Msg3Repetition-rsrp-Offset and/or RSRPoffsetGroupC) and a parameter of the sending manner of the Msg3. For example, the network device configures, for the terminal device, an association relationship between a relative threshold (Msg3Repetition-rsrp-Offset and/or RSRPoffsetGroupC) and a maximum value (maxNumberOfRepetitions) in a candidate value set of the number of times of repeatedly sending the Msg3. For example, Table 1 shows an association relationship between Msg3Repetition-rsrp-Offset and maxNumberOfRepetitions.

TABLE 1

| maxNumberOfRepetitions | Msg3Repetition-rsrp-Offset |
|---|---|
| K0 | H0 |
| K1 | H1 |
| K2 | H2 |
| . . . | . . . |

K0, K1, K2, . . . , H0, H1, H2, . . . are non-negative integers. Table 2 shows a specific example.

TABLE 2

| maxNumberOfRepetitions | Msg3Repetition-rsrp-Offset |
|---|---|
| 4 | 10 |
| 8 | 13 |
| 12 | 15 |
| 16 | 16 |

In other words, the terminal device may determine Msg3Repetition-rsrp-Offset based on maxNumberOfRepetitions and the association relationship.

Herein, maxNumberOfRepetitions may be determined based on time domain resource configuration information (or a physical uplink shared channel (physical uplink shared channel, PUSCH) time domain resource configuration) of the message 3. For example, a configuration manner may be as follows:

<PUSCH time domain resource configuration, where a maximum of 64 resource allocations can be configured in a linked list.>

PUSCH-TimeDomainResourceAllocationList-r16 ::= SEQUENCE

-continued

```
(SIZE(1..maxNrofUL-Allocations-r16)) OF PUSCH-TimeDomainResourceAllocation-r16
  <PUSCH time domain resource configuration>
  PUSCH-TimeDomainResourceAllocation-r16 ::=   SEQUENCE {
  <PUSCH time domain offset k2>
  k2-r16                                        INTEGER(0..32)
OPTIONAL,      -- Need S.
  <PUSCH time domain resource linked list, where a maximum of eight different
PUSCH resource allocations can be configured>
  puschAllocationList-r16                                  SEQUENCE
(SIZE(1..maxNrofMultiplePUSCHs-r16)) OF PUSCH-Allocation-r16,
  ...
  }
  <PUSCH resource allocation>
  PUSCH-Allocation-r16 ::=   SEQUENCE {
  <PUSCH mapping type>
  mappingType-r16                          ENUMERATED {typeA, typeB}
OPTIONAL,    -- Cond NotFormat01-02-Or-TypeA.
  <PUSCH start symbol and length>
  startSymbolAndLength-r16                 INTEGER (0..127)     OPTIONAL,
-- Cond NotFormat01-02-Or-TypeA.
  <PUSCH start symbol>
  startSymbol-r16                           INTEGER (0..13)
OPTIONAL,    -- Cond RepTypeB.
  <PUSCH length>
  length-r16                                INTEGER (1..14)
OPTIONAL,    -- Cond RepTypeB.
  <Number of times of repeatedly sending the PUSCH>
  numberOfRepetitions-r16                  ENUMERATED {n1, n2, n3, n4, n7,
n8, n12, n16} OPTIONAL,    -- Cond Format01-02
  ...
  }
```

Only the number of repetitions is considered. A configuration example is as follows (other fields that are not related to this embodiment are not presented):

```
<PUSCH time domain resource configuration>
PUSCH-TimeDomainResourceAllocationList ::=
puschAllocationList -> PUSCH-Allocation -> numberOfRepetitions = n1.
puschAllocationList -> PUSCH-Allocation -> numberOfRepetitions = n1.
puschAllocationList -> PUSCH-Allocation -> numberOfRepetitions = n1.
puschAllocationList -> PUSCH-Allocation -> numberOfRepetitions = n1.
puschAllocationList -> PUSCH-Allocation -> numberOfRepetitions = n2.
puschAllocationList -> PUSCH-Allocation -> numberOfRepetitions = n2.
puschAllocationList -> PUSCH-Allocation -> numberOfRepetitions = n2.
puschAllocationList -> PUSCH-Allocation -> numberOfRepetitions = n2.
puschAllocationList -> PUSCH-Allocation -> numberOfRepetitions = n4.
puschAllocationList -> PUSCH-Allocation -> numberOfRepetitions = n4.
puschAllocationList -> PUSCH-Allocation -> numberOfRepetitions = n4.
puschAllocationList -> PUSCH-Allocation -> numberOfRepetitions = n4.
puschAllocationList -> PUSCH-Allocation -> numberOfRepetitions = n8.
puschAllocationList -> PUSCH-Allocation -> numberOfRepetitions = n8.
puschAllocationList -> PUSCH-Allocation -> numberOfRepetitions = n8.
puschAllocationList -> PUSCH-Allocation -> numberOfRepetitions = n8.
}
```

It can be learned from the configuration that a value of maxNumberOfRepetitions is 8. Similarly, there may be more embodiments, more configuration items, or other configuration values. This is not limited in this application.

For another example, the network device may configure, for the terminal device, an association relationship between a relative threshold (Msg3Repetition-rsrp-Offset and/or RSRPoffsetGroupC) and a number of preambles (msg3repetition-TotalNumberOfRA-Preambles) of a random access preamble group/random access opportunity group. For example, Table 3 shows an association relationship between Msg3Repetition-rsrp-Offset and msg3repetition-Total NumberOfRA-Preambles.

TABLE 3

| msg3repetition-TotalNumberOfRA-Preambles | Msg3Repetition-rsrp-Offset |
|---|---|
| 1 to K0 | H0 |
| K0 + 1 to K1 | H1 |
| K1 + 1 to K2 | H2 |
| . . . | . . . |

K0, K1, K2, . . . , H0, H1, H2, . . . are non-negative integers. Table 4 shows a specific example.

TABLE 4

| msg3repetition-TotalNumberOfRA-Preambles | Msg3Repetition-rsrp-Offset |
|---|---|
| 1 to 4 | 10 |
| 5 to 8 | 13 |
| 9 to 16 | 15 |
| 17 to 63 | 16 |

In other words, the terminal device may determine Msg3Repetition-rsrp-Offset based on the msg3repetition-TotalNumberOfRA-Preambles and the association relationship.

For another example, the network device may configure, for the terminal device, that a relative threshold (for example, Msg3Repetition-rsrp-Offset and/or RSRPoffset-GroupC) is related to a maximum transmit power capability of the terminal or a power class of the terminal. For example, the network device configures, for the terminal device, an association relationship between a relative threshold (Msg3Repetition-rsrp-Offset and/or RSRPoffsetGroupC) and a maximum value (maxNumberOfRepetitions) in a candidate value set of the number of times of repeatedly sending the Msg3. Table 5 shows an association relationship between Msg3Repetition-rsrp-Offset and the power class.

TABLE 5

| Terminal power class UE power class | Msg3Repetition-rsrp-Offset |
|---|---|
| Class 1 | O1 |
| Class 2 | O2 |
| Class 3 | O3 |
| Class 4 | O4 |

O1, O2, O3, and O4 are real numbers. For example, a relationship between the values is O2=O1+5 and O3=O1+8. Further, values of O1, O2, O3, and O4 are also related to frequency ranges. In other words, different frequency ranges correspond to different maximum power output capabilities. Therefore, different power offsets need to be used.

It should be understood that the foregoing manner of configuring the Msg3 repetition threshold may also be applied to the method 400. A difference is that in the method 400, the terminal device may directly determine a random access preamble group or a random access opportunity group based on the Msg3 repetition threshold. For example, the terminal device detects downlink reference signal received power RSRP, and when the RSRP is less than the Msg3 repetition threshold, the terminal device selects a fourth random access preamble group or a fourth random access opportunity group, where the fourth random access preamble group or the fourth random access opportunity group is associated with the sending manner of repeatedly sending the Msg3.

It should be understood that embodiments in the Msg3 repetition threshold may be jointly used to form a new embodiment. For example, the relative threshold (for example, Msg3Repetition-rsrp-Offset and/or RSRPoffset-GroupC) is related to the maximum transmit power capability (or the power class of the terminal) of the terminal and the maximum number of repetitions (maxNumberOfRepetitions). For another example, the relative threshold (for example, Msg3Repetition-rsrp-Offset and/or RSRPoffset-GroupC) is related to the maximum transmit power capability (or the power class of the terminal) of the terminal and a number of grouped preambles.

S505: The terminal device selects a random access preamble group/random access opportunity group based on the sending manner of the Msg3.

For example, the terminal device determines the random access preamble group based on the sending manner of the Msg3, where the random access preamble group is associated with the sending manner of the Msg3; or the terminal device determines the random access opportunity group based on the sending manner of the Msg3, where the random access opportunity group is associated with the sending manner of the Msg3. In other words, the terminal device determines the random access preamble group or the random access opportunity group based on whether the Msg3 is repeatedly sent (and/or the number of times of repeatedly sending the Msg3), and then determines the random access preamble from the random access preamble group or the random access opportunity group, where the random access preamble is used by the terminal device to perform random access. It should be understood that the random access opportunity group herein may include a plurality of random access opportunities, or may include only one random access opportunity. In other words, one random access opportunity may separately form one group.

That the random access preamble group is associated with the sending manner of the Msg3 means that the random access preamble group may indicate the sending manner of the Msg3, or the random access preamble is used for random access when the terminal device repeatedly sends the Msg3, or the random access preamble is used for random access when the terminal device does not repeatedly send the Msg3. Different random access preamble groups may be configured in advance to be associated with different sending manners of the Msg3.

In an example, two random access preamble groups, a group A and a group B, may be configured. The group B is associated with the sending manner of repeatedly sending the Msg3. The network device may configure a reserved value for the group B to indicate that the network device supports repeated transmission of the Msg3 in the group B. A specific configuration manner is similar to that of the group A and the group B in S404 in the method 400, and details are not described again.

In an example, a group C is associated with the sending manner of repeatedly sending the Msg3 (for a configuration manner of the group C, refer to S404), and RSRPoffset-GroupC is a relative threshold configured for the terminal device. RSRP obtained by measuring an SSB is denoted as SSB RSRP_measure. If SSB RSRP_measure>RSRP_thre+RSRPoffsetGroupC, and the terminal device supports repeated sending of the Msg3, the terminal device may select the group C (or may select a random access preamble from the group). RSRP_thre is any one of the following: msg3repetition-rsrp-Threshold, msg3repetition-rsrp-ThresholdSSB-SUL, msg3repetition-rsrp-ThresholdSSB, rsrp-ThresholdSSB, rsrp-ThresholdCSI-RS, msgA-RSRP-ThresholdSSB, or rsrp-ThresholdSSB-SUL.

In an implementation, the random access preamble group or the random access opportunity group may further indicate capability information of the terminal device. For example, a group D (denoted as the group D) is used by a reduced capability (reduced capability) terminal device to perform random access, and the reduced capability terminal device may select a random access preamble from the group D. When detecting the random access preamble from the group D, the network device determines that the terminal device belongs to a reduced capability category, so as to facilitate subsequent scheduling.

In an implementation, the two types, namely, the repeated sending (and/or repetition number) of the Msg3 and the reduced capability, may jointly correspond to one random access preamble group or one random access opportunity group (for example, a group E, which is denoted as the group E). Therefore, when the reduced capability terminal device determines that the sending manner of the Msg3 is that the Msg3 is repeatedly sent, the reduced capability terminal device may select the random access preamble from the group E.

In an implementation, a random access preamble group or a random access opportunity group corresponding to repeated sending of the Msg3 and a random access preamble group or a random access opportunity group corresponding to a reduced capability terminal device may be in different cyclic associations in an association periodicity. For example, the random access preamble group or the random access opportunity group corresponding to repeated sending of the Msg3 is located in a cyclic association with an odd number in the association periodicity, and the random access preamble group or the random access opportunity group corresponding to the reduced capability terminal is located in a cyclic association with an even number in the association periodicity. For another example, the random access preamble group or the random access opportunity group corresponding to repeated sending of the Msg3 is located in a cyclic association with an even number in the association periodicity, and a group of a random access preamble or opportunity corresponding to the reduced capability terminal is located in a cyclic association with an odd number in the association periodicity.

In an implementation, the random access preamble group or the random access opportunity group may further indicate a purpose of the group (or a terminal requirement, a terminal capability, or the like associated with the group). For example, a group purpose of a group F (denoted as the group F) is repeated sending of the Msg3 and a reduced-capability, and the purpose of the group F may be indicated by usage configuration information. For example, when the usage configuration information in the group F corresponds to repeated sending of the Msg3 (msg3-repetition), it indicates that the group F is used to repeatedly send the Msg3; or when the usage configuration information in the group corresponds to the reduced-capability (reduced-capability), it indicates that the group F is used to reduce a capability of the terminal to perform random access. It should be understood that, the group purpose is merely an example of the configuration information. In practice, the usage configuration information may further include more information, for example, a start preamble index (or an end preamble index) and a number of preambles of the group. In an implementation, the random access preamble group or the random access opportunity group may further indicate a plurality of purposes of the group. For example, a group purpose of a group G (denoted as the group G) is repeated sending of the Msg3 and the reduced-capability, and a field in the configuration indicates that the group G is used for both repeated sending of the Msg3 and the reduced-capability. In this case, when the terminal device of the reduced capability category needs to repeatedly send the Msg3, the terminal device may select a random access preamble from the group G. Alternatively, in the group G, some preambles are used for repeated sending of the message 3, and the other preambles are used for the reduced-capability. Specifically, a number of preambles in the preamble group is N. First floor(N/2) preambles may be used for repeated sending of the Msg3, and remaining N-floor(N/2) preambles are used for the reduced-capability; or first floor(N/2) preambles may be used for the reduced-capability, and remaining N-floor(N/2) preambles are used for repeated sending of the message 3; or a preamble with an odd index is used for the reduced-capability, and a preamble with an even index is used for repeated sending of the message 3. It should be understood that, the group purpose is merely an example of the configuration information. In practice, more information may be further included, for example, a start preamble index (or an end preamble index) and a number of preambles of the group.

For example, a configuration manner may be:

```
  groupCconfigured                    SEQUENCE {
  usage                              ENUMERATED {msg3-repetition, reduced-capability},
OPTIONAL,
  ...
  }
  or
  GroupC-ConfiguredTwoStepRA::=       SEQUENCE {
  usage                              ENUMERATED {msg3-repetition, reduced-capability},
OPTIONAL,
  ...
  }
```

In this application, embodiments described in the method 400, the method 500, a method 600, a method 700, a method 800, and the like may be applied to other methods. For example, the solution for configuring the group A and the group B described in the method 400 may be applied to the method 500 to the method 800, and details are not described again.

Figure 12:
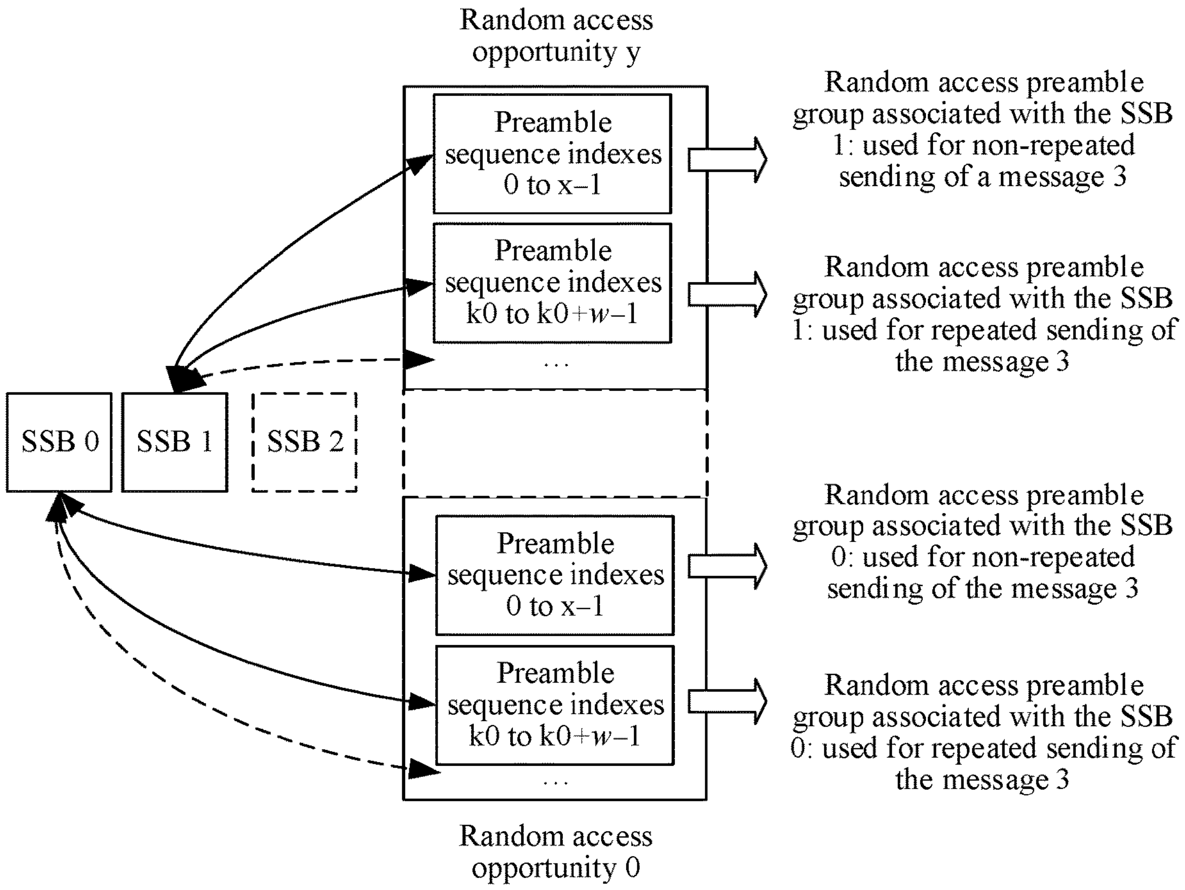
FIG. 12 is a schematic diagram of an association relationship between an SSB and a random access preamble according to an embodiment of this application.

FIG. 12 is a schematic diagram of a configuration manner of a random access preamble group. In the configuration manner shown in FIG. 12, several random access preambles in one random access opportunity are grouped into a plurality of groups. At least one random access preamble group is used to support repeated sending of the Msg3. In other words, at least one random access preamble group is used by the terminal device to perform random access when the Msg3 is repeatedly sent. For example, in FIG. 12, an SSB 1 is associated with a random access opportunity y. In the random access opportunity y, random access preambles whose random access preamble indexes are 0 to x are grouped into one group (denoted as a group #1), and random access preambles whose random access preamble indexes are k0 to k0+w−1 are grouped into another group (denoted as a group #2). The random access opportunity y may further include another group, and details are not described herein. In addition, the group #1 is configured to be used for non-repeated sending of the Msg3, and the group #2 is configured to be used for repeated sending of the Msg3. Similarly, an SSB 0 is associated with a random access opportunity 0. In the random access opportunity 0, an association relationship between a random access preamble group and the sending manner of the Msg3 may be the same as or different from that in the random access opportunity y. For example, in the random access opportunity 0, a group including random access preamble sequences whose preamble sequence indexes are k0 to k0+w−1 may be used for repeated sending of the Msg3, and another group is used for non-repeated sending of the Msg3; or a group including random access preamble sequences whose preamble sequence indexes are 0 to x−1 may be used for repeated sending of the Msg3, and another group is used for non-repeated sending of the Msg3. This is not limited in this application.

It should be noted herein that a value of x or w may be determined based on a number of SSBs (or downlink signals) associated with the random access opportunity and a total number of random access preambles in the group. For example, if a number of SSBs associated with a random access opportunity is N (N may be greater than 1), and a total number of preamble groups used to support repeated sending of the Msg3 is K, w may be calculated based on N and K.

$$w = \frac{K}{N},$$

Specifically, when K can be exactly divided by N, that is, a preamble index range corresponding to an $n^{th}$ SSB associated with the random access preamble group (or the random access opportunity) is $$k_0 + n \times \frac{K}{N} \sim k_0 + (n+1) \times \frac{K}{N} - 1,\ n = 0, 1, \ldots, N-1.$$

Figure 13:
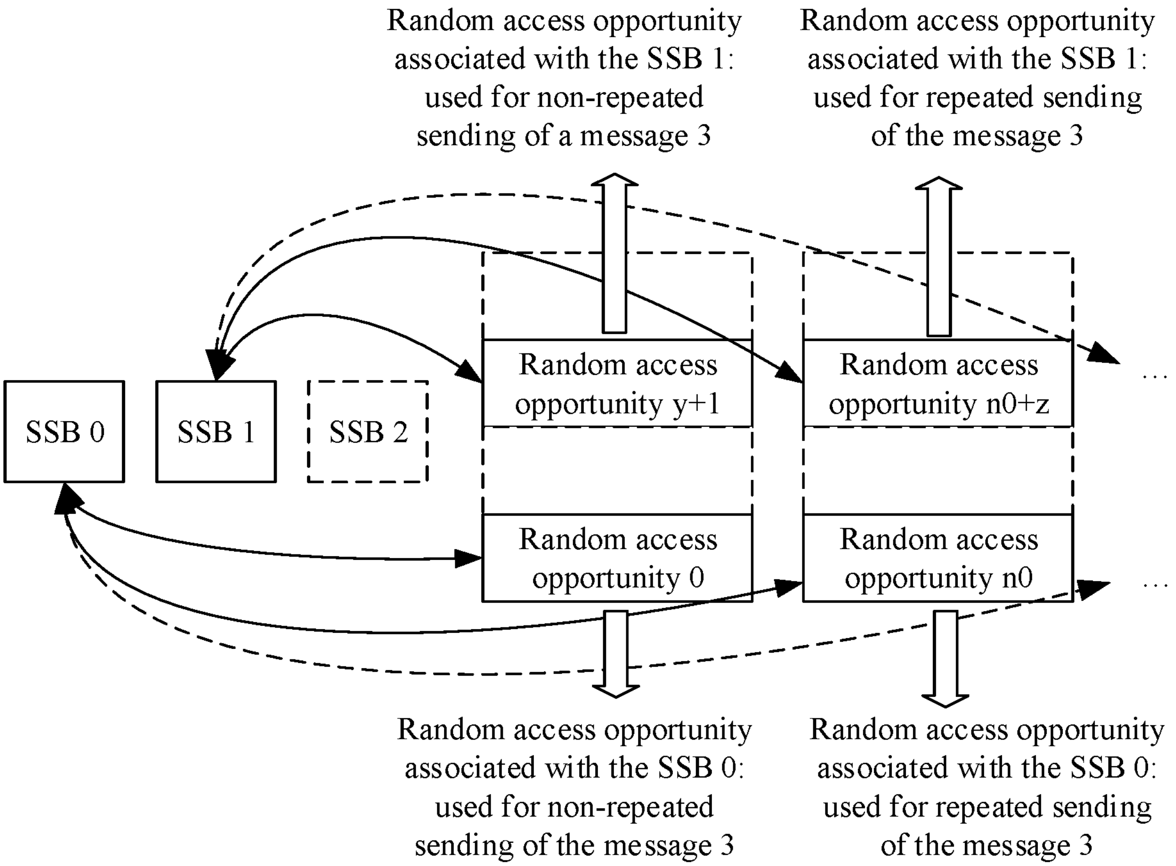
FIG. 13 is a schematic diagram of another association relationship between an SSB and a random access preamble according to an embodiment of this application.

For example, FIG. 13 is a schematic diagram of a configuration manner of a random access opportunity. In the configuration manner shown in FIG. 13, random access preambles in one or more of a plurality of random access opportunities are used to support repeated sending of the Msg3. For example, in FIG. 13, an SSB 1 is associated with a plurality of random access opportunities such as a random access opportunity y+1 and a random access opportunity n0+z. A random access preamble in the random access opportunity n0+z is configured for repeated sending of the Msg3, and a random access preamble in a remaining random access opportunity is configured for non-repeated sending of the Msg3. Similarly, an SSB 0 is associated with a plurality of random access opportunities such as a random access opportunity 0 and a random access opportunity n0. A random access preamble in the random access opportunity n0 is configured for repeated sending of the Msg3, and a random access preamble in a remaining random access opportunity is configured for non-repeated sending of the Msg3.

Optionally, an association periodicity between the SSB and the random access opportunity group or the random access preamble group (for example, one association periodicity corresponds to several random access configuration periodicities; time is an integer multiple of 5 ms, or an integer number of system frames, namely, an integer multiple of 10 ms; and a typical value may be 10 ms, 20 ms, 40 ms, 80 ms, 160 ms, 320 ms, 640 ms, 1280 ms, 2560 ms, 5120 ms, or 10240 ms) includes a plurality of cyclic associations (for example, one cyclic association means that a sent SSB is completely associated once). In some cyclic associations, there is a random access opportunity group or a random access preamble group indicating/corresponding to repeated sending of the Msg3. Further, time locations of these cyclic associations (or sequence numbers of the cyclic associations in the association periodicity) may be indicated by the network device.

S506: The terminal device selects a random access preamble.

For example, after determining the random access preamble group/random access opportunity group, the terminal device selects the random access preamble from the random access preamble group/random access opportunity group.

S507: The terminal device sends the random access preamble.

After selecting the random access preamble, the terminal device sends the random access preamble to the network device to perform random access.

Correspondingly, after receiving the random access preamble from the terminal device, the network device determines the random access preamble group or the random access opportunity group corresponding to the random access preamble, and determines the sending manner of the Msg3 based on the association relationship between the random access preamble group or the random access opportunity group and the sending manner of the Msg3, that is, determines whether the Msg3 is repeatedly transmitted. Further, a number of transmission times of the Msg3 may be further determined, so that a resource used to send the Msg3 can be appropriately scheduled for the terminal device.

In an implementation, during random access based on this manner, the network device configures a random access preamble group and/or a random access opportunity group (namely, random access time and frequency resources) used for repeated sending of the Msg3 to be different from a random access preamble group and/or a random access opportunity group used for non-repeated sending of the Msg3. Optionally, the random access time resource in the resources is indicated by an independent random access resource configuration index prach-ConfigurationIndex. Further, a carrier index or a bandwidth part (or an initial uplink access bandwidth part initialUplinkBWP) of the resources is different from a carrier index or a bandwidth part of the resources used for non-repeated sending of the Msg3.

In an implementation, for the random access preamble for repeated sending of the Msg3 and the random access preamble for non-repeated sending of the Msg3, random access-radio network temporary identities (random access-radio network temporary identity, RA-RNTI) associated with corresponding random access responses are calculated in different manners. For example, a random access response message (or downlink control information (DCI) corresponding to a random access response) of the random access preamble for non-repeated sending of the Msg3 is identified by the following RNTI:

$$\text{RA-RNTI}=1+s\_id+14\times t\_id+14\times 80\times f\_id+14\times 80\times 8\times ul\_carrier\_id$$

Herein, s_id is an index (0≤s≤id<14) of a first OFDM symbol of the random access opportunity in which the random access preamble is located; t_id is a slot index (in a system frame, 0≤t_id<80) of the random access opportunity in which the random access preamble is located, and the slot corresponds to a subcarrier spacing of the random access preamble/opportunity/format; f_id is a frequency domain index (0≤f_id<8) of the random access opportunity in which the random access preamble is located; and ul_carrier_id is an uplink carrier index (0 for an NUL carrier, and 1 for an SUL carrier).

It should be understood that the foregoing solution may be further applied to a solution in which the message A is repeatedly sent in the two-step random access procedure. In this case, the message A may correspond to the message 3 (Msg3) in the foregoing solution. A sending manner of the message A is similar to the sending manner of the message 3, and details are not described herein again. Similarly, a random access response message MSGB (or downlink control information (DCI) corresponding to the MSGB) of the random access preamble for non-repeated sending of the MsgA is identified by the following RNTI:

$$\text{MSGB-RNTI}=1+s\_\text{id}+14\times t\_\text{id}+14\times 80\times f\_\text{id}+14\times 80\times 8\times \text{ul\_carrier\_id}+14\times 80\times 8\times 2$$

MSGB is also referred to as MsgB, which is a message B in the two-step random access.

A random access response message (or downlink control information (DCI) corresponding to a random access response) of the random access preamble for repeated sending of the Msg3 is identified by the following RNTI:

$$\text{RA-RNTI}=1+(s\_\text{id}+1)+14\times t\_\text{id}+14\times 80\times f\_\text{id}+14\times 80\times 8\times \text{ul\_carrier\_id}$$

In other words, it is equivalent to:

$$\text{RA-RNTI-}2+s\_\text{id}+14\times t\_\text{id}+14\times 80\times f\_\text{id}+14\times 80\times 8\times \text{ul\_carrier\_id}$$

A random access response message MSGB (or downlink control information (DCI) corresponding to the MSGB) of the random access preamble for repeated sending of the MsgA is identified by the following RNTI:

$$\text{MSGB-RNTI}=1+(s\_\text{id}+1)+14\times t\_\text{id}+14\times 80\times f\_\text{id}+14\times 80\times 8\times \text{ul\_carrier\_id}+14\times 80\times 8\times 2$$

In other words, it is equivalent to:

$$\text{MSGB-RNTI}=2+s\_\text{id}+14\times t\_\text{id}+14\times 80\times f\_\text{id}+14\times 80\times 8\times \text{ul\_carrier\_id}+14\times 80\times 8\times 2,$$

where it should be understood that, because a minimum time length of an existing random access opportunity is two OFDM symbols, the foregoing mechanism may be used to avoid a random access failure caused by confusion of response messages of random access preambles/random access opportunities used for different sending manners of the message 3 during reception. In addition, in this manner, value ranges of RNTIs in the random access Msg2 or MsgB are not excessively dispersed.

In the foregoing technical solution, the random access preamble group or the random access opportunity group is associated with the sending manner of the Msg3, so that after receiving the random access preamble from the terminal device, the network device may determine the sending manner of the Msg3 based on the random access preamble group or the random access opportunity group in which the random access preamble is located. To be specific, it is determined whether the terminal device needs to repeatedly send the Msg3, whether the terminal device has the capability of repeatedly sending the Msg3, the number of times that the terminal device repeatedly sends the Msg3, and the like, so that the network device can appropriately schedule a resource. In this way, a terminal device (namely, a terminal device with poor coverage performance) that needs to repeatedly send the Msg3 can obtain sufficient resources to repeatedly send the Msg3, and a terminal device (namely, a terminal device with good coverage performance) that does not need to repeatedly send the Msg3 can use a small number of resources. This improves resource utilization.

In still another implementation, the terminal device determines the sending manner of the message 3 for the random access after selecting an access type of the random access and/or before selecting a synchronization signal block for the random access, where the sending manner of the message 3 includes that the terminal device repeatedly sends the message 3 or the terminal device does not repeatedly send the message 3; the terminal device determines a random access preamble from a first random access preamble group or a first random access opportunity group based on the sending manner of the message 3, where the first random access preamble group or the first random access opportunity group is associated with the sending manner of the message 3, and the synchronization signal block is associated with the first random access preamble group or the first random access opportunity group; and the terminal device sends the random access preamble to a network device.

That the terminal device repeatedly sends the message 3 includes one or more of the following cases: The terminal device expects to repeatedly send the message 3, the terminal device has a capability of repeatedly sending the message 3, the terminal device needs to repeatedly send the message 3, the terminal device expects to be scheduled to repeatedly send the message 3, or a number of times that the terminal device sends the message 3 is greater than 1.

That the terminal device does not repeatedly send the message 3 includes one or more of the following cases: The terminal device does not have the capability of repeatedly sending the message 3, the terminal device does not need to repeatedly send the message 3, the terminal device does not expect to repeatedly send the message 3, the terminal device does not expect to be scheduled to repeatedly send the message 3, or the number of times that the terminal device sends the message 3 is less than or equal to 1.

Alternatively, in still another implementation, the terminal device determines the sending manner of the Msg3 after selecting an access type of the random access, and/or the terminal device determines the sending manner of the Msg3 before selecting an SSB for the random access, where the sending manner of the Msg3 indicates whether to repeatedly send the Msg3 and/or a number of times of sending the Msg3, and the sending manner of the Msg3 is associated with at least one of the following cases: The terminal device repeatedly sends the Msg3, the terminal device does not repeatedly send the Msg3, the number of times that the terminal device sends the Msg3, the terminal device has the capability of repeatedly sending the Msg3, the terminal device does not have the capability of repeatedly sending the Msg3, the terminal device needs to repeatedly send the Msg3, the terminal device does not need to repeatedly send the Msg3, the terminal device expects to be scheduled to repeatedly send the Msg3, or the terminal device does not expect to be scheduled to repeatedly send the Msg3. After selecting the SSB, the terminal device selects the random access preamble from the first random access preamble group or the first random access opportunity group, where the SSB is associated with the first random access preamble group or the first random access opportunity group, and the first random access preamble group or the first random access opportunity group is associated with the sending manner of the Msg3.

Figure 14:
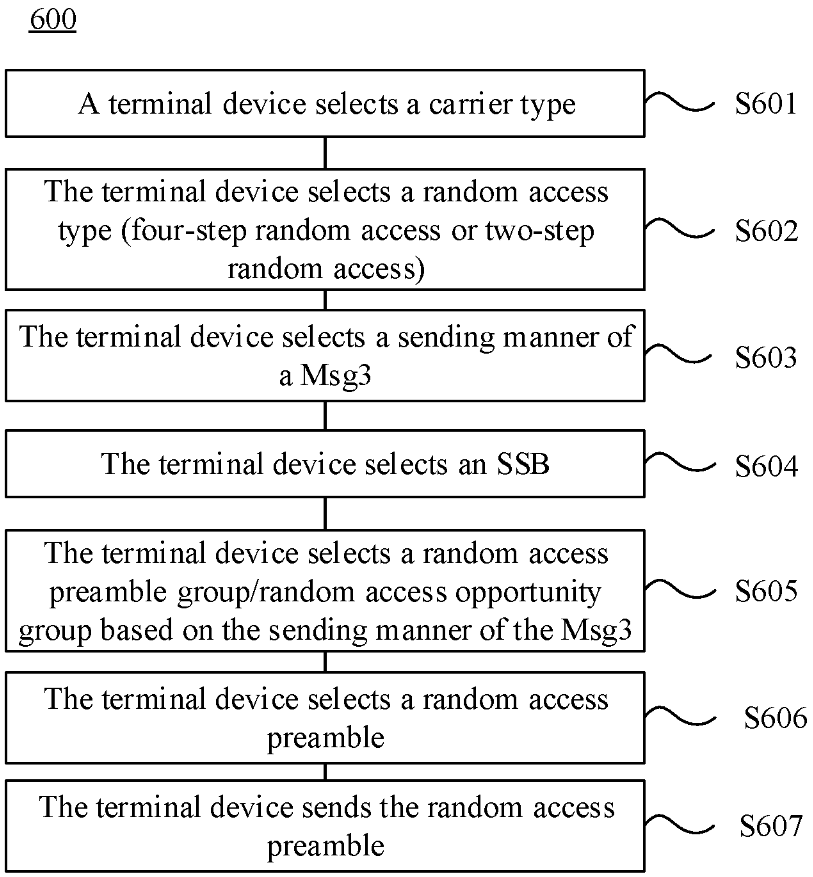
FIG. 14 is an example of a block diagram of still another random access method according to an embodiment of this application.
Figure 15A:
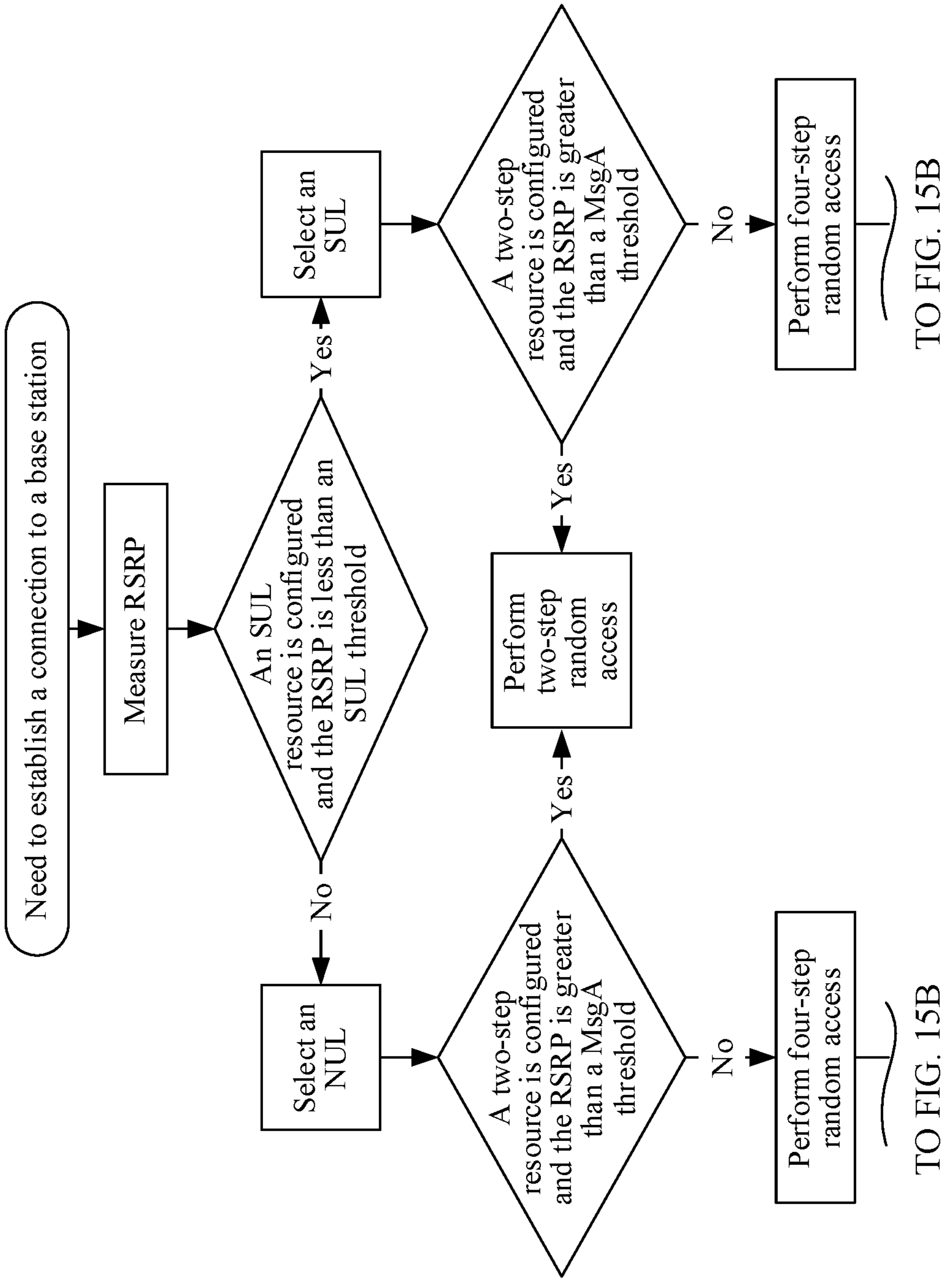
FIG. 15A and FIG. 15B are an example of a flowchart of still another random access method according to an embodiment of this application.
Figure 15B:
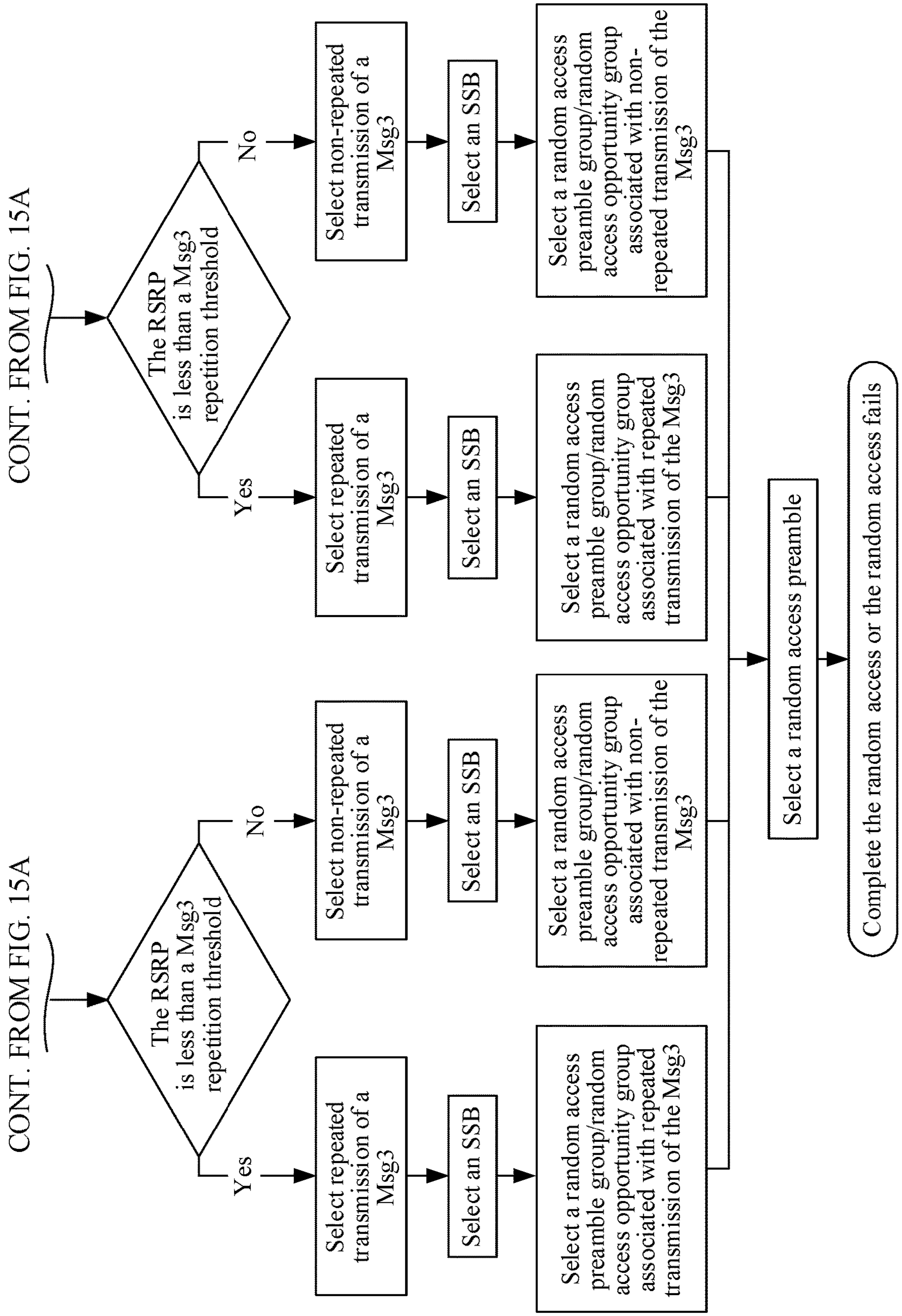

The following describes a random access method with reference to FIG. 14 and FIG. 15A and FIG. 15B. FIG. 15A and FIG. 15B are a flowchart corresponding to the method 600 in FIG. 14. The method 600 includes the following steps:

S601: A terminal device selects a carrier.

S602: The terminal device selects a random access type.

It should be understood that S601 and S602 are similar to S401 and S402 in the method 400, and details are not described herein again.

S603: The terminal device selects a sending manner of a Msg3.

For example, a Msg3 repetition threshold may be configured for the terminal device, and the terminal device determines the sending manner of the Msg3 based on the Msg3 repetition threshold.

In a possible implementation, the terminal device detects downlink reference signal received power RSRP. When the terminal device supports repeated sending of the Msg3 and expects to repeatedly send the Msg3, and the RSRP is less than the Msg3 repetition threshold, the terminal device determines that the sending manner of the Msg3 is that the Msg3 is repeatedly sent. Otherwise, the terminal device determines that the sending manner of the Msg3 is that the Msg3 is not repeatedly sent. In this implementation, when channel link quality is poor, the terminal device can repeatedly send the Msg3, to improve transmission performance of the Msg3.

In another possible implementation, the terminal device determines a Msg3 payload size. When the terminal device supports repeated sending of the Msg3 and expects to repeatedly send the Msg3, and the Msg3 payload size is less than the Msg3 repetition threshold, the terminal device determines that the sending manner of the Msg3 is that the Msg3 is repeatedly sent. Otherwise, the terminal device determines that the sending manner of the Msg3 is that the Msg3 is not repeatedly sent. In this implementation, the terminal device may repeatedly send the Msg3, to improve coverage, increase a sending success probability, and reduce a latency.

It should be noted that the Msg3 repetition threshold in the foregoing implementation may be configured by using a system message, or may be predefined. A specific configuration manner is similar to the solution described in S504 in the method 500, and details are not described herein again.

S604: The terminal device selects an SSB.

A manner in which the terminal device selects the SSB in S604 is similar to the manner in which the terminal device selects the SSB in S403 in the method 400. However, it should be noted that in S604, SSBs need to be separately selected for different sending manners of the Msg3.

Then, further, in S605, the terminal device selects the random access preamble group/random access opportunity group based on the sending manner of the Msg3.

For example, the terminal device determines the random access preamble group based on the sending manner of the Msg3, where the random access preamble group is associated with the sending manner of the Msg3; or the terminal device determines the random access opportunity group based on the sending manner of the Msg3, where the random access opportunity group is associated with the sending manner of the Msg3. A configuration manner of the random access preamble group or the random access opportunity group is similar to the method described in S505 in the method 500, and details are not described again.

The random access preamble group or the random access opportunity group may further indicate capability information of the terminal device, or indicate a purpose of the group. For a specific manner, refer to related descriptions in the method 500. Details are not described herein again. In addition, this solution is also applicable to other subsequent embodiments, and details are not described again.

S606: The terminal device selects a random access preamble.

For example, after determining the random access preamble group/random access opportunity group, the terminal device selects the random access preamble from the random access preamble group/random access opportunity group.

S607: The terminal device sends the random access preamble.

After selecting the random access preamble, the terminal device sends the random access preamble to the network device to perform random access.

Correspondingly, after receiving the random access preamble from the terminal device, the network device determines the random access preamble group or the random access opportunity group corresponding to the random access preamble, and determines the sending manner of the Msg3 based on the association relationship between the random access preamble group or the random access opportunity group and the sending manner of the Msg3, that is, determines whether the Msg3 is repeatedly transmitted. Further, a number of transmission times of the Msg3 may be further determined, so that a resource used to send the Msg3 can be appropriately scheduled for the terminal device.

In the foregoing technical solution, the random access preamble group or the random access opportunity group is associated with the sending manner of the Msg3, so that after receiving the random access preamble from the terminal device, the network device may determine the sending manner of the Msg3 based on the random access preamble group or the random access opportunity group in which the random access preamble is located. To be specific, it is determined whether the terminal device needs to repeatedly send the Msg3, whether the terminal device has the capability of repeatedly sending the Msg3, the number of times that the terminal device repeatedly sends the Msg3, and the like, so that the network device can appropriately schedule a resource. In this way, a terminal device (namely, a terminal device with poor coverage performance) that needs to repeatedly send the Msg3 can obtain sufficient resources to repeatedly send the Msg3, and a terminal device (namely, a terminal device with good coverage performance) that does not need to repeatedly send the Msg3 can use a small number of resources. This improves resource utilization.

In still another implementation, the terminal device determines the sending manner of the message 3 for the random access after selecting a carrier for the random access and/or before selecting an access type of the random access, where the sending manner of the message 3 includes that the terminal device repeatedly sends the message 3 or the terminal device does not repeatedly send the message 3; the terminal device determines a random access preamble from a first random access preamble group or a first random access opportunity group based on the sending manner of the message 3, where the first random access preamble group or the first random access opportunity group is associated with the sending manner of the message 3, and the synchronization signal block is associated with the first random access preamble group or the first random access opportunity group; and the terminal device sends the random access preamble to a network device.

That the terminal device repeatedly sends the message 3 includes one or more of the following cases: The terminal device expects to repeatedly send the message 3, the terminal device has a capability of repeatedly sending the message 3, the terminal device needs to repeatedly send the message 3, the terminal device expects to be scheduled to repeatedly send the message 3, or a number of times that the terminal device sends the message 3 is greater than 1.

That the terminal device does not repeatedly send the message 3 includes one or more of the following cases: The terminal device does not have the capability of repeatedly sending the message 3, the terminal device does not need to repeatedly send the message 3, the terminal device does not expect to repeatedly send the message 3, the terminal device does not expect to be scheduled to repeatedly send the message 3, or the number of times that the terminal device sends the message 3 is less than or equal to 1.

Alternatively, in still another implementation, the terminal device determines the sending manner of the Msg3 after selecting a carrier type of the random access, and/or the terminal device determines the sending manner of the Msg3 before selecting an access type of the random access, where the sending manner of the Msg3 indicates whether to repeatedly send the Msg3 and/or a number of times of sending the Msg3, and the sending manner of the Msg3 includes at least one of the following: The terminal device repeatedly sends the Msg3, the terminal device does not repeatedly send the Msg3, the number of times that the terminal device sends the Msg3, the terminal device has the capability of repeatedly sending the Msg3, the terminal device does not have the capability of repeatedly sending the Msg3, the terminal device needs to repeatedly send the Msg3, the terminal device does not need to repeatedly send the Msg3, the terminal device expects to be scheduled to repeatedly send the Msg3, or the terminal device does not expect to be scheduled to repeatedly send the Msg3. After selecting the random access type and the SSB, the terminal device selects the random access preamble from the first random access preamble group or the first random access opportunity group, where the SSB is associated with the first random access preamble group or the first random access opportunity group, and the first random access preamble group or the first random access opportunity group is associated with the sending manner of the Msg3.

Figure 16:
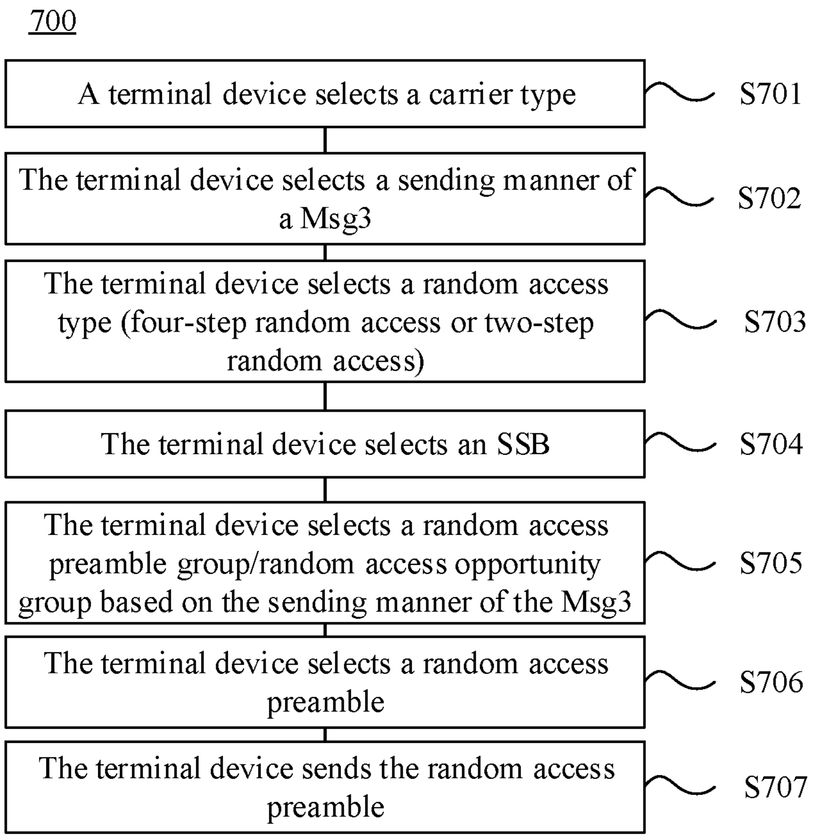
FIG. 16 is an example of a block diagram of still another random access method according to an embodiment of this application.
Figure 17A:
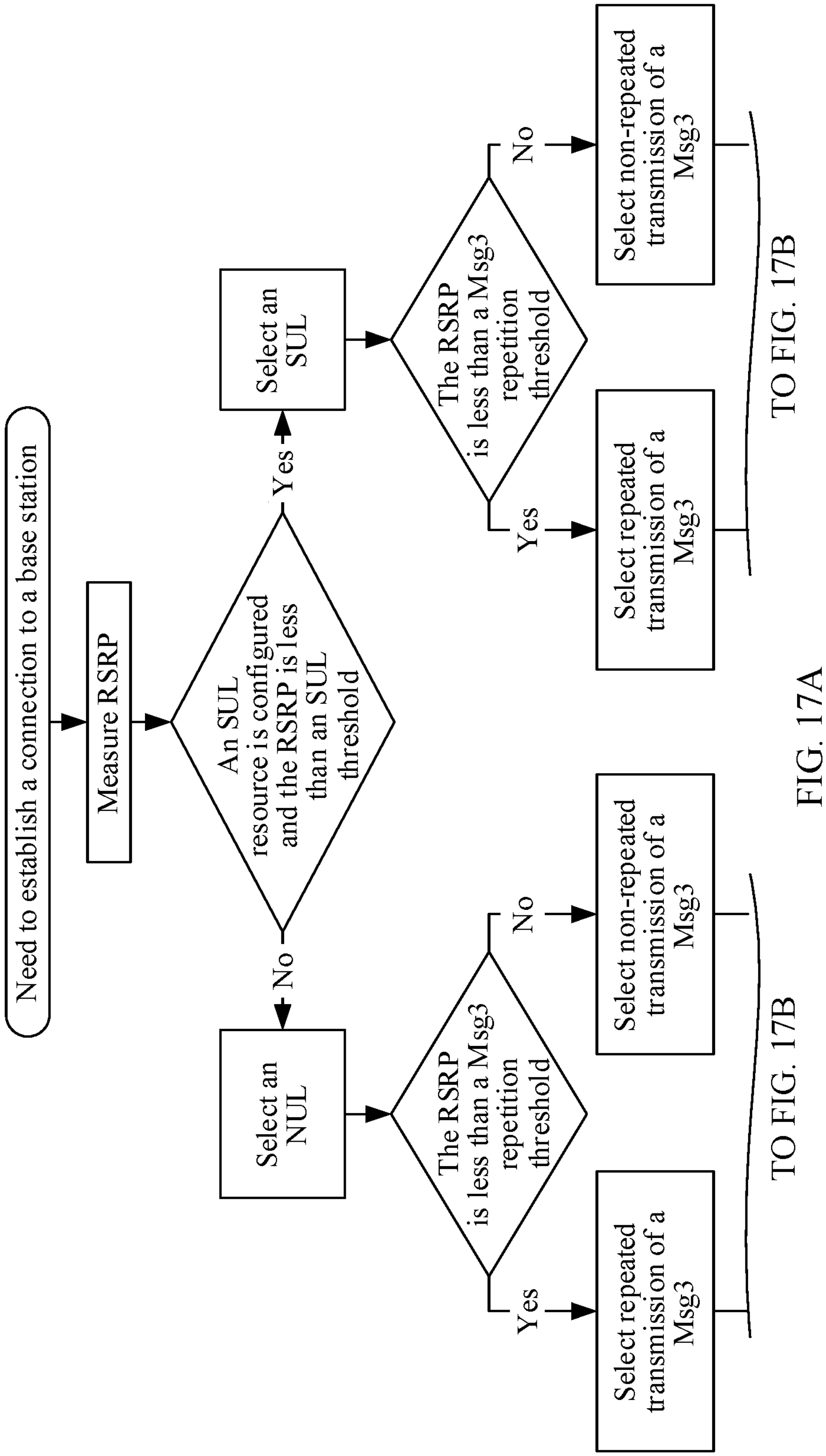
FIG. 17A and FIG. 17B are an example of a flowchart of still another random access method according to an embodiment of this application.
Figure 17B:
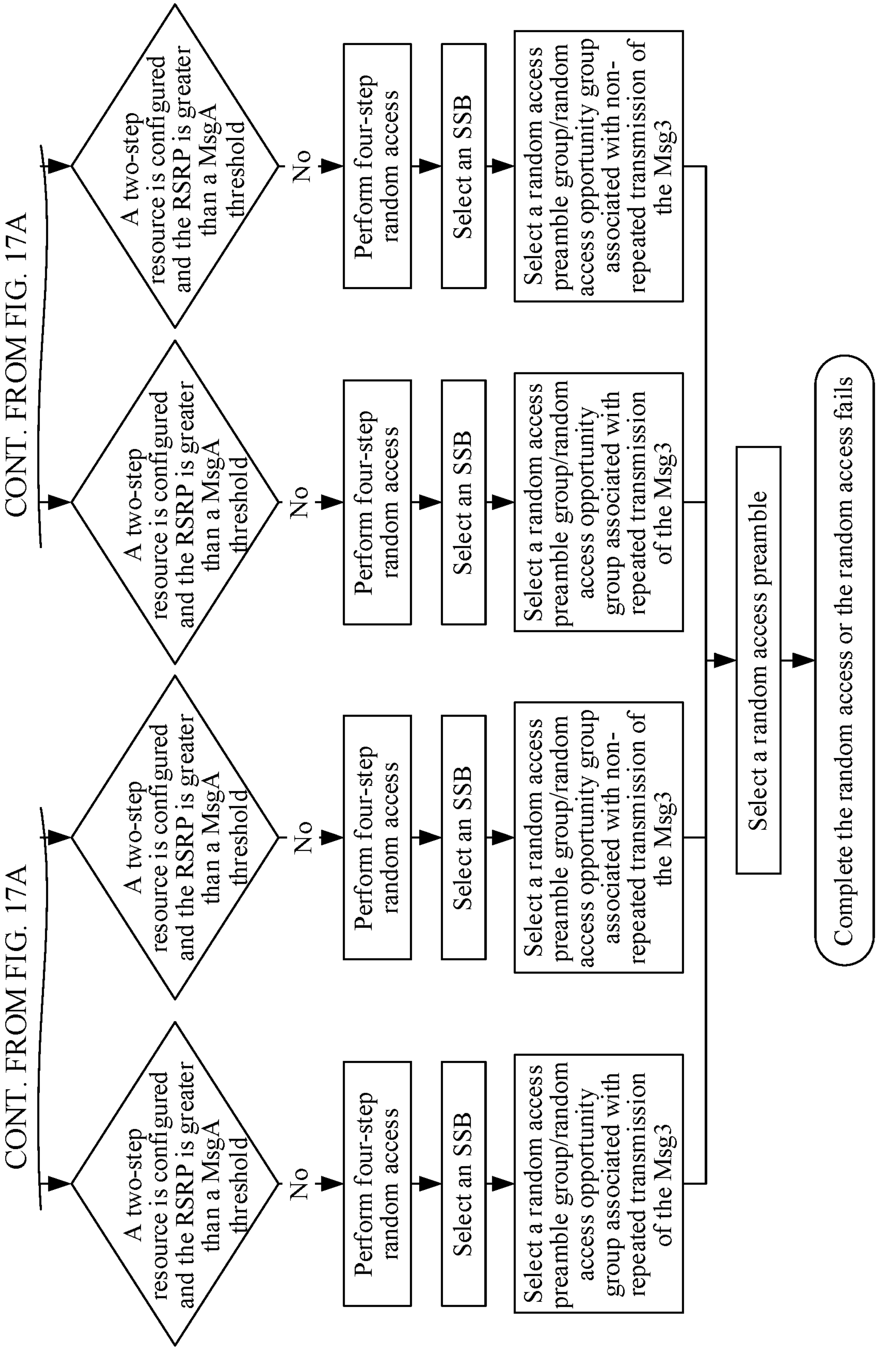

The following describes a random access method with reference to FIG. 16 and FIG. 17A and FIG. 17B. FIG. 17A and FIG. 17B are a flowchart corresponding to the method 700 in FIG. 16. The method 700 includes the following steps.

S701: A terminal device selects a carrier.

It should be understood that S701 is similar to S401 in the method 400, and details are not described herein again.

S702: The terminal device selects a sending manner of a Msg3.

For example, a Msg3 repetition threshold may be configured for the terminal device, and the terminal device determines the sending manner of the Msg3 based on the Msg3 repetition threshold.

In a possible implementation, the terminal device detects downlink reference signal received power RSRP. When the terminal device supports repeated sending of the Msg3 and expects to repeatedly send the Msg3, and the RSRP is less than the Msg3 repetition threshold, the terminal device determines that the sending manner of the Msg3 is that the Msg3 is repeatedly sent. Otherwise, the terminal device determines that the sending manner of the Msg3 is that the Msg3 is not repeatedly sent. In this implementation, when channel link quality is poor, the terminal device can repeatedly send the Msg3, to improve transmission performance of the Msg3.

In another possible implementation, the terminal device determines a Msg3 payload size. When the terminal device supports repeated sending of the Msg3 and expects to repeatedly send the Msg3, and the Msg3 payload size is less than the Msg3 repetition threshold, the terminal device determines that the sending manner of the Msg3 is that the Msg3 is repeatedly sent. Otherwise, the terminal device determines that the sending manner of the Msg3 is that the Msg3 is not repeatedly sent. In this implementation, the terminal device may repeatedly send the Msg3, to improve coverage, increase a sending success probability, and reduce a latency.

It should be noted that the Msg3 repetition threshold in the foregoing implementation may be configured by using a system message, or may be predefined. A specific configuration manner is similar to the solution described in S504 in the method 500, and details are not described herein again.

S703: The terminal device selects a random access type.

S704: The terminal device selects an SSB.

S703 and S704 are similar to S402 and S403 in the method 400. However, it should be noted that, in S703 and S704, the terminal device needs to separately select random access types and SSBs for different sending manners of the Msg3.

S705: The terminal device selects a random access preamble group/random access opportunity group based on the sending manner of the Msg3.

For example, the terminal device determines the random access preamble group based on the sending manner of the Msg3, where the random access preamble group is associated with the sending manner of the Msg3; or the terminal device determines the random access opportunity group based on the sending manner of the Msg3, where the random access opportunity group is associated with the sending manner of the Msg3. A configuration manner of the random access preamble group or the random access opportunity group is similar to the method described in S505 in the method 500, and details are not described again.

S706: The terminal device selects a random access preamble.

For example, after determining the random access preamble group/random access opportunity group, the terminal device selects the random access preamble from the random access preamble group/random access opportunity group.

S707: The terminal device sends the random access preamble.

After selecting the random access preamble, the terminal device sends the random access preamble to the network device to perform random access.

Correspondingly, after receiving the random access preamble from the terminal device, the network device determines the random access preamble group or the random access opportunity group corresponding to the random access preamble, and determines the sending manner of the Msg3 based on the association relationship between the random access preamble group or the random access opportunity group and the sending manner of the Msg3, that is, determines whether the Msg3 is repeatedly transmitted. Further, a number of transmission times of the Msg3 may be further determined, so that a resource used to send the Msg3 can be appropriately scheduled for the terminal device.

In an implementation, during random access based on this manner, the network device configures a random access preamble group and/or a random access opportunity group (namely, random access time and frequency resources) used for repeated sending of the Msg3 to be different from a random access preamble group and/or a random access opportunity group used for non-repeated sending of the Msg3. Optionally, the random access time resource in the resources is indicated by an independent random access resource configuration index prach-ConfigurationIndex (a resource used for non-repeated sending of the Msg3 is indicated by prach-ConfigurationIndex0, and a resource used for repeated sending of the Msg3 is indicated by prach-ConfigurationIndex1).

In the foregoing technical solution, the random access preamble group or the random access opportunity group is associated with the sending manner of the Msg3, so that after receiving the random access preamble from the terminal device, the network device may determine the sending manner of the Msg3 based on the random access preamble group or the random access opportunity group in which the random access preamble is located. To be specific, it is determined whether the terminal device needs to repeatedly send the Msg3, whether the terminal device has the capability of repeatedly sending the Msg3, the number of times that the terminal device repeatedly sends the Msg3, and the like, so that the network device can appropriately schedule a resource. In this way, a terminal device (namely, a terminal device with poor coverage performance) that needs to repeatedly send the Msg3 can obtain sufficient resources to repeatedly send the Msg3, and a terminal device (namely, a terminal device with good coverage performance) that does not need to repeatedly send the Msg3 can use a small number of resources. This improves resource utilization.

In still another implementation, the terminal device determines the sending manner of the message 3 for the random access before selecting a carrier for the random access, where the sending manner of the message 3 includes that the terminal device repeatedly sends the message 3 or the terminal device does not repeatedly send the message 3; the terminal device determines a random access preamble from a first random access preamble group or a first random access opportunity group based on the sending manner of the message 3, where the first random access preamble group or the first random access opportunity group is associated with the sending manner of the message 3, and the synchronization signal block is associated with the first random access preamble group or the first random access opportunity group; and the terminal device sends the random access preamble to a network device.

That the terminal device repeatedly sends the message 3 includes one or more of the following cases: The terminal device expects to repeatedly send the message 3, the terminal device has a capability of repeatedly sending the message 3, the terminal device needs to repeatedly send the message 3, or the terminal device expects to be scheduled to repeatedly send the message 3.

That the terminal device does not repeatedly send the message 3 includes one or more of the following cases: The terminal device does not have the capability of repeatedly sending the message 3, the terminal device does not need to repeatedly send the message 3, the terminal device does not expect to repeatedly send the message 3, the terminal device does not expect to be scheduled to repeatedly send the message 3, or the number of times that the terminal device sends the message 3 is less than or equal to 1.

In still another implementation, the terminal device determines the sending manner of the Msg3 before selecting the carrier type of the random access, where the sending manner of the Msg3 indicates whether to repeatedly send the Msg3 and/or a number of times of sending the Msg3, and the sending manner of the Msg3 is associated with at least one of the following cases: The terminal device repeatedly sends the Msg3, the terminal device does not repeatedly send the Msg3, the number of times that the terminal device sends the Msg3, the terminal has the capability of repeatedly sending the Msg3, the terminal device does not have the capability of repeatedly sending the Msg3, the terminal device needs to repeatedly send the Msg3, the terminal device does not need to repeatedly send the Msg3, the terminal device expects to be scheduled to repeatedly send the Msg3, or the terminal device does not expect to be scheduled to repeatedly send the Msg3. The terminal device selects the random access preamble from the first random access preamble group or the first random access opportunity group based on the sending manner of the Msg3, where the first random access preamble group or the first random access opportunity group is associated with the sending manner of the Msg3.

Figure 18:
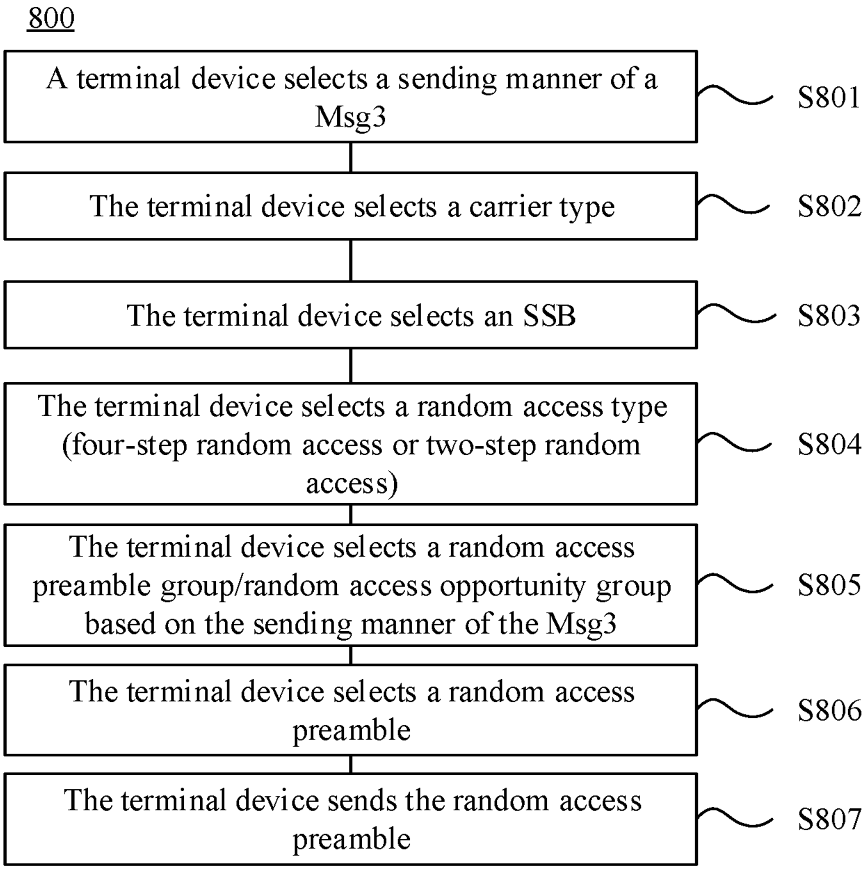
FIG. 18 is an example of a block diagram of still another random access method according to an embodiment of this application.
Figure 19A:
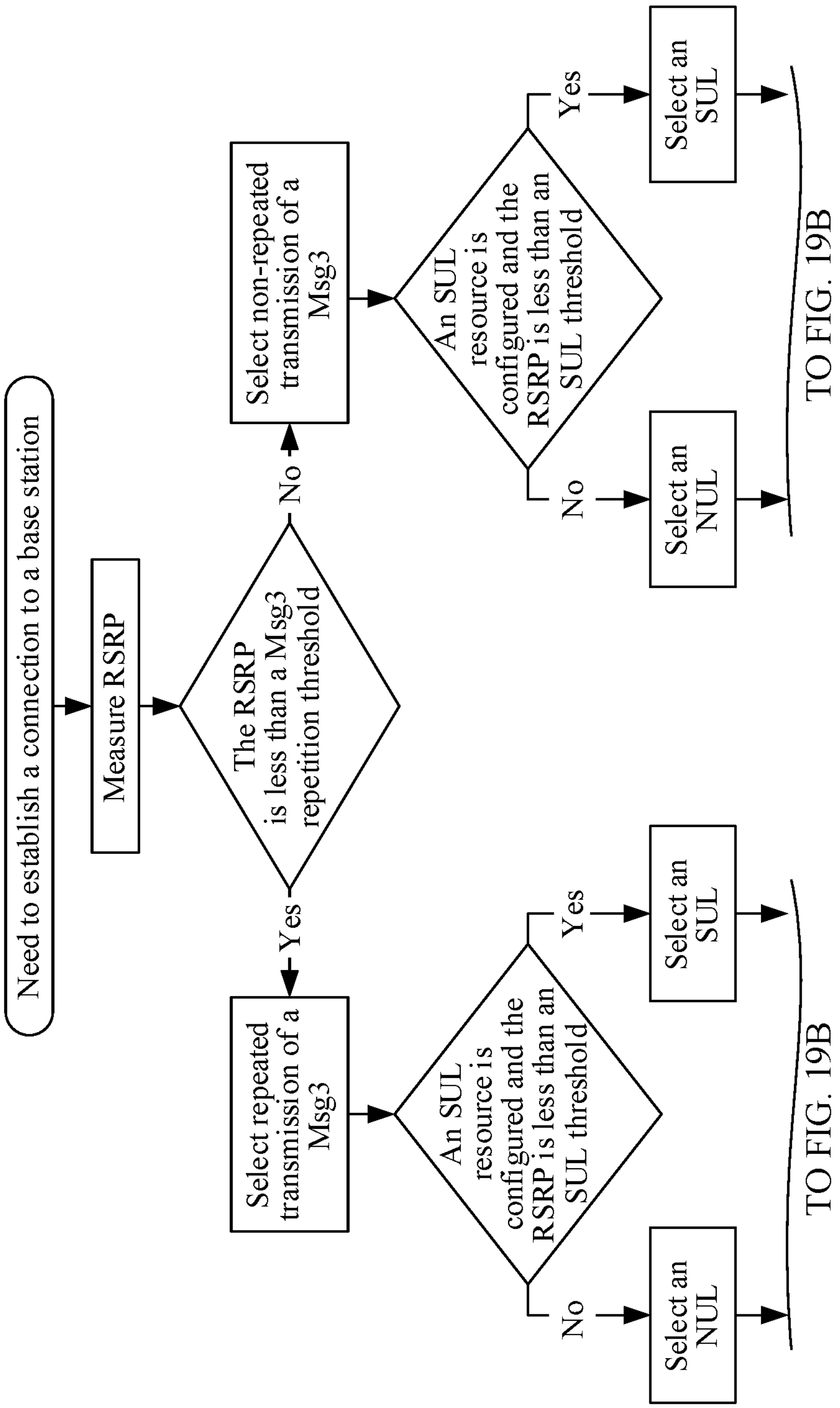
FIG. 19A and FIG. 19B are an example of a flowchart of still another random access method according to an embodiment of this application.
Figure 19B:
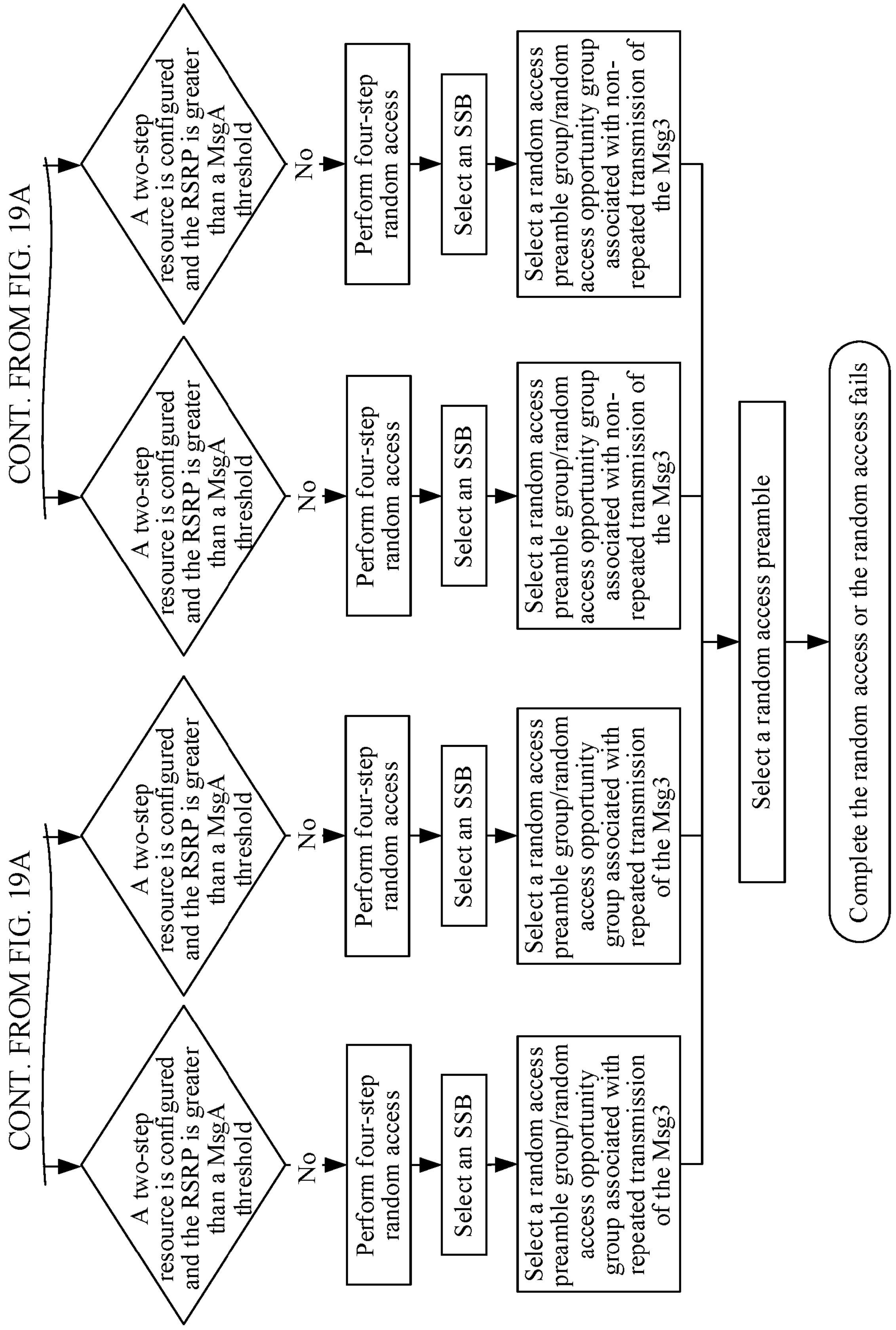

The following describes a random access method with reference to FIG. 18 and FIG. 19A and FIG. 19B. FIG. 19A and FIG. 19B are a flowchart corresponding to the method 800 in FIG. 18. The method 800 includes the following steps.

S801: A terminal device selects a sending manner of a Msg3.

For example, a Msg3 repetition threshold may be configured for the terminal device, and the terminal device determines the sending manner of the Msg3 based on the Msg3 repetition threshold.

In a possible implementation, the terminal device detects downlink reference signal received power RSRP. When the terminal device supports repeated sending of the Msg3 and expects to repeatedly send the Msg3, and the RSRP is less than the Msg3 repetition threshold, the terminal device determines that the sending manner of the Msg3 is that the Msg3 is repeatedly sent. Otherwise, the terminal device determines that the sending manner of the Msg3 is that the Msg3 is not repeatedly sent. In this implementation, when channel link quality is poor, the terminal device can repeatedly send the Msg3, to improve transmission performance of the Msg3.

In another possible implementation, the terminal device determines a Msg3 payload size. When the terminal device supports repeated sending of the Msg3 and expects to repeatedly send the Msg3, and the Msg3 payload size is less than the Msg3 repetition threshold, the terminal device determines that the sending manner of the Msg3 is that the Msg3 is repeatedly sent. Otherwise, the terminal device determines that the sending manner of the Msg3 is that the Msg3 is not repeatedly sent. In this implementation, the terminal device may repeatedly send the Msg3, to improve coverage, increase a sending success probability, and reduce a latency.

It should be noted that the Msg3 repetition threshold in the foregoing implementation may be configured by using a system message, or may be predefined. A specific configuration manner is similar to the solution described in S504 in the method 500, and details are not described herein again.

S802: The terminal device selects a carrier type.

S803: The terminal device selects an SSB.

S804: The terminal device selects a random access type.

It should be understood that S802 to S804 are similar to S401 to S403 in the method 400. However, it should be noted that, in S802 to S804, the terminal device needs to separately select carrier types, random access types, and SSBs for different sending manners of the Msg3.

S805: The terminal device selects a random access preamble group/random access opportunity group based on the sending manner of the Msg3.

For example, the terminal device determines the random access preamble group based on the sending manner of the Msg3, where the random access preamble group is associated with the sending manner of the Msg3; or the terminal device determines the random access opportunity group based on the sending manner of the Msg3, where the random access opportunity group is associated with the sending manner of the Msg3. A configuration manner of the random access preamble group or the random access opportunity group is similar to the method described in S505 in the method 500, and details are not described again.

S806: The terminal device selects a random access preamble.

For example, after determining the random access preamble group/random access opportunity group, the terminal device selects the random access preamble from the random access preamble group/random access opportunity group.

S807: The terminal device sends the random access preamble.

After selecting the random access preamble, the terminal device sends the random access preamble to the network device to perform random access.

Correspondingly, after receiving the random access preamble from the terminal device, the network device determines the random access preamble group or the random access opportunity group corresponding to the random access preamble, and determines the sending manner of the Msg3 based on the association relationship between the random access preamble group or the random access opportunity group and the sending manner of the Msg3, that is, determines whether the Msg3 is repeatedly transmitted. Further, a number of transmission times of the Msg3 may be further determined, so that a resource used to send the Msg3 can be appropriately scheduled for the terminal device.

In the foregoing technical solution, the random access preamble group or the random access opportunity group is associated with the sending manner of the Msg3, so that after receiving the random access preamble from the terminal device, the network device may determine the sending manner of the Msg3 based on the random access preamble group or the random access opportunity group in which the random access preamble is located. To be specific, it is determined whether the terminal device needs to repeatedly send the Msg3, whether the terminal device has the capability of repeatedly sending the Msg3, the number of times that the terminal device repeatedly sends the Msg3, and the like, so that the network device can appropriately schedule a resource. In this way, a terminal device (namely, a terminal device with poor coverage performance) that needs to repeatedly send the Msg3 can obtain sufficient resources to repeatedly send the Msg3, and a terminal device (namely, a terminal device with good coverage performance) that does not need to repeatedly send the Msg3 can use a small number of resources. This improves resource utilization.

In the solutions (the method 400 to the method 800) in the foregoing embodiments, the random access preamble group or the random access opportunity group is associated with the sending manner of the message 3, and the terminal device may indicate, by selecting the random access preamble group or the random access opportunity group, whether to repeatedly send the message 3. In another scenario, the random access preamble group or the random access opportunity group may alternatively be associated with whether a capability of the terminal device is reduced. The terminal device may indicate, by selecting a random access preamble group or a random access opportunity group, whether the terminal device is a terminal device that needs to reduce the capability. In this case, the "sending manner of the message 3" in the foregoing solution may be replaced with a "capability type of the terminal device", and "repeated sending of the message 3" may be replaced with "a reduced-capability", to form a new embodiment. A specific implementation is similar, and details are not described again. Alternatively, the "sending manner of the message 3" in the foregoing solution is replaced with a "capability type of the terminal device", and "repeated sending of the message A" is replaced with "the reduced-capability", to form a new embodiment. A specific implementation is similar, and details are not described again. In another scenario, "2-step RA" in the foregoing solution may be replaced with "the reduced-capability", which corresponds to the 4-step RA solution, to form a new embodiment. A specific implementation is similar, and details are not described again.

Figure 20:
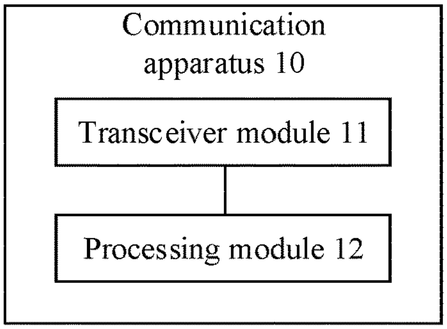
FIG. 20 is a schematic block diagram of an example of a random access apparatus according to this application.
Figure 21:
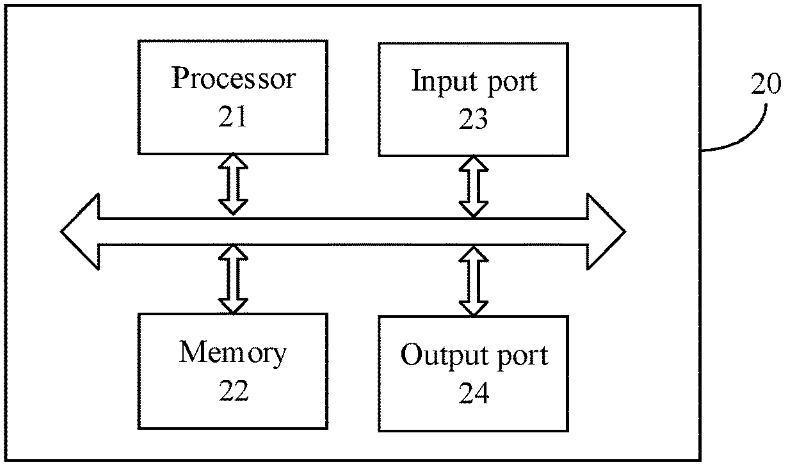
FIG. 21 is a schematic block diagram of another example of a random access apparatus according to this application.
Figure 22:
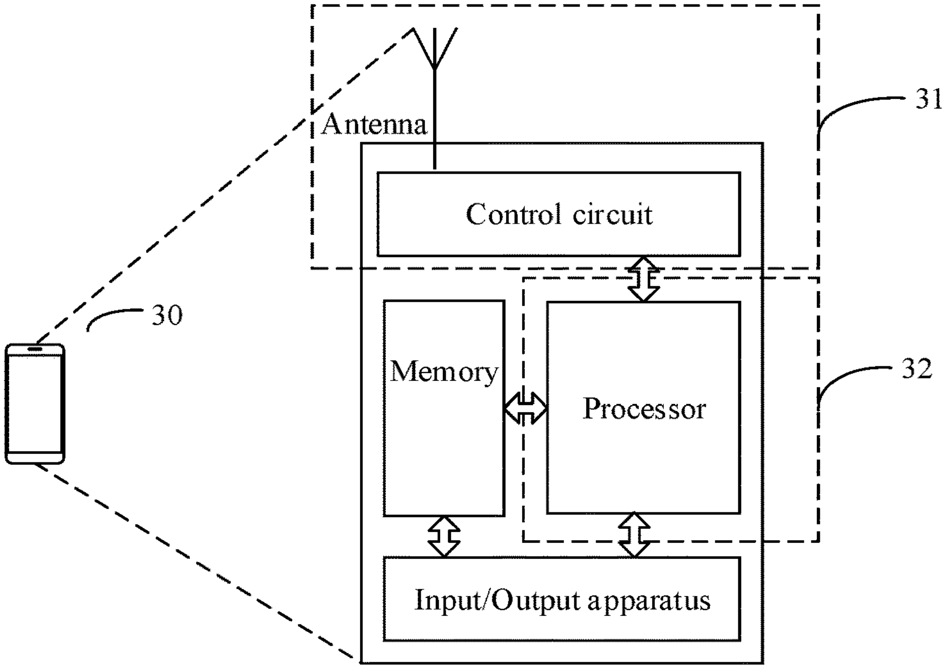
FIG. 22 is a schematic diagram of a structure of an example of a terminal device according to this application.

The foregoing describes in detail methods provided in embodiments of this application with reference to FIG. 3 to FIG. 19A and FIG. 19B. With reference to FIG. 20 to FIG. 22, the following describes in detail a random access preamble determining apparatus provided in an embodiment of this application.

FIG. 20 is a schematic block diagram of a communication apparatus according to an embodiment of this application. As shown in the figure, a communication apparatus 10 may include a transceiver module 11 and a processing module 12.

In a possible design, the communication apparatus 10 may correspond to the terminal device in the foregoing method embodiments.

For example, the communication apparatus 10 may correspond to the terminal device in the method 400 to the method 800 according to embodiments of this application, and the communication apparatus 10 may include modules configured to perform the methods performed by the terminal device in the method 400 to the method 800. In addition, the modules in the communication apparatus 10 and the foregoing other operations and/or functions are respectively used to implement corresponding procedures of the method 400 to the method 800. The transceiver module 11 in the communication apparatus 10 performs receiving and sending operations performed by the terminal device in the foregoing method embodiments, and the processing module 12 performs operations other than the receiving and sending operations.

According to the foregoing methods, FIG. 21 is a schematic diagram of a communication apparatus 20 according to an embodiment of this application. As shown in FIG. 21, the apparatus 20 may be the terminal device in the method 400 to the method 800.

The apparatus 20 may include a processor 21 (namely, an example of the processing module) and a memory 22. The memory 22 is configured to store instructions, and the processor 21 is configured to execute the instructions stored in the memory 22, so that the apparatus 20 implements the steps performed by the terminal device in the method 400 to the method 800.

Further, the apparatus 20 may further include an input port 23 (namely, an example of the transceiver module) and an output port 24 (namely, another example of the transceiver module). Further, the processor 21, the memory 22, the input port 23, and the output port 24 may communicate with each other through an internal connection path, to transfer a control signal and/or a data signal. The memory 22 is configured to store a computer program. The processor 21 may be configured to invoke the computer program from the memory 22 and run the computer program, to control the input port 23 to receive a signal, and control the output port 24 to send a signal, so as to complete the steps of the network device in the foregoing methods. The memory 22 may be integrated into the processor 21, or may be disposed separately from the processor 21.

Optionally, if the communication apparatus 20 is a communication device, the input port 23 is a receiver, and the output port 24 is a transmitter. The receiver and the transmitter may be a same physical entity or different physical entities. When the receiver and the transmitter are a same physical entity, the receiver and the transmitter may be collectively referred to as a transceiver.

Optionally, if the communication apparatus 20 is a chip or a circuit, the input port 23 is an input interface, and the output port 24 is an output interface.

In an implementation, it may be considered that functions of the input port 23 and the output port 24 are implemented by a transceiver circuit or a dedicated transceiver chip. The processor 21 may be considered to be implemented by using a dedicated processing chip, a processing circuit, a processor, or a general-purpose chip.

In another implementation, it may be considered that the communication device provided in this embodiment of this application is implemented by a general-purpose computer. To be specific, program code for implementing functions of the processor 21, the input port 23, and the output port 24 is stored in the memory 22, and the general-purpose processor executes the code in the memory 22 to implement the functions of the processor 21, the input port 23, and the output port 24.

For concepts, explanations, detailed descriptions, and other steps of the apparatus 20 that are related to the technical solutions provided in embodiments of this application, refer to the descriptions of the content in the foregoing methods or other embodiments. Details are not described herein again.

FIG. 22 is a schematic diagram of a structure of a communication apparatus 30 according to this application. For ease of description, FIG. 22 shows only main components of the communication apparatus. As shown in FIG. 22, the communication apparatus 30 includes a processor, a memory, a control circuit, an antenna, and an input/output apparatus.

The processor is mainly configured to process a communication protocol and communication data, control the entire terminal device, execute a software program, and process data of the software program, for example, configured to support the terminal device in performing the actions described in embodiments of the random access method. The memory is mainly configured to store the software program and the data, for example, store a codebook described in the foregoing embodiments. The control circuit is mainly configured to perform conversion between a baseband signal and a radio frequency signal and process the radio frequency signal. The control circuit and the antenna together may also be referred to as a transceiver, and are mainly configured to receive/send a radio frequency signal in a form of an electromagnetic wave. The input/output apparatus, for example, a touchscreen, a display, or a keyboard, is mainly configured to: receive data input by a user and output data to the user.

After the communication apparatus is powered on, the processor may read a software program in a storage unit, explain and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 22 shows only one memory and only one processor. In an actual terminal device, there may be a plurality of processors and memories. The memory may also be referred to as a storage medium, a storage device, or the like. This is not limited in embodiments of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 22 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor; or may be stored in the storage unit in a form of a software program, and the processor executes the software program to implement a baseband processing function.

As shown in FIG. 22, the communication apparatus 30 includes a transceiver unit 31 and a processing unit 32. The transceiver unit may also be referred to as a transceiver, a transceiver machine, a transceiver apparatus, or the like. Optionally, a component that is in the transceiver unit 31 and that is configured to implement a receiving function may be considered as a receiving unit, and a component that is in the transceiver unit 31 and that is configured to implement a sending function may be considered as a sending unit. In other words, the transceiver unit 31 includes the receiving unit and the sending unit. Optionally, the transceiver unit 31 may include a sending unit and/or a receiving unit. The sending unit is configured to perform a sending-related operation performed by the terminal device in the foregoing method embodiments, and the receiving unit is configured to perform a receiving-related operation performed by the terminal device in the foregoing method embodiments. For example, the receiving unit may also be referred to as a receiver machine, a receiver, a receiver circuit, or the like. The sending unit may be referred to as a transmitter machine, a transmitter, a transmitter circuit, or the like.

The terminal device shown in FIG. 22 may perform actions performed by the terminal device in the method 400 to the method 800. To avoid repetition, detailed descriptions thereof are omitted herein.

An embodiment of this application further provides a computer-readable storage medium. The computer-readable storage medium stores computer instructions used to implement the method performed by the network device in the foregoing method embodiments.

For example, when the computer program is executed by a computer, the computer is enabled to implement the method performed by the network device in the foregoing method embodiments.

An embodiment of this application further provides a computer program product including instructions. When the instructions are executed by a computer, the computer is enabled to implement the method performed by the first device or the method performed by the second device in the foregoing method embodiments.

An embodiment of this application further provides a communication system. The communication system includes the network device in the foregoing embodiments.

For explanation and beneficial effects of related content in any apparatus provided above, refer to the corresponding method embodiment provided above. Details are not described herein again.

In embodiments of this application, the network device may include a hardware layer, an operating system layer running above the hardware layer, and an application layer running above the operating system layer. The hardware layer may include hardware such as a central processing unit (central processing unit, CPU), a memory management unit (memory management unit, MMU), and a memory (also referred to as a main memory). An operating system at the operating system layer may be any one or more computer operating systems that implement service processing through a process (process), for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in embodiments of this application is not specifically limited in embodiments of this application, provided that a program that records code for the method provided in embodiments of this application can be run to perform communication according to the method provided in embodiments of this application. For example, the method provided in embodiments of this application may be executed by a network device, or a functional module that is in a network device and that can invoke and execute a program.

Aspects or features of this application may be implemented as a method, an apparatus, or a product that uses standard programming and/or engineering technologies. The term "product" used in this specification may cover a computer program that can be accessed from any computer-readable component, carrier, or medium. For example, the computer-readable medium may include but is not limited to a magnetic storage device (for example, a hard disk, a floppy disk, or a magnetic tape), an optical disc (for example, a CD or a DVD), a smart card and a flash memory device (for example, an erasable programmable read-only memory EPROM), a card, a stick, or a key driver.

Various storage media described in this specification may indicate one or more devices and/or other machine-readable media that are configured to store information. The term "machine-readable media" may include but is not limited to a wireless channel, and various other media that can store, include, and/or carry instructions and/or data.

It should be understood that the processor mentioned in embodiments of this application may be a central processing unit CPU, or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an EPROM, an electrically erasable programmable read-only memory (electrically EPROM, EEPROM), or a flash memory. The volatile memory may be a random access memory (random access memory, RAM). For example, the RAM can be used as an external cache. By way of example, and not limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, a memory (storage module) may be integrated into the processor.

It should be further noted that the memory described in this specification is intended to include, but is not limited to, these memories and any other memory of a suitable type.

A person of ordinary skill in the art may be aware that, units and steps of the examples described in combination with embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the protection scope of this application.

It may be clearly understood by a person skilled in the art that, for the purpose of convenient and brief description, for a detailed working process of the foregoing apparatus and unit, refer to a corresponding process in the foregoing method embodiments. Details are not described herein again.

In the several embodiments provided in this application, it should be understood that the disclosed apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to implement the solutions provided in this application.

In addition, functional units in embodiments of this application may be integrated into one unit, each of the units may exist independently physically, or two or more units may be integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or another programmable apparatus. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. For example, the usable medium may include but is not limited to any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims and this specification.

What is claimed is:

1. A random access method, comprising:

receiving configuration information comprising a field that indicates a usage for a first random access preamble group, the usage being indicated by a combination of a third message (msg3)-repetition and a reduced-capability, and the msg3 being the third message of a four-step random access procedure;

selecting, from at least two random access preamble groups based on the configuration information including the field that indicates the usage, the first random access preamble group for a terminal device when a type of the terminal device is the reduced-capability and the terminal device needs to send msg3 repeatedly;

determining a random access preamble from the first random access preamble group; and sending the random access preamble to a network device.

2. A random access apparatus, comprising:

a non-transitory memory storing programming instructions; and a processor configured to execute the programming instructions to cause the random access apparatus to:

receive configuration information comprising a field that indicates a usage for a first random access preamble group, the usage being indicated by a combination of a third message (msg3)-repetition and a reduced-capability, and the msg3 being the third message of a four-step random access procedure;

select, from at least two random access preamble groups based on the configuration information including the field that indicates the usage, the first random access preamble group for the random access apparatus when a type of the random access apparatus is the reduced-capability and the random access apparatus needs to send msg3 repeatedly;

determine a random access preamble from the first random access preamble group; and send the random access preamble to a network device.

3. The method according to claim 1, wherein the configuration information comprises a start preamble index of the first random access preamble group and a quantity of preambles of the first random access preamble group.

4. The method according to claim 1, wherein when a reference signal received power (RSRP) measured by the terminal device is less than a threshold, the terminal device needs to send msg3 repeatedly.

5. The method according to claim 1, further comprising: selecting a carrier for random access.

6. The method according to claim 1, further comprising: selecting a random access type.

7. The apparatus according to claim 2, wherein the configuration information comprises a start preamble index of the first random access preamble group and a quantity of preambles of the first random access preamble group.

8. The apparatus according to claim 2, wherein when a reference signal received power (RSRP) measured by the random access apparatus is less than a threshold, the random access apparatus needs to send msg3 repeatedly.

9. The apparatus according to claim 2, wherein:

the processor is further configured to execute the programming instructions to cause the random access apparatus to select a carrier for random access.

10. The apparatus according to claim 2, wherein:

the processor is further configured to execute the programming instructions to cause the random access apparatus to select a random access type.

11. The apparatus according to claim 2, wherein:

the random access apparatus is a terminal device or a chip of a terminal device.

12. A non-transitory computer-readable storage medium storing a computer program code for execution by a processor of a terminal device, the computer program code comprising instructions for:

receiving configuration information comprising a field that indicates a usage for a first random access preamble group, the usage being indicated by a combination of a third message (msg3)-repetition and a reduced-capability, and the msg3 being the third message of a four-step random access procedure;

selecting, from at least two random access preamble groups based on the configuration information including the field that indicates the usage, the first random access preamble group for the terminal device when a type of the terminal device is the reduced-capability and the terminal device needs to send msg3 repeatedly;

determining a random access preamble from the first random access preamble group; and sending the random access preamble to a network device.

13. The non-transitory computer-readable storage medium according to claim 12, wherein the configuration information comprises a start preamble index of the first random access preamble group and a quantity of preambles of the first random access preamble group.

14. The non-transitory computer-readable storage medium according to claim 12, wherein when a reference signal received power (RSRP) measured by the terminal device is less than a threshold, the terminal device needs to send msg3 repeatedly.

15. The non-transitory computer-readable storage medium according to claim 12, wherein:

the computer program code further comprises instructions for selecting a carrier for random access.

16. The non-transitory computer-readable storage medium according to claim 12, wherein:

the computer program code further comprises instructions for selecting a random access type.

* * * * *